(12) United States Patent
Ogawa et al.

(10) Patent No.: US 10,573,927 B2
(45) Date of Patent: Feb. 25, 2020

(54) ELECTRODE PRECURSOR, ELECTRODE, AND CELL

(71) Applicant: NIPPON SHOKUBAI CO., LTD., Osaka-shi, Osaka (JP)

(72) Inventors: Satoshi Ogawa, Osaka (JP); Koji Yonehara, Osaka (JP); Hiroko Harada, Osaka (JP); Yasuyuki Takazawa, Osaka (JP); Hironobu Ono, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 802 days.

(21) Appl. No.: 14/764,382

(22) PCT Filed: Jan. 30, 2014

(86) PCT No.: PCT/JP2014/052114
§ 371 (c)(1),
(2) Date: Jul. 29, 2015

(87) PCT Pub. No.: WO2014/119663
PCT Pub. Date: Aug. 7, 2014

(65) Prior Publication Data
US 2015/0364789 A1 Dec. 17, 2015

(30) Foreign Application Priority Data

Feb. 1, 2013 (JP) .................................. 2013-018634
May 23, 2013 (JP) .................................. 2013-108992

(51) Int. Cl.
*H01M 10/0562* (2010.01)
*H01M 4/24* (2006.01)
(Continued)

(52) U.S. Cl.
CPC ........ *H01M 10/0562* (2013.01); *H01G 11/30* (2013.01); *H01M 4/134* (2013.01);
(Continued)

(58) Field of Classification Search
None
See application file for complete search history.

(56) References Cited

U.S. PATENT DOCUMENTS 5,698,339 A 12/1997 Kawakami et al.
5,795,679 A 8/1998 Kawakami et al.
(Continued)

FOREIGN PATENT DOCUMENTS

CN 102844910 12/2012
EP 2 544 267 1/2013
(Continued)

OTHER PUBLICATIONS

Abstracts of Annual Meeting of the Electrochemical Society of Japan, 2011, 78th (CD-ROM), pp. 52 (B52), International search report, translation available upon Examiners request.
(Continued)

*Primary Examiner* — Rena Dye Cronin
(74) *Attorney, Agent, or Firm* — Hamre, Schumann, Mueller & Larson, P.C.

(57) ABSTRACT

The present invention provides an electrode which is a zinc anode or an electrode of any other type, and ensures good durability and sufficiently high ion conductivity, and sufficiently improves the cell performance when used in a cell, and also provides its precursor. The present invention relates to an electrode which includes a current collector and an active material layer containing an active material, and further includes a specific anion conducting material or a specific solid electrolyte.

16 Claims, 14 Drawing Sheets

(51) Int. Cl.
*H01M 4/36* (2006.01)
*H01M 4/134* (2010.01)
*H01M 4/42* (2006.01)
*H01G 11/30* (2013.01)
*H01M 2/18* (2006.01)
*H01M 4/02* (2006.01)

(52) U.S. Cl.
CPC .......... *H01M 4/244* (2013.01); *H01M 4/366* (2013.01); *H01M 4/42* (2013.01); *H01M 2/18* (2013.01); *H01M 2004/021* (2013.01); *H01M 2004/027* (2013.01); *H01M 2300/0068* (2013.01); *H01M 2300/0082* (2013.01); *H01M 2300/0088* (2013.01); *Y02E 60/13* (2013.01)

(56) References Cited

U.S. PATENT DOCUMENTS

| | | | |
|---|---|---|---|
| 5,824,434 A * | 10/1998 | Kawakami | H01M 2/14 429/209 |
| 6,423,453 B1 | 7/2002 | Noda | |
| 9,293,791 B2 * | 3/2016 | Yamada | H01M 10/24 |
| 2002/0031701 A1 * | 3/2002 | Kawakami | H01M 2/14 429/137 |
| 2004/0002002 A1 * | 1/2004 | Mizuta | H01G 9/035 429/188 |
| 2005/0186478 A1 | 8/2005 | Iwakura et al. | |
| 2006/0105245 A1 | 5/2006 | Ikuta et al. | |
| 2008/0138704 A1 * | 6/2008 | Mizuta | H01G 9/035 429/203 |
| 2008/0145756 A1 | 6/2008 | Taniguichi | |
| 2009/0246613 A1 | 10/2009 | Park et al. | |
| 2009/0311598 A1 | 12/2009 | Tadano | |
| 2013/0149593 A1 | 6/2013 | Hayashi et al. | |
| 2013/0189592 A1 * | 7/2013 | Roumi | H01G 9/048 429/406 |
| 2013/0236779 A1 | 9/2013 | Miyatake et al. | |
| 2014/0205909 A1 | 7/2014 | Yonehara et al. | |

FOREIGN PATENT DOCUMENTS

| | | |
|---|---|---|
| JP | 52-88739 | 7/1977 |
| JP | 53-114038 | 10/1978 |
| JP | 55-137666 | 10/1980 |
| JP | 57-163963 | 10/1982 |
| JP | 60-167264 | 8/1985 |
| JP | 4-206468 | 7/1992 |
| JP | 5-144431 | 6/1993 |
| JP | 6-168737 | 6/1994 |
| JP | 6-283157 | 10/1994 |
| JP | 8-171901 | 7/1996 |
| JP | 11-167933 | 6/1999 |
| JP | 200067920 | 3/2000 |
| JP | 2000-123633 | 4/2000 |
| JP | 2002-505506 | 2/2002 |
| JP | 2004-526286 | 8/2004 |
| JP | 2005166620 | 6/2005 |
| JP | 2005-228541 | 8/2005 |
| JP | 2005-235674 | 9/2005 |
| JP | 2006-236865 | 9/2006 |
| JP | 2007-510267 | 4/2007 |
| JP | 2007-157584 | 6/2007 |
| JP | 2008-153097 | 7/2008 |
| JP | 2008-537302 | 9/2008 |
| JP | 2009301765 | 12/2009 |
| JP | 2010-049909 | 3/2010 |
| JP | 2010-080376 | 4/2010 |
| JP | 2010-520095 | 6/2010 |
| JP | 4781263 | 7/2011 |
| JP | 2011-253804 | 12/2011 |
| JP | 2012-038425 | 2/2012 |
| JP | 2013-54877 | 3/2013 |
| WO | 99/44245 | 9/1999 |
| WO | 2005/045957 | 5/2005 |
| WO | 2006/111835 | 10/2006 |
| WO | 2012/020699 | 2/2012 |
| WO | 2013/027767 | 2/2013 |

OTHER PUBLICATIONS

Xinming Fan et al.: "The application of Zn—Al-hydrotalcite as a novel anodic material for Ni—Zn secondary cells"; Journal of Power Sources; 2013, vol. 224, pp. 80-85.

International search report for International application No. PCT/JP2014/052114, dated Mar. 25, 2014 (6 pages).

* cited by examiner

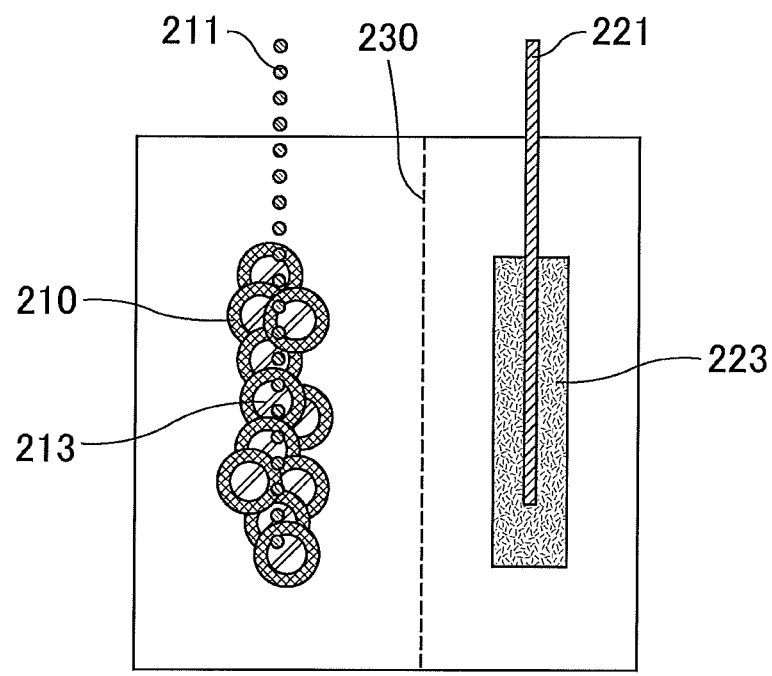
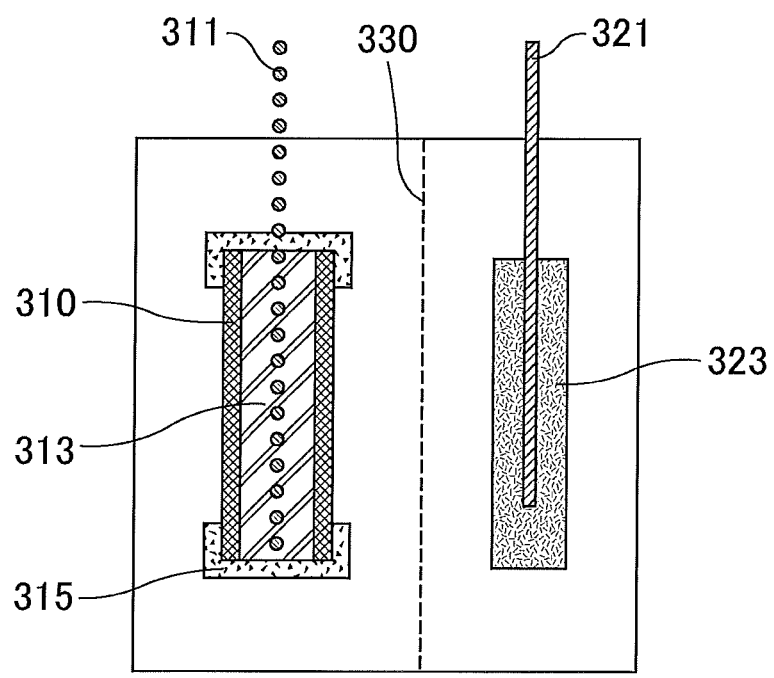

(Before evaluation)

(After evaluation)

(Before evaluation)

(After evaluation)

(Before evaluation)

(After evaluation)

(Before evaluation)

(After evaluation)

(Before evaluation)

(After evaluation)

(Before evaluation)

(After evaluation)

(Before evaluation)

(After evaluation)

(Before evaluation)

(After evaluation)

ELECTRODE PRECURSOR, ELECTRODE, AND CELL

TECHNICAL FIELD

The present invention relates to an electrode precursor, an electrode, and a cell. More specifically, the present invention relates to an electrode precursor containing an anion conducting material that tends to allow anions involved in cell reactions, such as hydroxide ion, to permeate it, sufficiently prevents diffusion of metal ions, and also prevents growth of crystal dendrites and short circuits due to dendrite growth, and also relates to an electrode and a cell. The present invention further relates to a zinc anode that includes an active material layer containing a zinc species, and allows for an economically-efficient, safe, high-performance cell, and a cell including the zinc anode.

BACKGROUND ART

The importance of development and improvement of cells has been increasing in various industries such as the mobile device industry and the automobile industry in recent years. This trend has brought various newly developed or improved cell systems that are excellent, in particular, in cell performance and secondary cell design.

As cells have become widespread, zinc anodes containing a zinc species as an anode active material have been one of the subjects of studies. Examples of cells including a zinc anode include primary cells, secondary cells (storage cells), and air cells. Specifically, cells such as zinc-air cells that use atmospheric oxygen as a cathode active material, nickel-zinc cells containing a nickel-containing compound as a cathode active material, manganese-zinc cells and zinc ion cells which contain a manganese-containing compound as a cathode active material, and silver-zinc cells containing silver oxide as a cathode active material have been developed and studied. In particular, zinc-air primary cells, manganese-zinc primary cells, and silver-zinc primary cells are in practical use in a wide area of the world. Additionally, the recent increasing importance of development and improvement of cells in various industries, such as the mobile device industry and the automobile industry, has brought various newly developed or improved cell systems that are excellent, in particular, in cell performance and secondary cell design.

Nickel-zinc cells, which contain a nickel-containing compound as a cathode active material, and zinc-air cells, which use air (oxygen) as a cathode active material, are advantageous among others in terms of the following points: safety is ensured by the use of an alkaline aqueous solution; and no rare metal is used in the electrode material as an elemental strategy. A disadvantage thereof is that zinc dendrites grow in the zinc anode to cause a short circuit.

Various technical developments have been made to solve the problem (for example, Patent Literatures 1 to 13 and Non Patent Literature 1). Besides, various studies and developments in members of the electrodes, such as active material layers, have been made (for example, Patent Literatures 14 to 18).

CITATION LIST

Patent Literature

Patent Literature 1: JP S52-88739 A
Patent Literature 2: JP S57-163963 A
Patent Literature 3: JP 2013-54877 A
Patent Literature 4: JP H05-144431 A
Patent Literature 5: JP 2002-505506 T
Patent Literature 6: JP 2000-67920 A
Patent Literature 7: JP 2005-228541 A
Patent Literature 8: JP 4781263 B
Patent Literature 9: JP 2010-520095 T
Patent Literature 10: JP 2000-123633 A
Patent Literature 11: JP 2005-235674 A
Patent Literature 12: JP 2005-166620 A
Patent Literature 13: JP 2006-236865 A
Patent Literature 14: JP H08-171901 A
Patent Literature 15: JP 2010-80376 A
Patent Literature 16: JP 2007-510267 T
Patent Literature 17: JP 2008-153097 A
Patent Literature 18: JP 2009-301765 A

Non Patent Literature

Non Patent Literature 1: "Journal of Power Sources", 2013, Vol. 224, pp. 80-85

SUMMARY OF INVENTION

Technical Problem

The inventions disclosed in Patent Literatures 1 to 4 have room for improvement in terms of sufficiently preventing short circuits due to dendrite formation even after repeated charge and discharge. Also, what is disclosed or suggested in other documents is not sufficient enough to allow for the production of cells that can sufficiently prevent such short circuits. For this reason, and as a result of development of cells including an anode containing another element, cells including an anode containing zinc have been outside of the mainstream of the cell development despite of the history of studies of various types thereof, as described above.

However, cells including a zinc electrode are strongly advantageous in terms of the following points: safety is ensured by the use of an alkaline aqueous solution; and no rare metal is used in the electrode material as elemental strategy. If short circuits due to dendrite formation can be sufficiently prevented even after repeated charge and discharge, nickel-zinc cells, zinc-air cells, and other cells having the above-mentioned safety and advantageous features may become widespread. It should be noted that the above problem occurs also in cells including electrodes other than zinc anodes.

The present invention was made in view of the background, and an object of the present invention is to provide an electrode that is a zinc anode or an electrode of another type, and can prevent short circuits due to dendrite formation even after repeated charge and discharge, when incorporated in a cell, and provide a precursor thereof (the first object of the present invention).

Additionally, the present inventors focused on the potential suitability of zinc anodes in various applications in view of the following: zinc anodes can be produced at low cost, and allow for the use of a water-containing electrolyte solution; and the use of a water-containing electrolyte solution ensures safety and a high energy density. The present inventors examined the performance of cells including an anode containing zinc, and found that in order to meet the levels of cell performance desired in these days, changes in the form/shape of the active material should be improved first of all. The use of a solid electrolyte, specifically introduction of a solid electrolyte on and/or into an active material layer can be mentioned as a possible solution to this problem. However, conventional solid electrolytes have the following inherent problems: (1) in the process of forming a solid electrolyte or during charge or discharge, the solid electrolyte expands or contracts to cause, for example, cracks in an electrode active material layer, which deteriorates the contact between the active material, the solid electrolyte and a current collector, and in turn, results in deterioration and loss of the function of the electrode; (2) changes in, for example, the density of the active material during charge and discharge deteriorate the contact between the active material, the solid electrolyte and the current collector, resulting in deterioration and loss of the function of the electrode; and (3) the solid electrolyte has an insufficient ion conductivity.

The present invention was made in view of the above problems, and an object of the present invention is to provide a zinc anode in which a solid electrolyte that has high ion conductivity, and that expands and contracts to a small degree, for example, in the process of preparing a cell or during use of the cell is introduced on and/or into an active material layer to sufficiently prevent changes in the form/shape of the active material, and which allows for a cell with sufficiently improved cell performance, and provide a cell including the zinc anode (the second object of the present invention).

Solution to Problem

As for the first object of the present invention, dendrite formation is associated with deposition of a metal such as zinc on an electrode during charge. In the case of a cell including a zinc anode, the frequency of dendrite formation due to zinc deposition is very high because zinc is likely to crystallize even when a constant current is passed through the electrode surface. In order to prevent this phenomenon, the surface energy of zinc should be lowered as much as possible. One example of known strategies to control crystallization is to add an additional component such as indium to the electrode to form a coat of the component on the surface of zinc during charge.

Metal ions such as $Zn(OH)_4^{2-}$ migrate to a portion on the surface of an electrode which allows electric currents to flow easily during repeated charge/discharge cycles. In the case where zinc metal is deposited and exposed on parts of the surface of an electrode as a result of repeated charge/discharge cycles to allow electric currents to flow easily through the parts, the concentration of metal ions such as $Zn(OH)_4^{2-}$ is increased in and around the parts. If an additional component for preventing dendrite formation is used in the electrode as described above, the component for preventing dendrite formation may be consumed in the parts with an increased zinc concentration. As a result, dendrite formation may not be sufficiently prevented. Therefore, in order to basically prevent dendrite formation, a mechanism for preventing movement (diffusion) of metal ions such as $Zn(OH)_4^{2-}$ is necessary in addition to the strategies to decrease the surface energy of zinc.

Based on this idea, the present inventors have conducted various studies to achieve an electrode that is designed to be able to reduce the surface energy of an active material, and to prevent dendrite growth and short circuits due to dendrite growth, sufficiently prevents diffusion of metal ions such as $Zn(OH)_4^{2-}$ to prevent localization of the metal ions, and maintains these functions and therefore is able to prevent short circuits due to dendrite formation even after repeated charge/discharge cycles.

The present inventors have focused on an active material layer of an electrode, and conducted various studies to find a way to prevent metal ions such as $Zn(OH)_4^{2-}$ from diffusing from the active material layer. Finally, the present inventors have found that the following effects can be achieved by using, in a nickel-zinc cell or a zinc-air cell, a zinc anode in which an anion conducting material containing a polymer and at least one compound that contains at least one element selected from elements of groups 1 to 17 of the periodic table, and is selected from the group consisting of an oxide, a hydroxide, a layered double hydroxide, a sulfuric acid compound, and a phosphoric acid compound is used to cover an active material and/or an active material layer: dendrite growth and short circuits due to dendrite growth are prevented; diffusion of a metal ion such as $Zn(OH)_4^{2-}$ is sufficiently prevented to avoid localization of the metal ion and local consumption of the compound; and the effect to prevent short circuits due to dendrite growth is remarkably exerted even after repeated charge/discharge cycles. Since the anion conducting material allows anions involved in cell reactions, such as hydroxide ion, to sufficiently permeate it, this strategy makes it possible to maintain good anion conductivity, and at the same time allows for prevention of dendrite growth.

In addition, since the use of such an anion conducting material sufficiently reduces diffusion of metal ions, short circuits caused by invasion of a metal ion into a separator can be avoided without using a complex structure, such as a laminate of porous membranes with fine pores, as a separator. Therefore, the separator may be, for example, a low-cost, easy-to-produce, single-layer nonwoven fabric. Or, the anion conducting material itself may function as a separator. Conventionally, additives for anodes have been limited to those that do not have any influence on cathodes. In contrast, the structure in which the anode active material and/or the anode active material layer is/are covered with the anion conducting material reduces diffusion of additives, and therefore eliminates the limitation on additives for the anode. At the same time, since diffusion of additives in the cathode to the anode is also reduced, the limitations on additives for the cathode can also be eliminated. When a cathode active material and/or a cathode active material layer is/are also covered with the anion conducting material, diffusion of additives in the cathode and the anode can be reduced. This eliminates the limitations on additives for the cathode and the anode. Since decomposition of additives in an electrolyte solution during charge and discharge is also prevented, the limitations on additives for the electrolyte solution can also be eliminated.

Such an anion conducting material, when used not only in the zinc anode of a nickel-zinc cell or a zinc-air cell but also in various other electrodes, also allows ions involved in cell reactions to sufficiently permeate it, prevents dendrite growth and short circuits due to dendrite growth, and prevents diffusion of metal ions, thereby sufficiently preventing short circuits due to dendrite growth even after repeated charge/discharge cycles. Thus, the present inventors have completed the present invention.

Patent Literature 4 teaches a zinc anode active material for zinc alkaline secondary cells which is covered with a specific hydroxide. However, the invention of Patent Literature 4 does not produce the effects of the present invention since the anion conducting material does not contain a combination of a polymer and a compound containing at least one element selected from elements of groups 1 to 17 of the periodic table.

Patent Literature 5 discloses a composite electrode including a specific percent by volume of an ion conductive matrix, and the remaining percent by volume of an electrode material. Unlike the present invention, the invention of Patent Literature 5 is merely characterized in that a specific percent by volume of an ion conducting material and an electrode material are mixed, and an active material and/or an active material layer is/are not covered with the anion conducting material. Therefore, the effects of the present invention cannot be achieved by the invention of Patent Literature 5. Non Patent Literature 1 discloses the use of zinc-aluminum-hydrotalcite as an anode material for a nickel-zinc secondary cell. However, this document is also silent about covering an active material and/or an active material layer with an anion conducting material in the manner of the present invention. The electrode of the present invention can produce effects that could not have been achieved by such conventional electrodes.

Specifically, the present invention provides an electrode including: a current collector; and an active material layer containing an active material, wherein the electrode further includes an anion conducting material, the anion conducting material contains a polymer and a compound containing at least one element selected from elements of groups 1 to 17 of the periodic table, and the active material and/or the active material layer is/are covered with the anion conducting material, and the compound is at least one compound selected from the group consisting of an oxide, a hydroxide, a layered double hydroxide, a sulfuric acid compound, and a phosphoric acid compound. Hereinafter, the invention relating to the electrode is also referred to as the first aspect of the present invention.

The present invention also relates to a cell including the electrode according to the first aspect of the present invention, an electrolyte, and a separator.

The first aspect of the present invention further includes an electrode precursor including: a current collector; and an electrode mix composition containing an active material, wherein the electrode precursor further includes a mixture, the mixture contains a polymer and a compound containing at least one element selected from elements of groups 1 to 17 of the periodic table, and is deposited to partially or completely cover the electrode mix composition, and the compound is at least one compound selected from the group consisting of an oxide, a hydroxide, a layered double hydroxide, a sulfuric acid compound, and a phosphoric acid compound. The mixture is a material that will turn into an anion conducting material, and is preferably in the form of powder, a pate, or a slurry mixture.

As for the second object of the present invention, the present inventors have studied various zinc anodes, focused on, as a strategy to sufficiently prevent changes in the form/shape of the active material, introducing a solid electrolyte that expands and contracts slightly, upon, for example, preparation and operation of a cell, on and/or into the active material layer, and studied various zinc anodes to achieve high electrode performance in the presence of a solid electrolyte.

Finally, the present inventors have found that: in a conventional zinc anode with a solid electrolyte introduced on and/or into an active material layer, the solid electrolyte expands and contracts, for example, upon formation of the solid electrolyte or during charge or discharge, resulting in partial or complete disconnection between the active material and a conductive auxiliary agent or between these and the current collector; and this causes loss of an electron conduction path between the active material and the conductive auxiliary agent or between these and the current collector, which prevents smooth oxidation-reduction reactions of the active material. Additionally, the present inventors have found other problems such as cracks in the electrode active material layer. Another finding is that in a zinc anode including a solid electrolyte introduced on and/or into an active material layer, the ion conductivity between the surface of the active material and the solid electrolyte tends not to be sufficiently high. Thus, the present inventors have found that conventional zinc anodes including a solid electrolyte introduced on and/or into an active material layer have the above-mentioned specific problems, and their electrode performance is poor due to these problems. In view of this, the present inventors have conducted various studies to achieve a zinc anode that ensures both electron conduction paths and ion conduction paths, can avoid deterioration of the electrode performance, and is not prone to problems such as cracks in the electrode active material layer. Finally, the present inventors have found that in the case of a solid electrolyte which contains at least one compound selected from the group consisting of a polyvalent ion, an inorganic compound, and a nitrogen-containing organic compound, and in which the polyvalent ion and/or the inorganic compound contain(s) at least one element selected from Li, Na, K, Rb, Cs, elements of groups 2 to 14, P, Sb, Bi, elements of group 16, and elements of group 17 of the periodic table, expansion and contract of the solid electrolyte can be prevented to prevent or reduce changes in the volume of the solid electrolyte, and thereby to ensure electron conduction paths, and the possibility of problems such as cracks in the electrode active material layer can be eliminated. Another finding is that the use of at least one compound selected from the group consisting of a polyvalent ion, an inorganic compound, and a nitrogen-containing organic compound ensures ion conduction paths and confers sufficiently high ion conductivity. Thus, the present inventors have found that a zinc anode having such features can prevent deterioration of the electrode performance, and can be a means to solve the above problems. Zinc anodes having the above features are more suited as anodes for cells. Additionally, the use of such a zinc anode in a cell allows for use of a water-containing electrolyte solution, and therefore results in a highly safe cell.

These patent literatures do not state that in the zinc anodes of the above-mentioned cells, a solid electrolyte containing at least one specific compound selected from the group consisting of a polyvalent ion, an inorganic compound, and a nitrogen-containing organic compound is introduced on and/or into an active material layer. The cells of these patent literatures fail to sufficiently prevent deformation of the anode active material in the zinc anode, and to exhibit good electrode performance, and thus should be improved to sufficiently overcome the above-mentioned problems.

Specifically, the present invention provides an anode including: a current collector; and an active material layer containing an active material, wherein the anode further includes a solid electrolyte on and/or in the active material layer, the solid electrolyte contains at least one compound selected from the group consisting of a polyvalent ion, an inorganic compound, and a nitrogen-containing organic compound, the polyvalent ion and/or the inorganic compound contain(s) at least one element selected from Li, Na, K, Rb, Cs, elements of groups 2 to 14, P, Sb, Bi, elements of group 16, and elements of group 17 of the periodic table, and the active material contains a zinc species. Hereinafter, the invention relating to the anode is also referred to as the second aspect of the present invention. The term "zinc anode" herein refers to a zinc electrode for use as an anode.

The present invention also relates to the zinc anode wherein the solid electrolyte is a solid electrolyte containing a polymer.

The present invention further relates to the zinc anode wherein the at least one compound selected from the group consisting of a polyvalent ion, an inorganic compound, and a nitrogen-containing organic compound has anion conductivity.

The present invention further relates to the zinc anode wherein the inorganic compound is at least one compound selected from the group consisting of an oxide, a hydroxide, a layered double hydroxide, a clay-like compound, and a sulfuric acid compound. The term "hydroxide" herein refers to hydroxides other than layered double hydroxides.

The present invention further relates to a cell including: the zinc anode according to the second aspect of the present invention; a cathode; a separator; and an electrolyte.

The following is offered to describe the present invention in detail.

Combinations of two or more preferable embodiments of the present invention described herein are also preferable embodiments of the present invention.

First, the electrode according to the first aspect of the present invention and the zinc anode according to the second aspect of the present invention are described in this order. The electrode according to the first aspect of the present invention and the zinc anode according to the second aspect of the present invention may be each designed to have preferable features of the other.

<Electrode According to the First Aspect of the Present Invention>

The electrode according to the first aspect of the present invention includes a current collector, and an active material layer containing an active material, and further includes an anion conducting material. The active material and/or the active material layer is/are covered with the anion conducting material.

The expression "to cover the active material and/or the active material layer" means that when the electrode is incorporated in a cell, the active material and the active material layer are at least partially covered in such a manner to prevent the active material from being in direct contact with electrolytes. It is preferable that when the electrode according to the first aspect of the present invention is incorporated in a cell, the active material and the active material layer are at least partially covered in such a manner to prevent substantially the whole active material of the electrode from being in direct contact with the electrolyte.

In the electrode according to the first aspect of the present invention, the reactions between the active material and an electrolyte occur typically with the participation of the anion conducting material. Therefore, a cell including the electrode according to the first aspect of the present invention undergoes electrochemical reactions as a cell.

The phrase "the active material . . . is/are covered with the anion conducting material" means that each particle of the active material in the active material layer is covered with the anion conducting material, and specifically means, for example, a state formed by covering an active material for forming the active material layer with the anion conducting material in advance, and then forming the active material layer with the active material covered with the anion conducting material. Only the active material may be covered with the anion conducting material, or a mixture containing additional materials for an active material layer, such as a conductive auxiliary agent and an additional additive, in addition to the active material may be covered with the anion conducting material. For example, each active material particle 213 in the active material layer may be covered with the anion conducting material 210, as shown in FIG. 5. In FIG. 5, although an electrolyte is present in the area enclosed by a solid line, the anion conducting material 210 covering the active material particles 213 prevents the active material particles 213 from being in direct contact with the electrolyte. The same applies to the examples shown in FIGS. 1 and 4 described later.

The expression "to cover the active material layer" means that the active material layer of the electrode is completely or partially covered, and typically refers to a state formed by forming the active material layer using the active material optionally together with materials for the active material layer other than the active material, and then covering the active material layer with the anion conducting material. In one preferable embodiment, the whole active material layer of the electrode is covered. In the case where the active material layer of the electrode consists of some units, each unit may be individually covered. When the active material layer is covered with the anion conducting material, the structure can also be expressed as "each of units containing a certain amount of the active material is covered with the anion conducting material". For example, the following structures can be mentioned: as shown in FIG. 1, the electrode includes only one active material layer 13, and the whole active material layer 13 is covered with the anion conducting material 10; and as shown in FIG. 4, the active material layer 113 consists of some units, and each unit is covered with the anion conducting material 110. Although the cell shown in FIG. 4 includes an electrode in which the active material layer 113 consists of three units, and each unit is covered with the anion conducting material 110, the active material layer may consist of two units, or three or more units.

A larger size of the unit(s) of the active material and/or the active material layer covered with the anion conducting material corresponds to more improved electric conductivity in the active material. In particular, the electric conductivity in the active material can be improved, for example, by the structure in which the electrode includes only one active material layer 13 and the whole active material layer 13 is covered with the anion conducting material 10, as shown in FIG. 1. On the other hand, when the units of the active material and/or the active material layer covered with the anion conducting material are smaller, the structure is more effective in sufficiently preventing short circuits due to dendrite formation. In particular, short circuits due to dendrite formation can be sufficiently prevented, for example, by the structure in which each active material particle 213 in the active material layer is covered with the anion conducting material 210, as shown in FIG. 5.

Each active material particle in the active material layer may be covered with the anion conducting material such that the active material layer is partially or completely covered, or such that each unit of the active material layer is covered. In the case where the active material layer of the electrode consists of some units, one or two or more units may be individually covered with the anion conducting material, and each active material particle in the remaining units may be covered with the anion conducting material.

In the case where the anion conducting material is formed to cover the active material layer of the electrode, the electrode according to the first aspect of the present invention may further include insulating protection members made of an insulating material that is different from the anion conducting material, and the surface of the active material layer may be partially covered with the insulating protection members. In this case, the area of the active material layer excluding the areas covered with the protection members should be partially or completely covered with the anion conducting material. In one preferable embodiment, the whole area of the active material layer excluding the areas covered with the protection members is covered with the anion conducting material. For example, in the case where, as shown in FIG. 6, peripheral portions including end portions of the main surface and the end faces of the active material layer 313 are sealed with the insulating protection members 315, the center portion of the main surface of the active material layer 313 excluding the areas covered with the protection members 315 should be covered with the anion conducting material 310. The protection members 315 improve the physical strength of the electrode. Owing to their insulating properties, the insulating protection members 315 covering the peripheral portions of the active material layer 313 insulate the peripheral portions of the active material layer 313 where a current tends to concentrate. In particular, the structure in which the peripheral portions of the active material layer 313 are insulated prevents the electrode active material (e.g. zinc active material) from concentrating at the peripheral portions of the active material layer 313, and improves the cycle life. The insulating protection members 315 preferably cover the whole peripheral portions of the active material layer 313, but may only partially cover the peripheral portions.

Another possible structure is shown in FIG. 7 in which the active material layer 413 consists of some units bordered by the protection members 417, the active material is contained in each unit, both end faces of the whole structure of the active material layer 413 are covered with the insulating protection members 415 instead of the anion conducting material, and the remaining main surface of the active material layer 413 excluding the surfaces covered with the insulating protection members 415 is covered with the anion conducting material 410. The protection member 417 as well as the anion conducting material 410 and the insulating protection members 415 prevents dispersion of ions. The cell shown in FIG. 7 includes an electrode in which the active material layer 413 consists of five units bordered by four protection members 417. The active material layer may consist of units bordered by one to four protection members, or units bordered by five or more protection members. In the case of a cell including such an electrode as shown in FIG. 7, the anion conducting material 410 is disposed on a surface of the active material where a current flows in cell reactions, and the insulating protection members 415 or the protection members 417 are disposed on the surfaces of the active material excluding the surface where a current flows in cell reactions. This structure is more effective in limiting movement of ions excluding movement involved in electrode reactions, and therefore improves the life of the cell. The protection members 417 sectioning the active material layer may be insulative or may be conductive. In particular, the members are preferably made of an ion non-conductive material which does not allow ions to pass therethrough. In one preferable embodiment of the first aspect of the present invention, in the case of a cell having such a structure, the anion conducting material is formed to cover a surface of the active material where a current flows in cell reactions, the electrode further includes protection members different from the anion conducting material, and the protection members are arranged to cover surfaces of the active material excluding the surface where a current flows in cell reactions.

The expression "the surface of the active material where a current flows in cell reactions" refers to a surface of the active material where a current flowing from the cathode to the anode in cell reactions flows. Preferably, this surface of the active material lies along a direction substantially perpendicular to the direction of current flow. The expression "the surfaces of the active material excluding the surface where a current flows in cell reactions" refers to surface areas where a current flowing from the cathode to the anode in cell reactions substantially does not flow. Preferably, these surfaces of the active material lie along a direction substantially parallel to the direction of current flow. The insulating protection members 415 preferably cover the whole peripheral portions of the active material layer 413, but may only partially cover the peripheral portions.

In the case where the anion conducting material is deposited to cover the active material layer of the electrode, and where at least one surface of the active material layer of the electrode is bonded to a current collector layer, the other surface of the active material layer which is not bonded to the current collector should be covered with the anion conducting material. In other words, the surface of the active material layer bonded to the current collector layer may not be covered with the anion conducting material, as long as the surface of the active material layer facing an electrolyte is covered with anion conducting material. In the case where the active material layer has only one surface facing an electrolyte, only this surface may be covered with the anion conducting material. In order to enhance the effects of the first aspect of the present invention, it is preferable that the active material layer has multiple surfaces facing an electrolyte, and all of these surfaces are covered with the anion conducting material.

In the case where the active material layer of the electrode is covered with the anion conducting material, the thickness of the anion conducting material covering the active material layer may be appropriately determined, and is preferably not less than 0.1 µm. The thickness is more preferably not less than 0.5 µm, and still more preferably not less than 1 µm. At the same time, the thickness is preferably, for example, not more than 50 mm, more preferably not more than 5 mm, and still more preferably not more than 1 mm.

The thickness of the anion conducting material can be measured using a micrometer or the like, or by cutting the electrode with a sharp tool, and observing the cross section with an electron microscope.

The expression "each active material particle is covered with the anion conducting material" means that the surface of each active material particle in the active material layer is covered with the anion conducting material. For example, active material particles may be present apart from one another but bonded to one another through the anion conducting material in the active material layer. Not all the active material particles in the active material layer may be covered with the anion conducting material, but substantially all the active material particles are preferably covered with the anion conducting material.

The active material particles may be in the form of, for example, fine powder, powder, particles, grains, scale-like particles, polyhedral particles, rod-like particles, or partially round particles. The active material particles may include not only primary particles but also secondary particles which are aggregates of primary particles.

The thickness of the electrode according to the first aspect of the present invention is preferably not less than 1 nm and not more than 10000 μm in terms of, for example, cell structure and prevention of separation of the active material from the current collector. The thickness is more preferably not less than 10 nm, and still more preferably not less than 20 nm. At the same time, the thickness is more preferably not more than 1500 μm, and still more preferably not more than 1000 μm.

The thickness of the electrode can be measured using a micrometer, a step gauge, a profile measuring device, or the like.

The electrode according to the first aspect of the present invention may be either a cathode or an anode, and is preferably an anode. The electrode according to the first aspect of the present invention may further include components commonly used in electrodes in addition to the above-mentioned components.

In the following, the anion conducting material, the protection members, the active material layer, and the current collector of the electrode according to the first aspect of the present invention are described in more detail in this order.

(Anion Conducting Material of Electrode)

The anion conducting material according to the first aspect of the present invention contains a polymer and a compound containing at least one element selected from elements of groups 1 to 17 of the periodic table. The compound is at least one compound selected from the group consisting of an oxide, a hydroxide, a layered double hydroxide, a sulfuric acid compound, and a phosphoric acid compound, and may further contains an additional component described below.

The anion conducting material according to the first aspect of the present invention having the above features tends to allow anions involved in cell reactions, such as hydroxide ion, to permeate it, and sufficiently prevents dispersion of metal ions with a large ionic radius among other anions. The terms "anion conductivity" and "anion conductive" herein refer to the ability of the material to allow anions with a small ionic radius, such as hydroxide ion, to sufficiently permeate it or the permeability to the anions. Anions with a large ionic radius such as metal ions are less likely to permeate the material, and may not permeate the material at all. The anion conducting material according to the first aspect of the present invention selectively allows the anions involved in cell reactions to permeate it, and is less likely to allow metal ions with a large ionic radius to permeate it. In the case where the anion conducting material is used, for example, in a zinc anode, anions involved in cell reactions, such as hydroxide ion, are more likely to permeate it, and metal ions, such as $Zn(OH)_4^{2-}$, are less likely to permeate it. This ensures sufficiently high cell performance, prevents short circuits due to dendrite formation, and deformation and passivation of the active material, and thus is remarkably effective in elongating the cycle life. In some cases, the anion conducting material can be designed to allow Li, Na, Mg, and Zn ions (cations), which have a relatively small ionic radius, to permeate it.

The anion conducting material may be in the form of gel with a three-dimensional structure. The anion conducting material may or may not have pores on the surface or in the inside thereof, as long as the effects of the first aspect of the present invention are ensured. For example, it preferably has pores in terms of improved anion conductivity in some cases. In other cases, it preferably does not have pores in terms of more effective prevention of dispersion of metal ions.

In the following, the compound containing at least one element selected from elements of groups 1 to 17 of the periodic table (also simply referred to as inorganic compound herein), the polymer, and an additional component in the anion conducting material according to the first aspect of the present invention are described in this order.

[Inorganic Compound]

The inorganic compound preferably contains at least one element selected from the group consisting of alkali metals, alkaline earth metals, Sc, Y, lanthanides, Ti, Zr, Hf, V, Nb, Ta, Cr, Mo, W, Mn, Fe, Ru, Co, Ni, Pd, Cu, Ag, Au, Zn, Cd, B, Al, Ga, In, Tl, C, Si, Ge, Sn, Pb, N, P, Sb, Bi, S, Se, Te, F, Cl, and Br. In particular, the inorganic compound is preferably a compound containing at least one element selected from elements of groups 1 to 15 of the periodic table, and preferably a compound containing at least one element selected from the group consisting of Li, Na, K, Cs, Mg, Ca, Sr, Ba, Sc, Y, lanthanides, Ti, Zr, Nb, Cr, Mn, Fe, Ru, Co, Ni, Pd, Cu, Ag, Au, Zn, Cd, B, Al, Ga, In, Tl, C, Si, Ge, Sn, Pb, N, P, Sb, and Bi. More preferred is a compound containing at least one element selected from the group consisting of Li, Mg, Ca, Sr, Ba, Sc, Y, lanthanides, Ti, Zr, Nb, Cr, Mn, Fe, Ru, Co, Ni, Pd, Cu, Zn, Cd, B, Al, Ga, In, Tl, C, Si, Sn, Pb, N, P, and Bi.

The inorganic compound is at least one compound selected from the group consisting of an oxide, a hydroxide, a layered double hydroxide, a sulfuric acid compound, and a phosphoric acid compound.

The oxide is preferably, for example, an oxide containing at least one element selected from the group consisting of alkali metals, Mg, Ca, Sr, Ba, Sc, Y, lanthanides, Ti, Zr, Hf, V, Nb, Ta, Cr, Mo, W, Mn, Fe, Ru, Co, Ni, Pd, Cu, Ag, Au, Zn, Cd, B, Al, Ga, In, Tl, C, Si, Ge, Sn, N, P, Sb, Bi, S, Se, Te, F, Cl, and Br. Preferred among others are compounds containing at least one element selected from elements of groups 1 to 15 of the periodic table. Oxides containing at least one element selected from the group consisting of Li, Na, K, Cs, Mg, Ca, Sr, Ba, Sc, Y, lanthanides, Ti, Zr, Nb, Cr, Mn, Fe, Ru, Co, Ni, Pd, Cu, Ag, Au, Zn, Cd, B, Al, Ga, In, Tl, C, Si, Ge, Sn, Pb, N, P, Sb, and Bi are preferred. More preferred are oxides containing at least one element selected from the group consisting of Li, Na, Mg, Ca, Sr, Ba, Sc, Y, lanthanides, Ti, Zr, Nb, Cr, Mn, Fe, Ru, Co, Ni, Pd, Cu, Zn, Cd, B, Al, Ga, In, Tl, Si, Sn, Pb, and Bi. Still more preferred are magnesium oxide, calcium oxide, strontium oxide, barium oxide, bismuth oxide, cobalt oxide, cerium oxide, niobium oxide, tin oxide, and zirconium oxide, and particularly preferred are magnesium oxide, bismuth oxide, cerium oxide, niobium oxide, tin oxide, and zirconium oxide. Cerium oxide may be doped with a metal oxide such as samarium oxide, gadolinium oxide, or bismuth oxide, or may be a solid solution with a metal oxide such as zirconium oxide. The oxide may have an oxygen vacancy.

Preferred examples of the hydroxide include magnesium hydroxide, calcium hydroxide, strontium hydroxide, barium hydroxide, cerium hydroxide, and zirconium hydroxide. The term "hydroxide" herein refers to any hydroxides excluding layered double hydroxides.

Preferred examples of the layered double hydroxide include hydrotalcite. The use thereof remarkably improves the anion conductivity of the anion conducting material.

The hydrotalcite is preferably a compound represented by the following formula (1):

(wherein $M^1$ is Mg, Fe, Zn, Ca, Li, Ni, Co, Cu, or the like; $M^2$ is Al, Fe, Mn, or the like; A is $CO_3^{2-}$ or the like, m is a positive number of 0 or larger, n is 2 or 3, x satisfies about 0.20≤x≤about 0.40). This compound may be dehydrated by firing at 150° C. to 900° C.; or interlayer anions in the compound may be decomposed or exchanged with hydroxide ions or the like. Alternatively, natural minerals such as $Mg_6Al_2(OH)_{16}CO_3 \cdot mH_2O$ may be used as the inorganic compounds. The hydrotalcite may be coordinated with a compound having a hydroxyl, amino, carboxyl, or silanol group. An organic compound may be present between layers.

A preferred example of the sulfuric acid compound is ettringite.

A preferred example of the phosphoric acid compound is hydroxyapatite.

Hydroxyapatite is a compound typically represented by $Ca_{10}(PO_4)_6(OH)_2$. A compound containing less Ca which can be prepared by controlling the preparation conditions or a hydroxyapatite compound into which an element other than Ca has been introduced may be used as the inorganic compound.

When combined with materials for an electrolyte solution, an electrolyte solution, a (gel) electrolyte, or the like, the inorganic compound may become dissolved, dispersed into a colloid, or may not be dissolved, and thus may become in any form. A compound whose surface is partially positively or negatively charged is preferable. The charged state of particles can be estimated, for example, by measuring the zeta potential. These inorganic compounds may interact with the functional group of the polymer via a covalent bond or a non-covalent bond such as a coordination bond, an ionic bond, a hydrogen bond, a n bond, a van der Waals bond, or agostic interaction, as described later. In the case of using a layered compound such as hydrotalcite, the polymer may be present between layers or an organic compound may be present between layers. The inorganic compound may be combined with materials for an electrolyte solution, an electrolyte solution, a (gel) electrolyte, and the like under a condition in which the surface of the compound is not positively or negatively charged (a condition corresponding to the isoelectric point).

The inorganic compound preferably includes particles that meet a later-described requirement of the average particle size and/or a later-described requirement of the specific surface area. More preferably, the inorganic compound consists of particles that satisfy a later-described requirement of the average particle size and/or a later-described requirement of the specific surface area.

The inorganic compound preferably has an average particle size of not more than 1000 μm. The average particle size is more preferably not more than 200 μm, still more preferably not more than 100 μm, particularly preferably not more than 75 μm, and most preferably not more than 20 μm. At the same time, the average particle size is preferably not less than 5 nm, and more preferably not less than 10 nm.

The average particle size can be measured using a particle size distribution analyzer.

Particles of the inorganic compound may be in the form of, for example, fine powder, powder, particles, grains, scale-like particles, polyhedral particles, rod-like particles, and partially round particles. Particles with an average particle size within the above range can be obtained, for example, by grinding particles using a ball mill or the like, dispersing the coarse particles in a dispersant to become a desired particle size, and drying the particles; by sieving the coarse particles to separate particles with a desired particle size; or optimizing the conditions for preparing particles to selectively prepare (nano)particles with a desired particle size.

The specific surface area of the inorganic compound is preferably not less than 0.01 m$^2$/g. The specific surface area is more preferably not less than 0.1 m$^2$/g, and still more preferably not less than 0.5 m$^2$/g. At the same time, the specific surface area is preferably not more than 1500 m$^2$/g, more preferably not more than 500 m$^2$/g, still more preferably not more than 450 m$^2$/g, and particularly preferably not more than 400 m$^2$/g.

The specific surface area can be measured by nitrogen absorption BET using a specific surface area measuring device or the like. Particles with a specific surface area within the above range can be prepared, for example, by processing particles into nanoparticles, or controlling the conditions for preparing particles to form irregularities on the surfaces of particles.

The inorganic compound preferably has an aspect ratio (vertical/lateral) of not less than 1.1. The aspect ratio (vertical/lateral) is more preferably 2 or more, still more preferably 3 or more. At the same time, the aspect ratio (vertical/lateral) is preferably 100000 or less, more preferably 50000 or less.

The aspect ratio (vertical/lateral) can be determined, for example, from the particle shape observed by SEM. For example, in the case where each particle of the inorganic compound has a rectangular parallelepiped shape, the aspect ratio can be determined by dividing the vertical length by the lateral length, where the vertical means the longest side and the lateral means the second longest side. In the case of other shapes, the aspect ratio can be determined as follows: a particle is placed such that a certain one point faces downward and the particle is projected to two dimensions from the direction that provides the maximum aspect ratio; then, the distance between the certain one point and the farthest point therefrom is measured; and the aspect ratio is determined by dividing the vertical length by the lateral length, where the vertical means the longest side and the lateral means the longest side among the straight lines crossing the center of the vertical axis.

Inorganic compound particles having an aspect ratio (vertical/lateral) within the above range can be obtained by, for example, selecting the particles having such an aspect ratio, or optimizing preparation conditions during particle production to selectively produce such particles.

The proportion by mass of the inorganic compound is preferably 0.1% by mass or more relative to 100% by mass of the anion conducting material. The proportion is more preferably 0.5% by mass or more, still more preferably 1% by mass or more, further preferably 3% by mass or more, and particularly preferably 20% by mass or more. At the same time, the proportion is preferably 99.9% by mass or less, more preferably 99% by mass or less, still more preferably 75% by mass or less, further preferably less than 70% by mass, particularly preferably less than 60% by mass, and most preferably less than 55% by mass.

The use of the inorganic compound in a proportion by mass within the above range provides the effects of the first aspect of the present invention, and additionally is effective in preventing cracks in the anion conducting material. In particular, the layered double hydroxide is preferably used in a proportion by mass within the above range.

[Polymer]

Examples of the polymer according to the first aspect of the present invention include hydrocarbon moiety-containing polymers such as polyethylene, and aromatic group-containing polymers such as polystyrene; ether group-containing polymers such as alkylene glycol; hydroxyl group-containing polymers such as polyvinyl alcohol; amide group-containing polymers such as polyacrylamide; imide group-containing polymers such as polymaleimide; carboxyl group-containing polymers such as poly(meth)acrylic acid; carboxylate-containing polymers such as poly(meth)acrylate; halogen-containing polymers such as polyvinylidene fluoride and polytetrafluoroethylene; sulfonate moiety-containing polymers; quaternary ammonium salt- and quaternary phosphonium salt-containing polymers; ion-exchange polymers; natural rubber; synthetic rubber such as styrene butadiene rubber (SBR); saccharides such as hydroxyalkyl cellulose (e.g., hydroxyethyl cellulose) and carboxymethyl cellulose; and amino group-containing polymers such as polyethyleneimine. In particular, the polymer preferably contains at least one selected from the group consisting of an aromatic group, a halogen atom, a carboxyl group, a carboxylate group, a hydroxyl group, an amino group and an ether group, or is preferably a hydrocarbon. Preferred examples of the halogen atom include fluorine, chlorine, and bromine. More preferred is fluorine. Preferred examples of the carboxylate group include a lithium carboxylate group, a sodium carboxylate group, and a potassium carboxylate group. More preferred is a sodium carboxylate group. Examples of the hydrocarbon include polyolefin. Preferably, an appropriate polymer is appropriately selected considering collectively, in particular, all the following three features: (1) insulating properties; (2) ability to increase the viscosity of particles of the anion conducting material and bond the particles; and (3) high physical strength. In terms of these features, hydrocarbon moiety-containing polymers, aromatic group-containing polymers, ether group-containing polymers, carboxyl group-containing polymers, carboxylate group-containing polymers, halogen-containing polymers, sulfonate moiety-containing polymers, quaternary ammonium salt- or quaternary phosphonium salt-containing polymers, and sugars are preferable. The polymer may be fibrillated when exposed to heat, pressure or the like. The properties, such as strength and anion conductivity, of the active material (layer) or the anion conducting material can be controlled by fibrillation of the polymer.

The polymer can be prepared from monomer(s) corresponding to units of the polymer by radical (co)polymerization, anionic (co)polymerization, cationic (co)polymerization, graft (co)polymerization, living (co)polymerization, dispersion (co)polymerization, emulsion (co)polymerization, suspension (co)polymerization, ring-opening (co)polymerization, cyclic (co)polymerization, photopolymerization, UV polymerization, electron beam polymerization, metathesis (co)polymerization, electrolytic (co)polymerization, or the like. In the case where the polymer has a functional group, the functional group may be present in the main chain and/or a side chain, and may be present as a binding site to a crosslinking agent. The polymer may be of a single kind or may be a combination of two or more kinds.

The polymer may be crosslinked via an organic crosslinking compound that is different from than the inorganic compound. Since the use of a crosslinked polymer that is absorbent of water may result in cracks in the anion conducting material, a crosslinked polymer that is not absorbent of water is preferable.

The weight average molecular weight of the polymer is preferably 200 to 7000000. This allows for control of the properties, such as ion conductivity, viscosity, flexibility, and strength, of the anion conducting material. The weight average molecular weight is more preferably 400 to 6500000, and still more preferably 500 to 5000000.

The weight average molecular weight can be measured by gel permeation chromatography (GPC) or using a UV detector.

The proportion by mass of the polymer is preferably not less than 0.1% by mass relative to 100% by mass of the anion conducting material. The proportion is more preferably not less than 1% by mass, still more preferably not less than 25% by mass, further preferably more than 30% by mass, particularly preferably more than 40% by mass, and most preferably more than 45% by mass. At the same time, the proportion is preferably not more than 99.9% by mass, more preferably not more than 99.5% by mass, still more preferably not more than 99% by mass, further preferably not more than 97% by mass, and particularly preferably not more than 80% by mass. This is effective in preventing cracks in the anion conducting material, and remarkably enhances the effects of the first aspect of the present invention.

The ratio by mass of the polymer to the inorganic compound in the anion conducting material according to the first aspect of the present invention is preferably 5000000/1 to 1/100000. The ratio is more preferably 2000000/1 to 1/50000, still more preferably 1000000/1 to 1/10000, further preferably 1000000/1 to 1/100, further more preferably 100/3 to 75/100, and particularly preferably 100/50 to 75/100. In the case where the inorganic compound in the anion conducting material according to the first aspect of the present invention is hydrotalcite, and meets the above mass ratio requirement, both the effect of improving the anion conductivity of the anion conducting material and the effect of preventing cracks are remarkably improved.

[Additional Component]

The anion conducting material according to the first aspect of the present invention may further contain an additional component, as long as it contains the polymer and the inorganic compound.

The additional component is not particularly limited, and may include one or two or more of, for example: clay compounds; solid solutions; alloys; zeolite; halides; carboxylate compounds; carbonic acid compounds; hydrogen carbonate compounds; nitric acid compounds; sulfonic acid compounds; phosphorous acid compounds; hypophosphorous acid compounds, and boric acid compounds; silic acid compounds; alminic acid compounds; sulfites; onium compounds; salts; and organic compounds. The additional component is a compound different from the inorganic compound and the polymer. For example, the additional component can be used to improve the ion conductivity, or may be removed by, for example, a solvent, heat, firing, or electric means to form pores in the anion conducting material.

The preferable average particle size of the additional component is the same as the preferable average particle size of the inorganic compound.

The average particle size of the additional component can be measured in the same manner as the average particle size of the inorganic compound.

The shape of particles of the additional component and how to prepare particles of the additional component with a desired average particle size are the same as the shape of the inorganic compound and how to prepare particles of the inorganic compound with a desired average particle size.

The preferable range of the specific surface area of particles of the additional component, how to measure the specific surface area, and how to prepare particles of the additional component with a desired specific surface area are the same as the preferable range of the specific surface area of the inorganic compound, how to measure the specific surface area of the inorganic compound, and how to prepare particles of the inorganic compound with a desired specific surface area.

The preferable range of the aspect ratio (vertical/lateral) of the additional component, how to measure the aspect ratio, and how to prepare particles of the additional component with a desired aspect ratio are the same as the preferable range of the aspect ratio (vertical/lateral) of the inorganic compound, how to measure the aspect ratio of the inorganic compound, and how to prepare particles of the inorganic compound with a desired aspect ratio.

In the case of using the additional component, the proportion by mass of the additional component is not less than 0.001% by mass relative to 100% by mass of the anion conducting material. The proportion is more preferably not less than 0.01% by mass, and still more preferably not less than 0.05% by mass. At the same time, the proportion is preferably not more than 90% by mass, more preferably not more than 70% by mass, and still more preferably not more than 45% by mass. The additional component may not be used at all.

Each of the polymer, the inorganic compound, and the additional component in the anion conducting material according to the first aspect of the present invention may be of a single kind, or may be a combination of two or more kinds. In the case where the polymer is a combination of two or more kinds, the above-mentioned mass of the polymer refers to the total mass of the two or more kinds of polymers, unless otherwise specified. In the case where the inorganic compound or the additional component is a combination of two or more kinds, their masses are likewise defined.

(Protection Member of Electrode)

In one preferable embodiment of the electrode according to the first aspect of the present invention, the electrode further includes protection members. Preferably, the protection members seal peripheral portions including end portions of the main surface and the end faces of the active material layer, seal the end faces of the active material layer, or are inserted between units of the active material layer, as described above, in the case where the active material layer consists of several units.

Examples of materials for the protection members include the substances mentioned as examples for "[polymer]" in the anion conducting material according to the first aspect of the present invention, later-described separators such as nonwoven fabrics, porous members made of polyethylene, polytetrafluoroethylene or the like, and the above-mentioned inorganic compounds. In the case where the protection members are inserted between units of the active material layer, the polymer or porous members constituting the protection members are present in electrolyte layers. This prevents, for example, dissolution of the active material and dispersion of zincate ions, and is effective in preventing deformation of the active material. The state in which the porous members constituting the protection members are present in electrolyte layers is also expressed herein as "the active material layer includes the porous members". For example, the inorganic compound and the additional component in the anion conducting material according to the first aspect of the present invention or materials for the active material can also be appropriately used for the protection members. The protection members may be made of any one of these materials or a combination of two or more. The ion conductivity can be further reduced or eliminated by forming initial structures of the protection members with the polymer, and coating the surfaces of the structures with an inorganic material.

It should be noted that protection materials used to seal peripheral portions including end portions of the main surface and the end faces of the active material layer or to seal the end faces of the active material layer, among the above-mentioned protection materials, are insulative. Appropriate materials that confer insulating properties can be selected from the above-described materials based on the technical knowledge of the field of the first aspect of the present invention. The protection members inserted between units of the active material layer may be insulative or may be conductive.

(Active Material Layer of Electrode)

The active material layer according to the first aspect of the present invention contains the active material, and may further contain a conductive auxiliary agent and an additional additive. In the following, the active material, the conductive auxiliary agent, the additional additive in the active material layer according to the first aspect of the present invention are described in this order.

[Active Material]

The active material in the active material layer according to the first aspect of the present invention may be a cathode active material, or an anode active material, and is preferably an anode active material.

In the case where the electrode according to the first aspect of the present invention is an anode, examples of the anode active material include anode active materials generally used in cells such as carbon species, lithium species, sodium species, magnesium species, cadmium species, lead species, zinc species, tin species, silicon-containing materials, hydrogen storage alloy materials, and noble metal materials such as platinum. In particular, the active material in the electrode according to the first aspect of the present invention preferably contains a zinc species. This remarkably improves the effect of preventing short circuits due to dendrite formation. The term "zinc species" refers to a zinc-containing compound. The zinc species may be any compound that is repeatedly oxidized and reduced while the cell works, as long as it contains zinc.

The zinc-containing compound may be any compound that is usable as an active material. Examples thereof include zinc oxide (No. 1/No. 2/No. 3 according to JIS K1410 (2006)), zinc (alloy) compounds containing at least one element selected from the group consisting of elements of groups 1 to 17 of the periodic table, such as zinc hydroxide, zinc sulfate, tetrahydroxy zinc alkali metal salts, tetrahydroxy zinc alkaline earth metal salts, zinc halogen compounds, zinc carboxylate compounds, zinc alloys, zinc solid solutions, zinc borate, zinc phosphate, zinc hydrogen phosphate, zinc silicate, zinc aluminate, carbonic acid compounds, hydrogen carbonate compounds, nitric acid compounds, and sulfuric acid compounds, organic zinc compounds, and zinc compound salts. In particular, zinc oxide (No. 1/No. 2/No. 3 according to JIS K1410 (2006)), zinc hydroxide, tetrahydroxy zinc alkali metal salts, tetrahydroxy zinc alkaline earth metal salts, zinc halogen compounds, zinc carboxylate compounds, zinc alloys, zinc solid solutions, zinc borate, zinc phosphate, zinc silicate, zinc aluminate, zinc carbonate, and zinc (alloy) compounds containing at least one element selected from the group consisting of elements of groups 1 to 17 of the periodic table are preferable. The zinc alloys may be zinc alloys for use in (alkaline) dry cells or air cells. Any of these zinc-containing compounds may be used alone or in combination of two or more.

The zinc-containing compound may be in the form of particles such as fine powder, powder, grains, fine grains, scale-like particles, fibers, granules, polyhedral particles, rod-like particles, rectangular parallelepiped particles, cylindrical particles, or partially round particles.

The specific surface area of the zinc-containing compound is preferably not less than 0.01 $m^2/g$. The specific surface area is more preferably not less than 0.1 $m^2/g$, and still more preferably not less than 0.2 $m^2/g$. At the same time, the specific surface area is preferably not more than 200 $m^2/g$.

The specific surface area can be measured using a specific surface area measuring device or the like. Particles with a specific surface area within the above range can be prepared, for example, by processing particles into nanoparticles, or controlling the conditions for preparing particles to form irregularities on the surfaces of particles.

The zinc-containing compound preferably includes particles that meet the requirement of the average particle size and/or the requirement of the aspect ratio. More preferably, the zinc-containing compound meets the requirement of the average particle size and/or the requirement of the aspect ratio.

The average particle size of the zinc-containing compound is preferably 1 nm to 500 μm, more preferably 5 nm to 100 μm, still more preferably 10 nm to 20 μm, and particularly preferably 100 nm to 10 μm.

The zinc-containing compound preferably has an average particle size of 100 nm to 100 μm, as measured using a particle size distribution analyzer after combining particles of the zinc-containing compound with deionized water, and dispersing the particles for 5 minutes by ultrasonic radiation. The average particle size is more preferably 200 nm to 50 μm, and still more preferably 300 nm to 10 μm. The mode diameter is preferably 50 nm to 20 μm, more preferably 70 nm to 10 μm, and still more preferably 100 nm to 5 μm. The median diameter is preferably 100 nm to 10 μm, more preferably 150 nm to 7 μm, and still more preferably 500 nm to 5 μm.

In the case where the zinc-containing compound is in a measurable form such as rectangular parallelepiped, cylindrical, spherical, partially round, polyhedral, scale-like, or rod-like particles, the aspect ratio (vertical/lateral) of the zinc-containing compound is preferably 1.1 to 100000, more preferably 1.2 to 50000, and still more preferably 1.5 to 10000. The absence of particles that meet the ranges of the average particle size and the aspect ratio may cause, for example, deterioration of the cycle characteristics accompanying deformation or passivation of the anode active material, and self-discharge in the charged state or during storage in the charged state.

The average particle size can also be determined using a scanning electron microscope (SEM). The aspect ratio (vertical/lateral) is determined by observing the shapes of particles by a SEM. For example, in the case where the particles are rectangular parallelepiped particles, the aspect ratio can be determined by dividing the vertical length by the lateral length, where the vertical means the longest side and the lateral means the second longest side. For particles with a cylindrical, spherical, or partially round, or polyhedral shape or the like, the aspect ratio can be determined as follows: a particle is placed such that a certain one point faces downward and the particle is projected to two dimensions from the direction that provides the maximum aspect ratio; then, the distance between the certain one point and the farthest point therefrom is measured; and the aspect ratio is determined by dividing the vertical length by the lateral length, where the vertical means the longest side and the lateral means the longest side among the straight lines crossing the center of the vertical axis.

In the case where the electrode according to the first aspect of the present invention is a cathode, examples of the cathode active material include cathode active materials generally used in primary or secondary cells. Examples include nickel-containing compounds such as nickel oxyhydroxide, nickel hydroxide, and cobalt-containing nickel hydroxide; manganese-containing compounds such as manganese dioxide; silver oxide; lithium-containing compounds such as lithium cobaltate; iron-containing compounds; and cobalt-containing compounds.

The cathode active material may be oxygen (in the case where the cathode active material is oxygen, the cathode is an air electrode made of a compound that can reduce oxygen and oxidize water, such as a perovskite compound, a cobalt-containing compound, an iron-containing compound, a copper-containing compound, a manganese-containing compound, a vanadium-containing compound, a nickel-containing compound, an iridium-containing compound, a platinum-containing compound, a palladium-containing compound, a gold-containing compound, a silver-containing compound, or a carbon-containing compound).

In particular, oxygen, a manganese-containing compound, and a nickel-containing compound are preferable. Namely, the cathode is more preferably a nickel electrode, a manganese electrode, or an air electrode.

The active material content in the active material layer is preferably 50 to 99.9% by mass relative to 100% by mass of the active material layer in total. When the active material content is within this range, the use of the electrode including an active material layer in a cell ensures much better cell performance. The active material content is more preferably 55 to 99.5% by mass, and still more preferably 60 to 99% by mass. The active material, when used in a storage cell with a water-containing electrolyte solution, may accelerate a side reaction of decomposing water during use of the cell. In order to prevent this side reaction, a specific element may be introduced into the active material. Examples of the specific element include Al, B, Ba, Bi, Br, C, Ca, Cd, Ce, Cl, Cu, Eu, F, Ga, Hg, In, La, Mg, Mn, N, Nb, Nd, Ni, P, Pb, S, Sb, Sc, Si, Sm, Sn, Sr, Ti, Tl, Y, and Zr.

The expression "a specific element is introduced into the active material" means that the active material is formed into a compound containing such an element as its constituent element.

[Conductive Auxiliary Agent]

The active material layer preferably contains a conductive auxiliary agent as well as the electrode active material (cathode active material or anode active material).

Examples of the conductive auxiliary agent include conductive carbon, conductive ceramics; zinc, zinc powder, and zinc alloys, zinc for use in (alkaline) (storage) cells or air cells (hereinafter, collectively referred to as zinc metal); and metals such as copper, brass, nickel, silver, bismuth, indium, lead, and tin.

Examples of the conductive carbon include graphite such as natural graphite and artificial graphite, glassy carbon, amorphous carbon, soft graphitized carbon, hard graphitized carbon, carbon nanofoam, activated carbon, graphene, nanographene, graphene nanoribbon, fullerenes, carbon black, graphitized carbon black, Ketjen black, vapor grown carbon fibers, pitch-based carbon fibers, mesocarbon microbeads, metal-coated carbon, carbon-coated metals, fibrous carbon, boron-containing carbon, nitrogen-containing carbon, single- or multi-layer carbon nanotubes, carbon nanohorn, VULCAN, acetylene black, carbon having been made hydrophilic by introducing an oxygen-containing functional group, SiC-coated carbon, carbon surface-treated by dispersion, emulsion, suspension, or microsuspension polymerization or the like, and microcapsule carbon.

Examples of the conductive ceramics include compounds that were prepared by firing in the presence of zinc oxide and contain at least one selected from Bi, Co, Nb, and Y.

Preferred among other conductive auxiliary agents are graphite such as natural graphite and artificial graphite, soft carbon, hard carbon, graphene, carbon black, graphitized carbon black, Ketjen black, vapor grown carbon fibers, pitch-based carbon fibers, mesocarbon microbeads, fibrous carbon, single- or multi-layer carbon nanotubes, VULCAN, acetylene black, carbon having been made hydrophilic by introducing an oxygen-containing functional group, zinc metal, and metals such as copper, brass, nickel, silver, bismuth, indium, lead, and tin. The zinc metal may be any of those used in practical cells such as alkaline (storage) cells and air cells, may be any of those surface-coated by other elements or carbon, or may be alloyed. Alternatively, it may be in the form of a solid solution. Any of these conductive auxiliary agents may be used alone or in combination of two or more.

The zinc metal can function as an active material as well. In other words, the zinc metal, which is a conductive auxiliary agent, also functions as an active material involved in redox reactions during use of the cell. Additionally, zinc metal which is produced from the zinc-containing compound serving as an active material during use of the cell also functions as a conductive auxiliary agent. Thus, zinc metal and zinc-containing compounds which are used as a mix upon preparation of an electrode (e.g. anode) practically function as both an active material and a conductive auxiliary agent during use of the cell.

The conductive auxiliary agent, when used in a storage cell with a water-containing electrolyte solution, may accelerate a side reaction of decomposing water during use of the cell. In order to prevent this side reaction, a specific element may be introduced into the conductive auxiliary agent. Examples of the specific element include Al, B, Ba, Bi, Br, C, Ca, Cd, Ce, Cl, Cu, Eu, F, Ga, Hg, In, La, Mg, Mn, N, Nb, Nd, Ni, P, Pb, S, Sb, Sc, Si, Sm, Sn, Sr, Ti, Tl, Y, and Zr. In the case of using conductive auxiliary agents including conductive carbon as one of them, the specific element is preferably Al, B, Ba, Bi, C, Ca, Cd, Ce, Cu, F, Ga, In, La, Mg, Mn, N, Nb, Nd, Ni, P, Pb, S, Sb, Sc, Si, Sn, Ti, Tl, Y, or Zr.

The expression "a specific element is introduced into the conductive auxiliary agent" means that the conductive auxiliary agent is formed into a compound containing such an element as its constituent element.

The conductive auxiliary agent content in the active material layer is preferably 0.0001 to 100% by mass relative to 100% by mass of the active material in the active material layer. When the conductive auxiliary agent content is within this range, the use of the electrode including an active material layer in a cell ensures much better cell performance. The conductive auxiliary agent content is more preferably 0.0005 to 60% by mass, and still more preferably 0.001 to 40% by mass.

In the case of preparing an electrode mix using zinc metal, the zinc metal is treated not as an active material but as a conductive auxiliary agent in calculation. Zinc metal generated from a zinc-containing compound such as zinc oxide or zinc hydroxide during use of the cell also functions as a conductive auxiliary agent in the system, but it is not zerovalent zinc metal in the preparation of a zinc anode mix or zinc anode. Thus, this zinc metal is not considered as a conductive auxiliary agent in this case, and is considered as an active material in calculation. Namely, the preferable active material content and conductive auxiliary agent content are calculated considering the zinc-containing compound used in the preparation of a zinc anode mix or zinc anode as an active material and zinc metal as a conductive auxiliary agent.

The average particle size of the conductive auxiliary agent is preferably 1 nm to 500 μm. The average particle size is more preferably 5 nm to 200 μm, still more preferably 10 nm to 100 μm, and most preferably 10 nm to 60 μm.

The average particle size of the conductive auxiliary agent can be determined in the same manner for determining the average particle size of the inorganic compound.

The specific surface area of the conductive auxiliary agent is preferably not less than 0.1 $m^2/g$, and more preferably not less than 1 $m^2/g$. At the same time, the specific surface area is preferably not more than 1500 $m^2/g$, more preferably not more than 1200 $m^2/g$, still more preferably not more than 900 $m^2/g$, further preferably not more than 250 $m^2/g$, and particularly preferably not more than 50 $m^2/g$.

Controlling the specific surface area of the conductive auxiliary agent within the above range is effective in, for example, preventing deformation and passivation of the active material during use of the cell.

The specific surface area can be measured in the same manner for measuring the specific surface area of the inorganic compound.

[Additional Additive]

The active material layer according to the first aspect of the present invention may further contain at least one selected from the group consisting of compounds containing at least one element selected from the group consisting of elements of groups 1 to 17 of the periodic table, organic compounds, and organic compound salts.

(Current Collector of Electrode)

Examples of the current collector include (electrodeposited) copper foil, copper meshes (expandable metals), foamed copper, punched copper, copper alloys (e.g. brass), brass foil, brass meshes (expandable metals), foamed brass, punched brass, nickel foil, corrosion-resistant nickel, nickel meshes (expandable metals), punched nickel, zinc metal, corrosion-resistant zinc metal, zinc foil, zinc meshes (expandable metals), (punched) steel plates, and conductive nonwoven fabrics; Ni, Zn, Sn, Pb, Hg, Bi, In, Tl, or brass-containing (electrodeposited) copper foil, copper meshes (expandable metals), foamed copper, punched copper, copper alloys (e.g. brass), brass foil, brass meshes (expandable metals), formed brass, punched brass, nickel foil, corrosion-resistant nickel, nickel meshes (expandable metals), punched nickel, zinc metal, corrosion-resistant zinc, zinc foil, zinc meshes (expandable metals), (punched) steel plates, and nonwoven fabrics; Ni, Zn, Sn, Pb, Hg, Bi, In, Tl, or brass-plated (electrodeposited) copper foil, copper meshes (expandable metals), foamed copper, punched copper, copper alloys (e.g. brass), brass foil, brass meshes (expandable metals), foamed brass, punched brass, nickel foil, corrosion-resistant nickel, nickel meshes (expandable metals), punched nickel, zinc metal, corrosion-resistant zinc metal, zinc foil, zinc meshes (expandable metals), (punched)

steel plates, and nonwoven fabrics; silver; materials used as a current collector or a container in alkaline (storage) cells or air zinc cells.

The electrode according to the first aspect of the present invention is preferably an electrode prepared by a later-described method for preparing the electrode according to the first aspect of the present invention. In particular, it is preferably an electrode prepared by a later-described preferable method for preparing the electrode according to the first aspect of the present invention.

<Method for Preparing Electrode According to the First Aspect of the Present Invention>

The following describes a method for preparing the electrode according to the first aspect of the present invention.

The electrode according to the first aspect of the present invention can be prepared by the steps of: preparing the anion conducting material for covering the active material and/or the active material layer by, for example, coating with or, pressure-bonding, bonding, electric welding, rolling, stretching, or melting of a composition containing the polymer, the inorganic compound, and optionally the additional component onto the active material; and forming the active material layer containing the electrode active material by, for example, coating with, or pressure-bonding, bonding, electric welding, rolling, stretching, or melting of an electrode mix composition (e.g. cathode mix composition or anode mix composition) containing the electrode active material optionally covered with the anion conducting material, and optionally containing the conductive auxiliary agent and the additional additive onto a current collector. The order of these steps is not particularly limited, and can be appropriately determined as described below depending on the state of the anion conducting material covering the active material and/or the active material layer. The preferable kinds, proportions, and the like of the active material, conductive auxiliary agent, and additional additive for the active material layer, the kinds, proportions, and the like of the polymer, inorganic compound, and additional component for the anion conducting material are the same as those described above for the electrode according to the first aspect of the present invention.

(Method for Preparing Anion Conducting Material)

The following can be mentioned as an example of methods for preparing the anion conducting material according to the first aspect of the present invention.

The polymer, the inorganic compound, and optionally the additional component are mixed. Preferably, the polymer, the inorganic compound, and the like are mixed in the anion conducting material according to the first aspect of the present invention. The mixing is accomplished using a mixer, a blender, a kneader, a bead mill, a ready mill, a ball mill or the like. In the mixing, water, an organic solvent such as methanol, ethanol, propanol, isopropanol, butanol, hexanol, tetrahydrofuran, or N-methylpyrrolidone, or a solvent mixture of water and an organic solvent may be added. Before or after mixing, particles may be, for example, put through a sieve to obtain particles with a predetermined particle size. The mixing may be a wet process in which liquid components such as water and an organic solvent are added to solid components, or may be a dry process performed using only solid components without adding liquid components. In the case of the wet process, after mixing the components, liquid components such as water or an organic solvent may be removed by drying the mixture. The wet process and the dry process may be combined. The mixing may be performed under elevated or reduced pressure or at elevated temperature. A spray, laser, or the like may be used, and a mechanochemical, sol-gel, or coprecipitation method may be used.

By the preparation method described above, a slurry or paste mixture containing the polymer, the inorganic compound, and other components is prepared.

Next, in the case where the active material layer of the electrode according to the first aspect of the present invention consists of one unit, and where the whole unit is covered with the anion conducting material, the active material layer is formed by a later-described method for forming the active material layer of the electrode, and then the slurry or paste mixture containing the polymer, the inorganic compound, and other components is applied to the surface of the active material layer which is to face an electrolyte when the electrode is incorporated in a cell by, for example, coating, pressure-bonding, bonding, electric welding, rolling, stretching, or melting to a thickness as uniform as possible. It is preferable that the anion conducting material is deposited in such a manner to cover the active material layer by integrating the slurry or paste mixture with the active material layer by, for example, coating, pressure-bonding, bonding, electric welding, rolling, stretching, or melting, or repeatedly applying the slurry or paste mixture to the active material layer and drying the slurry or paste mixture. Thus, in the case where the active material layer of the electrode consists of one unit, and where the whole unit of the active material layer is covered with the anion conducting material, the step of depositing the anion conducting material is typically performed after the step of forming the active material layer on the current collector. As long as the active material layer is finally formed, the anion conducting material may be deposited before forming the active material layer on the current collector. The layer may have a flat surface or a curved surface.

In the case where each active material particle in the electrode according to the first aspect of the present invention is covered with the anion conducting material, the active material particles are covered in advance with the anion conducting material by, for example, reaction of the slurry or paste mixture containing the polymer, the inorganic compound, and other components with the active material particles, or coating, pressure-bonding, stirring, bonding, electric welding, rolling, stretching, or melting of the slurry or paste mixture onto the active material particles. Alternatively, the active material particles may be covered with the anion conducting material, for example, by bonding the slurry or paste mixture onto the active material particles by stirring, electric welding, deposition, spraying, laser radiation, or the mechanochemical, sol-gel, or coprecipitation method, or by repeatedly applying the slurry or paste mixture to the active material particles and drying the slurry or paste mixture. The active material layer is formed using, as a raw material, the thus-obtained active material particles covered with the anion conducting material by a later-described method for forming an active material layer of an electrode. Specifically, an electrode mix composition containing active material particles covered with the anion conducting material is prepared and applied to the current collector by, for example, coating, pressure-bonding, bonding, electric welding, rolling, stretching, or melting. Thus, the electrode according to the first aspect of the present invention in which each active material particle is covered with the anion conducting material can be prepared. As long as each active material particle can be covered with the anion conducting material, other methods may be used. An example of such methods is as follows: an active material layer which is not covered with the anion conducting material is formed on each active material particle, and then the anion conducting material is formed by, for example, coating, pressure-bonding, bonding, electric welding, rolling, stretching, melting, or deposition of the slurry or paste mixture containing the polymer, the inorganic compound, and other components onto the active material layer, and the anion conducting material thus obtained is introduced into the active material layer and/or to the active material particles by means of heat, pressure, a solvent or the like. The layer may have a flat surface or a curved surface.

The slurry or paste mixture may be applied to one surface or both surfaces of the current collector by, for example, coating, pressure-bonding, bonding, electric welding, rolling, stretching, or melting. During and/or after the coating, pressure-bonding, bonding, electric welding, rolling, stretching, or melting, the slurry or paste mixture is dried at 0° C. to 400° C. At this time, the polymer in the slurry or paste mixture may be molten. The drying temperature is more preferably 15° C. to 380° C. The drying may be performed in vacuo or under reduced pressure. The drying time is preferably between 5 minutes to 48 hours. The coating and drying steps may be performed repeatedly. It is preferable to perform pressing using a roll pressing machine or the like at a pressure of normal pressure to 20 t before and after drying the slurry or paste mixture. The pressing pressure is more preferably normal pressure to 15 t. The pressing may be performed while the temperature is elevated at 10° C. to 400° C. The pressing step may be performed only once, or may be performed multiple times. In the pressing, the adhesion between the active material particles, between the active material and the binder, and between the active material and the current collector can be improved, and the amounts of active material, and the thickness, strength, flexibility, and the like of the active material layer can be controlled.

(Method for Forming Active Material Layer of Electrode)

The following is one example of methods for forming the active material layer of the electrode.

The electrode mix composition used to form the active material layer can be prepared by mixing the active material optionally covered with the anion conducting material and optionally the conductive auxiliary agent and the additional additive. The mixing is accomplished using a mixer, a blender, a kneader, a bead mill, a ready mill, a ball mill or the like. In the mixing, water, an organic solvent such as methanol, ethanol, propanol, isopropanol, butanol, hexanol, tetrahydrofuran, or N-methylpyrrolidone, or a solvent mixture of water and an organic solvent may be added. Before or after the mixing, particles may be, for example, put through a sieve or granulated to obtain particles with a predetermined particle size. The mixing may be a wet process in which liquid components such as water and an organic solvent are added to solid components, or may be a dry process performed using only solid components without adding liquid components. In the case of the wet process, after mixing the components, liquid components such as water and an organic solvent may be removed by drying the mixture. The wet process and the dry process may be combined. The mixing may be performed under elevated or reduced pressure or at elevated temperature. The polymer may be added as a binder, thickener, or the like.

For example, the electrode mix composition can be prepared by mixing the active material optionally covered with the anion conducting material optionally with the additional additive by the wet process, drying the mixture to remove liquid components, and mixing the resulting solid mixture with the conductive auxiliary agent by the dry process. The active material may be alloyed with a compound containing at least one element selected from the group consisting of elements of groups 1 to 17 of the periodic table, which is the additional additive. The element can be introduced into the zinc-containing compound by flowing a current through the electrode mix composition. Alternatively, a spray, laser, or the like may be used, or a mechanochemical, sol-gel, or coprecipitation method may be used.

The electrode mix composition is prepared in the form of a slurry or paste mixture by the above-mentioned preparation method. Next, the obtained slurry or paste mixture is applied to the current collector to a thickness as uniform as possible by, for example, coating, pressure-bonding, bonding, electric welding, rolling, stretching, and melting. At the same time as or after coating, pressure-bonding, bonding, electric welding, rolling, stretching, and melting of the electrode mix composition, the anion conducting material may be applied by, for example, coating, pressure-bonding, bonding, electric welding, rolling, stretching, or melting. The anion conducting material may be applied to the electrode mix composition in advance by, for example, coating, pressure-bonding, bonding, electric welding, rolling, stretching, or melting. A laminate or a structure other than laminates may be thus formed.

The slurry or paste mixture may be applied to one surface or both surfaces of the current collector by, for example, coating, pressure-bonding, bonding, electric welding, rolling, stretching, or melting. During and/or after the coating, pressure-bonding, bonding, electric welding, rolling, stretching, or melting, the slurry or paste mixture is dried at 0° C. to 400° C. At this time, the polymer in the slurry or paste mixture may be molten. The drying temperature is more preferably 15° C. to 380° C. The drying may be performed in vacuo or under reduced pressure. The drying time is preferably between 5 minutes to 48 hours. The coating and drying steps may be performed repeatedly. It is preferable to perform pressing using a roll pressing machine or the like at a pressure of normal pressure to 20 t before and after drying the slurry or paste mixture. The pressing pressure is more preferably normal pressure to 15 t. The pressing may be performed while the temperature is elevated at 10° C. to 500° C. The pressing step may be performed only once, or may be performed multiple times. In the pressing, the adhesion between the active material particles, between the active material and the binder, and between the active material and the current collector can be improved, and the thickness, strength, flexibility, and the like of the active material layer can be controlled.

The active material content in the electrode mix composition is preferably 40 to 99.9% by mass relative to 100% by mass of the electrode mix composition in total. When the active material content is within this range, the use of an electrode made from the electrode mix composition in a cell ensures much better cell performance. The active material content is more preferably 45 to 99.5% by mass, and still more preferably 50 to 99% by mass.

In the case of preparing an anode mix using zinc metal, the zinc metal is treated not as an active material but as a conductive auxiliary agent in calculation of the active material content and conductive auxiliary agent content in the electrode mix composition. The zinc-containing compound used in the preparation of an anode mix is treated not as a conductive auxiliary agent but as an active material in the calculation.

Alternatively, after the active material layer in which each active material particle is covered with the anion conducting material is formed, the anion conducting material may be further deposited to cover the active material layer. Through these steps, an electrode in which both the active material layer and the active material particles are coated with the anion conducting material can be produced. This most remarkably improves the effect of preventing short circuits due to dendrite formation.

(Formation of Protection Member)

The protection members can be formed, for example, by applying a composition for the protection members to predetermined portions of the active material layer by, for example, coating, pressure-bonding, bonding, electric welding, rolling, stretching, or melting, or molding the composition using a die. Typically, the protection members can be formed at any time after forming the active material layer of the electrode, and can be formed before or after deposition of the anion conducting material.

The electrode according to the first aspect of the present invention thus obtained ensured permeability to anions involved in cell reactions, such as hydroxide ion, and sufficiently prevents dispersion of metal ions, and therefore sufficiently prevents short circuits due to dendrite formation, when used, in particular, as an anode in a secondary cell. This ensures sufficiently high cell performance, prevents short circuits due to dendrite formation, and therefore improves the cycle life.

<Precursor of Electrode According to the First Aspect of the Present Invention>

The first aspect of the present invention provides an electrode precursor including a current collector and an electrode mix composition containing an active material, wherein the electrode precursor further includes a mixture, the mixture contains a polymer and a compound containing at least one element selected from elements of groups 1 to 17 of the periodic table, and is deposited to partially or completely cover the electrode mix composition, and the compound is at least one compound selected from the group consisting of an oxide, a hydroxide, a layered double hydroxide, a sulfuric acid compound, and a phosphoric acid compound.

The first aspect of the present invention also provides a mixture containing a polymer and a compound containing at least one element selected from elements of groups 1 to 17 of the periodic table. The mixture according to the first aspect of the present invention is preferably a mixture for covering an active material. A laminate consisting of two layers of the mixture and the electrode mix composition to be an active material layer is also one of the first aspect of the present invention.

The electrode mix composition and the mixture are preferably in the form of powder, pastes, or slurry mixtures. They may be any compositions that are able to maintain their shape to a certain extent, and can be respectively formed into the active material layer and the anion conducting material of the electrode according to the first aspect of the present invention by, for example, coating, pressure-bonding, bonding, electric welding, rolling, stretching, or melting. In one preferable embodiment, the whole electrode mix composition is covered with the mixture.

The features of the electrode precursor according to the first aspect of the present invention are the same as the corresponding features described above for the electrode according to the first aspect of the present invention and the preparation method thereof. The features of the mixture and electrode mix composition according to the first aspect of the present invention are the same as the features of the slurry or paste mixture, and the electrode mix composition described above.

The above-mentioned features of the electrode according to the first aspect of the present invention apply to the zinc anode according to the second aspect of the present invention described below, unless otherwise specified.

In the following, the zinc anode according to the second aspect of the present invention is described first.

(Zinc Anode According to the Second Aspect of the Present Invention)

The zinc anode according to the second aspect of the present invention is typically designed such that zinc oxide is coupled to a conductive auxiliary agent, and these materials are coupled to a current collector. This structure sufficiently maintains electron conduction paths for electron transmission between zinc oxide and the conductive auxiliary agent and between these materials and the current collector. A solid electrolyte containing a specific polyvalent ion and/or a specific inorganic compound, or a nitrogen-containing organic compound improves the ion conductivity of the ion conduction path between the surface of the active material and the solid electrolyte.

Next, the solid electrolyte of the zinc anode according to the second aspect of the present invention is described.

The solid electrolyte on and/or in the active material layer of the zinc anode according to the second aspect of the present invention prevents deformation such as changes in the shape of the electrode active material or formation of dendrites, dissolution, corrosion, and passivation, and provides an effect of ensuring cell performance such as high cycle characteristics, discharge rate characteristics, and coulombic efficiency. The solid electrolyte may or may not have pores on the surface and in the inside thereof. If possible, it is preferably free from pores.

The solid electrolyte contains at least one compound selected from the group consisting of a polyvalent ion, an inorganic compound, and a nitrogen-containing organic compound. These compounds are expected to function as a solid electrolyte due to interaction with an electrolyte, an electrolyte solution, the active material, the polymer, or the like, or interaction among these compounds, for example. Each of the polyvalent ion, the inorganic compound, and the nitrogen-containing organic compound may be of a single kind or may be a combination of two or more kinds.

The solid electrolyte preferably contains an inorganic compound.

The inorganic compound may be any compound containing at least one element selected from Li, Na, K, Rb, Cs, elements of groups 2 to 14, P, Sb, Bi, elements of group 16, and elements of group 17 of the periodic table, and examples include oxides containing at least one element selected from the group consisting of alkali metals, alkaline earth metals, Sc, Y, lanthanides, Ti, Zr, Hf, V, Nb, Ta, Cr, Mo, W, Mn, Re, Fe, Ru, Co, Rh, Ir, Ni, Pd, Pt, Cu, Ag, Au, Zn, Cd, B, Al, Ga, In, Tl, Si, Ge, Sn, Pb, P, Sb, Bi, S, Se, Te, F, Cl, Br, and I; complex oxides; alloys; layered double hydroxides such as hydrotalcite; hydroxides; clay compounds; solid solutions; zeolite; halides; carboxylate compounds; carbonic acid compounds; hydrogen carbonate compounds; nitric acid compounds; sulfuric acid compounds; sulfonic acid compounds; sulfonate compounds; phosphoric acid compounds such as hydroxyapatite; phosphorous acid compounds; hypophosphorous acid compounds, boric acid compounds; silic acid compounds; alminic acid compounds; sulfites; onium compounds; and salts. Preferred examples include oxides containing at least one element selected from the above-mentioned group of elements; complex oxides; alloys; layered double hydroxides such as hydrotalcite; hydroxides; clay compounds; solid solutions; zeolite; fluorides; carbonic acid compounds; sulfuric acid compounds; phosphoric acid compounds such as hydroxyapatite; boric acid compounds; silic acid compounds; alminic acid compounds; and salts.

In particular, the inorganic compound preferably has anion conductivity. The inorganic compound is more preferably at least one compound selected from the group consisting of, for example, oxides, hydroxides, layered double hydroxides, clay compounds and sulfuric acid compounds. It is still more preferably at least one compound selected from the group consisting of aluminum oxide (hydrate), bismuth oxide (hydrate), indium oxide (hydrate), calcium oxide (hydrate), yttrium oxide (hydrate), magnesium oxide (hydrate), strontium oxide (hydrate), barium oxide (hydrate), lanthanum oxide (hydrate), titanium oxide (hydrate), gallium oxide (hydrate), cerium oxide (hydrate), niobium oxide (hydrate), tin oxide (hydrate), zirconium oxide (hydrate), cerium hydroxide, zirconium hydroxide, hydrotalcite and ettringite. Particularly preferred are aluminum oxide (hydrate), bismuth oxide (hydrate), indium oxide (hydrate), calcium oxide (hydrate), strontium oxide (hydrate), barium oxide (hydrate), yttrium oxide (hydrate), magnesium oxide (hydrate), lanthanum oxide (hydrate), titanium oxide (hydrate), gallium oxide (hydrate), cerium oxide (hydrate), niobium oxide (hydrate), tin oxide (hydrate), zirconium oxide (hydrate), and hydrotalcite.

The cerium oxide may be doped with a metal oxide such as samarium oxide, gadolinium oxide, or bismuth oxide, or may be a solid solution with a metal oxide such as zirconium oxide. The oxide may have an oxygen vacancy.

The hydrotalcite is as defined above in the first aspect of the present invention.

In the case where the solid electrolyte contains hydrotalcite and does not contain any polymer or oligomer, it is more preferable that a polyvalent ion and/or an inorganic compound besides the hydrotalcite is/are also used or the hydrotalcite used satisfies x=0.33.

The hydroxyapatite is as described in the first aspect of the present invention.

The inorganic compound may be generated in the solid electrolyte from a compound containing the above-mentioned element as a precursor. The inorganic compound, when combined with materials for an electrolyte solution, an electrolyte solution, a solid electrolyte (gel electrolyte), and the like, may become dissolved, dispersed into a colloid, or may not be dissolved, and thus may become in any form. A compound whose surface is partially positively or negatively charged is preferable. The charged state of particles can be estimated, for example, by measuring the zeta potential. As described later, in the case where the solid electrolyte contains the polymer, the inorganic compound interacts with the functional group of the polymer via a covalent bond or a non-covalent bond such as a coordination bond, an ionic bond, a hydrogen bond, a n bond, a van der Waals bond, or agostic interaction, and thereby is formed into a solid electrolyte. Even when the solid electrolyte does not contain the polymer, the solid electrolyte can be obtained. In this case, all needed in an electrolyte solution is the inorganic compound, and the ions in the electrolyte solution and the inorganic compound are expected to suitably interact with and bond each other. The polyvalent ion may also be present therein, and the elements in the polyvalent ion and the inorganic compound may be the same or different, but preferably include at least one different element. In the case of using a layered compound such as hydrotalcite, polymers or organic molecules may be formed and present between layers. The inorganic compound may be combined with materials for an electrolyte solution, an electrolyte solution, a solid electrolyte, and the like under a condition in which the surface of the compound is not positively or negatively charged (a condition corresponding to the isoelectric point). In this case, the preferable driving force for forming the solid electrolyte is not electric interaction but a coordinate bond or the like.

The polyvalent ion contains at least one element selected from Li, Na, K, Rb, Cs, elements of groups 2 to 14, P, Sb, Bi, elements of group 16, and elements of group 17 of the periodic table, more preferably contains at least one element selected from Mg, Ca, Sr, Ba, Sc, Y, La, Ce, Yb, Ti, Zr, Nb, Nd, Cr, Mo, W, Mn, Co, B, Al, Ga, In, Tl, Si, Ge, Sn, P, Sb, and Bi.

The polyvalent ion is an anion or cation generated by introducing, into materials for an electrolyte solution, an electrolyte solution, a solid electrolyte or the like, any of the following compounds: an oxide containing the element of the polyvalent ion; a complex oxide; a layered double hydroxide such as hydrotalcite; a hydroxide; a clay compound; a solid solution; an alloy; a halide; a carboxylate compound; a carbonic acid compound; a hydrogen carbonate compound; a nitric acid compound; a sulfuric acid compound; a sulfonic acid compound; a phosphoric acid compound; a phosphorous acid compound; a hypophosphorous acid compound, a boric acid compound; a silic acid compound; an alminic acid compound; a sulfite; an onium compound; a salt; or the like. The anion or cation may be produced by partially or completely dissolving the compound containing the element of the polyvalent ion in materials for an electrolyte solution, an electrolyte solution, a solid electrolyte, or the like. In the case where the compound containing the element of the polyvalent ion is insoluble, the compound may be one that generates the anion or cation on a part of the surface or the like when introduced into materials for an electrolyte solution, an electrolyte solution, a solid electrolyte, or the like. The polyvalent ion may be generated in the solid electrolyte from the compound containing the element as a precursor. In the case where the solid electrolyte contains the polymer, the polyvalent ion may be an ion derived from the polymer.

In the case where the solid electrolyte contains the polymer, the polyvalent ion is expected to interact with the functional group of the polymer via a covalent bond or a non-covalent bond such as a coordination bond, an ionic bond, a hydrogen bond, a n bond, a van der Waals bond, or agostic interaction, and thereby to be formed into a solid electrolyte, as described later.

Even when the solid electrolyte does not contain the polymer, the solid electrolyte can be obtained. In this case, as long as the polyvalent ion and the later-described inorganic compound coexist in an electrolyte solution, the ions in the electrolyte solution and the polyvalent ion are expected to suitably bind with the inorganic compound. In this case, the elements in the polyvalent ion and the inorganic compound may be the same or different, but preferably include at least one different element.

In the case where both the polyvalent ion and the inorganic compound are used, the ratio by mass of the polyvalent ion to the inorganic compound is preferably 50000/1 to 1/100000.

Examples of the nitrogen-containing organic compound include alkylenediamines such as ethylenediamine, substituted alkylenediamines such as ethylenediamine N-substituted with an alkyl group and/or an aromatic ring-containing group, polyethyleneimine, heterocyclic compounds such as bipyridine, imidazole, pyrazole, triazole, tetrazole, pyrazine, phenanthroline, and phenazine, and organic compounds having an azo, nitro, nitroso, or quaternary ammonium salt group.

The total amount of the at least one compound selected from the group consisting of a polyvalent ion, an inorganic compound, and a nitrogen-containing organic compound is preferably not less than 0.01% by mass in 100% by mass of the solid electrolyte. The amount is more preferably not less than 0.1% by mass, and still more preferably not less than 0.5% by mass. At the same time, the total amount of the compound is preferably not more than 99.9% by mass, more preferably not more than 98% by mass, and still more preferably not more than 95% by mass.

When a later-described water-containing electrolyte solution is used as an electrolyte solution in the preparation of the solid electrolyte, the compound that generates a polyvalent ion, the inorganic compound, and the nitrogen-containing organic compound contribute to high ion conductivity and absorption and transmission of gas generated during charge and discharge, prevent decomposition of water into hydrogen and oxygen which typically thermodynamically occurs as a side-reaction, deformation of the active material, dissolution, and corrosion, and remarkably improves the charge-discharge characteristics and the coulombic efficiency. This may be attributable to suitable interaction of the polyvalent ion, the inorganic compound, and the nitrogen-containing organic compound with the surface of the anode, and prevention of dispersion of the zinc-containing compound.

The solid electrolyte may be a solid electrolyte consisting of an electrolyte solution and at least one compound selected from the group consisting of a polyvalent ion, an inorganic compound, and a nitrogen-containing organic compound, or may be a solid electrolyte further containing a polymer or an oligomer. In the case where the solid electrolyte further contains an oligomer or polymer, the oligomer or polymer may interact with the at least one compound selected from the group consisting of a polyvalent ion, an inorganic compound, and a nitrogen-containing organic compound. The use of such a solid electrolyte is effective in physically and chemically limiting dispersion of ions, in particular, in the electrode and/or the surface thereof. This is expected to contribute prevention of deformation such as changes in the shape of the electrode active material and formation of dendrites, dissolution and corrosion. The use of such a solid electrolyte is also effective in preventing passivation and self-discharge in the charged state or during storage in the charged state. The effect of preventing passivation and self-discharge is also expected to be attributed to the above-mentioned effects of the solid electrolyte. A storage cell incorporating such a solid electrolyte maintains high electrical conductivity, and exhibits high cycle characteristics, discharge rate characteristics, and coulombic efficiency. Thus, the solid electrolyte is preferably used in storage (secondary) cells although it is usable in any of electrochemical devices such as primary cells, secondary cells, capacitors, and hybrid capacitors.

In the following, the term "polymer" is intended to include oligomers as well.

In one preferable embodiment of the second aspect of the present invention, the solid electrolyte contains a polymer. In the case where a polymer is used in the solid electrolyte, the polymer is preferably capable of forming a covalent bond or a non-covalent bond such as a coordinate bond, an ionic bond, a hydrogen bond, a n bond, or a van der Waals bond. More preferably, the polymer has a functional group that interacts with the polyvalent ion and/or the inorganic compound. In conventional cases, the binding site of the polymer is likely to be decomposed by an acidic or basic condition that is attributable to the electrolyte solution and/or an electrically loaded condition, and dissolved into the electrolyte solution, resulting in gradual deterioration of the solid electrolyte. In contrast, the polymer interacts with the at least one compound selected from the group consisting of a polyvalent ion, an inorganic compound, and a nitrogen-containing organic compound, and the functional group of the polymer functions as a binding site to the compound to form another compound with a structure that exerts preferable cell performance. This mechanism sufficiently prevents deterioration of the solid electrolyte, and as a result, deformation such as changes in the shape of the electrode active material and formation of dendrites, dissolution, corrosion, and passivation are continuously prevented, and self-discharge in the charged state or during storage in the charged state are also effectively and continuously prevented. Additionally, since expansion and contraction of the solid electrolyte, for example, upon formation of the solid electrolyte or during charge or discharge are prevented as much as possible, both the electron conduction paths and ion conduction paths are successfully ensured, which provides longer lasting high cell performance.

The kind and preparation method of the polymer used for the solid electrolyte are as described above for the polymer according to the first aspect of the present invention. Monomers as materials for the polymer may be used in the preparation of the electrode, and polymerized into the polymer during charge and discharge. In the case where the polymer has a functional group, the functional group may be present in the main chain and/or a side chain, and may function as a binding site to a crosslinking agent. The polymer may be of a single kind or may be a combination of two or more kinds. The polymer may be crosslinked via the same bond as described above in the first aspect of the present invention which involves an organic crosslinking agent other than the at least one compound selected from the group consisting of a polyvalent ion, an inorganic compound, and a nitrogen-containing organic compound.

The preferable range of the weight average molecular weight of the polymer is the same as that described in the first aspect of the present invention. When the weight average molecular weight is within this range, the solid electrolyte can be sufficiently formed. The strength of the resulting solid electrolyte can be controlled by, for example, controlling the molecular weight of the polymer or using polymers with different molecular weights or of different kinds to prevent deformation such as changes in the shape of the electrode active material and formation of dendrites, dissolution, corrosion, and passivation, also prevent self-discharge in the charged state or during storage in the charged state, maintain high ion conductivity, and most successfully ensure high cycle characteristics, discharge rate characteristics and coulombic efficiency. Additionally, it is possible to successfully transfer hydrogen and oxygen generated by a side-reaction at the cathode or the anode to the counter electrode, and consume these. The polymer may be fibrillated when exposed to heat, pressure or the like. The strength of the active material or the solid electrolyte, in other words, the interaction involving the polymer can be controlled by fibrillation of the polymer.

The method for measuring the weight average molecular weight is as described in the first aspect of the present invention.

The ratio by mass of the polymer to the at least one compound selected from the group consisting of a polyvalent ion, an inorganic compound, and a nitrogen-containing organic compound in the solid electrolyte is preferably 5000000/1 to 1/100000. When the ratio is within this range, deterioration of the solid electrolyte can be prevented, deformation such as shape changes and formation of dendrites, dissolution, corrosion, and passivation are also prevented, and self-discharge in the charged state or during storage in the charged state is effectively and continuously prevented. This provides longer lasting high cell performance. The ratio is more preferably 2000000/1 to 1/10000, still more preferably 1000000/1 to 1/1000, further preferably 1000000/1 to 1/100, further more preferably 100/3 to 75/100, and particularly preferably 100/50 to 75/100.

The inorganic compound, electrolyte solution, and polymer used in the preparation of the solid electrolyte are preferably deoxidized. The at least one compound selected from the group consisting of a polyvalent ion, an inorganic compound, and a nitrogen-containing organic compound, the electrolyte solution, and the polymer are preferably mixed in an inert atmosphere. Use of deoxidized materials and mixing thereof in an inert atmosphere result in a solid electrolyte having good electric characteristics. The dissolved oxygen concentration in the solid electrolyte is more preferably as close to 0 mg/L as possible. Lower concentrations of dissolved oxygen suppress dissolution of the zinc electrode active material into the electrolyte solution as much as possible, thereby suppressing changes in shape, dissolution, and corrosion of the zinc electrode active material and lengthening the electrode life. In the case of a strongly alkaline aqueous solution-containing electrolyte solution, contamination of carbon dioxide may cause generation of a large amount of carbonates, which may deteriorate the conductivity, and affect the storage cell performance. Thus, it is preferable to remove dissolved carbon dioxide simultaneously through the above operation.

The solid electrolyte interacts with the at least one compound selected from the group consisting of a polyvalent ion, an inorganic compound, and a nitrogen-containing organic compound, and the use of such a solid electrolyte in a storage cell prevents deformation such as changes in the shape of the electrode active material and formation of dendrites, dissolution, corrosion, and passivation, also prevents self-discharge in the charged state or during storage in the charged state, maintains high ion conductivity, and ensures high cycle characteristics, discharge rate characteristics, and coulombic efficiency. Additionally, since expansion and contraction of the solid electrolyte, for example, upon formation of the solid electrolyte or during charge or discharge are prevented as much as possible, both the electron conduction paths and ion conduction paths are successfully ensured. The solid electrolyte can also be suitably used in a primary cell to prevent deformation of the electrode active material, maintain high ion conductivity, and ensure high discharge rate characteristics.

Since the solid electrolyte improves various characteristics of storage cells as described above, the cell according to the second aspect of the present invention is a storage cell in one preferable embodiment of the second aspect of the present invention.

The solid electrolyte on and/or in the active material layer of the zinc anode according to the second aspect of the present invention may consist solely of the sold electrolyte according to the second aspect of the present invention, or may include the solid electrolyte according to the second aspect of the present invention as a part thereof. In the case of a cell in which the solid electrolyte consists solely of the solid electrolyte according to the second aspect of the present invention, an electrolyte may include an electrolyte solution, and formed into a solid electrolyte. The solid electrolyte according to the second aspect of the present invention contains at least one compound selected from the group consisting of a polyvalent ion, an inorganic compound, and a nitrogen-containing organic compound, and when the solid electrolyte contains a polyvalent ion and/or an inorganic compound, the polyvalent ion and/or the inorganic compound contain(s) at least one element selected from Li, Na, K, Rb, Cs, elements of groups 2 to 14, P, Sb, Bi, elements of group 16, and elements of group 17 of the periodic table.

In the case of a cell in which the electrolyte includes the solid electrolyte according to the second aspect of the present invention as a part thereof, the electrolyte includes the solid electrolyte according to the second aspect of the present invention and another solid electrolyte that is different from the former solid electrolyte. In one example, the zinc-containing compound is used as an anode, and the electrolyte includes the solid electrolyte according to the second aspect of the present invention and a solid electrolyte free from any of the above-mentioned specific polyvalent cation and/or the inorganic compound, and the nitrogen-containing organic compound. In the case where the zinc anode contains the solid electrolyte on the active material layer, the solid electrolyte prevents deformation such as changes in the shape of the electrode active material and formation of dendrites, dissolution, corrosion, and passivation, prevents self-discharge in the charged state and during storage in the charged state, and prevents expansion and contraction of the solid electrolyte, for example, upon formation of the solid electrolyte or during charge or discharge as much as possible, for example. Therefore, it is preferable that the electrolyte in contact with the active material layer is essentially formed from the solid electrolyte according to the second aspect of the present invention. In this case, only a part of the electrolyte in contact with the active material layer may include the solid electrolyte according to the second aspect of the present invention, but preferably, the whole electrolyte in contact with the active material layer essentially includes the solid electrolyte according to the second aspect of the present invention. The solid electrolyte may be preliminarily polymerized or prepared by an operation such as kneading of the at least one compound selected from the group consisting of a polyvalent ion, an inorganic compound, and a nitrogen-containing organic compound, the polymer and the electrolyte solution before use in a cell. Alternatively, the materials, such as a monomer, of the solid electrolyte may be put into a cell and the components are polymerized to form the solid electrolyte in a cell. An electrolyte coating may be formed on the surface of an electrode by, for example, applying, bonding, or pressure-bonding a preliminarily prepared solid electrolyte (gel electrolyte) to the surface of the current collector or the active material layer to a thickness of 20 nm or greater but 5 mm or smaller, or applying a material for the gel electrolyte thereto and then polymerizing the materials.

In the case where the zinc anode contains the solid electrolyte in the active material layer, the solid electrolyte can be introduced into the active material layer by, for example, coating, pressure-bonding, bonding, electric welding, rolling, stretching or melting onto the active material layer by means of heat, pressure, a solvent or the like, as described above. In this case, it is preferable that the solid electrolyte is introduced into substantially the whole active material layer, but the solid electrolyte may be introduced into only a part of the active material layer. The solid electrolyte can be suitably introduced into the active material layer by means of, for example, heat at 0° C. to 400° C., a pressure of normal pressure to 20 t, a solvent such as water, methanol, ethanol, propanol, butanol, hexanol, or N-methylpyrrolidone, or a combination of these. In order to introduce the solid electrolyte in the active material layer, the solid electrolyte may be used on the zinc anode as described above, or an electrolyte solution (liquid) may be used instead. A zinc anode mix may be prepared by the step of mixing the solid electrolyte or materials for the solid electrolyte, and materials for the zinc anode mix, and then an active material layer containing the solid electrolyte may be formed on the current collector by, for example, coating, pressure-bonding, bonding, electric welding, rolling, stretching, or melting. In this case, it is preferable to form only an active material layer containing the solid electrolyte using only a zinc anode mix containing the solid electrolyte or materials for the solid electrolyte and materials for the zinc anode mix. However, not only an active material layer containing the solid electrolyte but also an active material layer free from the solid electrolyte may be formed using a zinc anode mix free from the solid electrolyte and the solid electrolyte materials in addition to a zinc anode mix containing the solid electrolyte or materials for the solid electrolyte and materials for the zinc anode mix to form a laminate of active material layers. The active material layer containing the solid electrolyte therein may be thus prepared.

In the case where the solid electrolyte includes the solid electrolyte according to the second aspect of the present invention and another solid electrolyte other than the former solid electrolyte, the proportion of the solid electrolyte according to the second aspect of the present invention is preferably not less than 0.001% by mass and less than 100% by mass relative to 100% by mass of the solid electrolyte in total. The proportion is more preferably not less than 0.01% by mass, and more preferably not less than 0.02% by mass.

The electrolyte solution used in the preparation of the solid electrolyte and the electrolyte solution may be any solution typically used as an electrolyte solution in cells, and thus are not particularly limited. Examples include organic solvent-type electrolyte solutions and water-containing electrolyte solutions.

The electrolyte is not particularly limited, as long as it is one typically used as an electrolyte in cells. Examples include water-containing electrolyte solutions and organic solvent-type electrolyte solutions. Preferred are water-containing electrolyte solutions. The term "water-containing electrolyte solutions" is intended to include electrolyte solutions (aqueous electrolyte solutions) made only of water as an electrolyte solution material, and electrolyte solutions made of a liquid mixture of water with an organic solvent as an electrolyte solution material. Examples of the aqueous electrolyte solutions include a potassium hydroxide aqueous solution, a sodium hydroxide aqueous solution, a lithium hydroxide aqueous solution, a zinc sulfate aqueous solution, a zinc nitrate aqueous solution, a zinc phosphate aqueous solution, and a zinc acetate aqueous solution. Thus, the electrolyte is not particularly limited, and a compound that generates hydroxide ion that transfers ions in the system is preferably used in such an aqueous electrolyte solution. In particular, a potassium hydroxide aqueous solution is preferable in terms of ion conductivity. Any of these aqueous electrolyte solutions may be used alone or in combination of two or more.

The water-containing electrolyte solutions may contain an organic solvent for use in an organic solvent-type electrolyte solution. Examples of the organic solvent include ethylene carbonate, propylene carbonate, dimethyl carbonate, diethyl carbonate, γ-butyrolactone, dimethoxymethane, diethoxymethane, dimethoxyethane, tetrahydrofuran, methyltetrahydrofuran, diethoxyethane, dimethyl sulfoxide, sulfolane, acetonitrile, benzonitrile, ionic liquid, fluorine-containing carbonates, fluorine-containing ethers, polyethylene glycols, and fluorine-containing polyethylene glycols. Any of these organic solvent-type electrolyte solutions may be used alone or in combination of two or more.

In the case of a water-containing electrolyte solution containing an organic solvent-type electrolyte solution, the amount of the aqueous electrolyte solution is preferably 10 to 99.9% by mass, and more preferably 20 to 99.9% by mass relative to 100% by mass of the aqueous electrolyte solution and the organic solvent-type electrolyte solution in total.

As for the concentration of the electrolyte solution, the concentration of an electrolyte (e.g. potassium hydroxide) is preferably 0.01 to 50 mol/L. The use of an electrolyte solution having such a concentration ensures good cell performance. The concentration is more preferably 1 to 20 mol/L, and still more preferably 3 to 18 mol/L. In the case where any of the following water-containing electrolyte solutions is used in a primary or secondary cell including the zinc-containing compound as an anode and a water-containing electrolyte solution, the electrolyte solution is preferably further combined with at least one zinc compound selected from the group consisting of zinc oxide, zinc hydroxide, zinc phosphate, zinc pyrophosphite, zinc borate, zinc silicate, zinc aluminate, zinc metal, tetrahydroxy zinc ion salts, and zinc sulfide. This makes it possible to further suppress generation and growth of deformation, such as shape changes and formation of dendrites, and passivation of the electrode active material, which are associated with dissolution of the zinc electrode active material during charge and discharge, and self-discharge in the charged state or during storage in the charged state. The zinc compound is preferably present at 0.0001 mol/L to the saturated concentration in the electrolyte solution.

The electrolyte solution may contain the at least one compound selected from the group consisting of a polyvalent ion, an inorganic compound, and a nitrogen-containing organic compound as an additive. In the case of using an aqueous electrolyte solution, the additive prevents decomposition of water into hydrogen which typically thermodynamically occurs as a side reaction during charge and discharge, deformation of the zinc active material, passivation, dissolution and corrosion, also prevents self-discharge in the charged state or during storage in the charged state, and remarkably improves the charge-discharge characteristics and coulombic efficiency. This may be because the additive suitably interacts with the zinc oxide surface, the zinc-containing compound in the electrolyte solution, or the like to prevent the side reaction, deformation of the zinc active material, passivation, dissolution, corrosion, and self-discharge.

For an aqueous electrolyte solution containing potassium hydroxide as an electrolyte, the following may be mentioned as examples of the additive: lithium hydroxide, sodium hydroxide, rubidium hydroxide, cesium hydroxide, magnesium hydroxide, barium hydroxide, calcium hydroxide, strontium hydroxide, lithium oxide, magnesium oxide, barium oxide, calcium oxide, strontium oxide, strontium acetate, magnesium acetate, barium acetate, calcium acetate, lithium carbonate, potassium carbonate, sodium carbonate, magnesium carbonate, calcium carbonate, barium carbonate, lithium fluoride, sodium fluoride, potassium fluoride, rubidium fluoride, cesium fluoride, beryllium fluoride, magnesium fluoride, calcium fluoride, strontium fluoride, barium fluoride, potassium acetate, boric acid, potassium metaborate, potassium borate, potassium hydrogen borate, calcium borate, borofluoric acid, phosphoric acid, potassium phosphate, potassium pyrophosphate, potassium hypophosphite, potassium oxalate, potassium silicate, potassium alminate, potassium sulfide, potassium sulfate, potassium thiosulfate, titanium oxide, zirconium oxide, aluminum oxide, oxides of lanthanides, niobium oxide, chrome oxide, copper oxide, gallium oxide, thallium oxide, antimony oxide, bismuth oxide, lead oxide, tellurium oxide, tin oxide, indium oxide, trialkylphosphoric acid, quaternary ammonium salt-containing compounds, quaternary phosphonium salt-containing compounds, carboxylate group-containing compounds, polyethylene glycol chain-containing compounds, chelating agents, methanol, ethanol, butanol, carboxylic acids, carboxylic acid salts, sulfonic acid, sulfonic acid salts, sulfonamide, sulfone, sulfoxide, polymers, gel compounds, carboxylate group- and/or sulfonate group-, and/or sulfinate group-, and/or quaternary ammonium salt group-, and/or quaternary phosphonium salt group-, and/or polyethylene glycol chain-, and/or halogen (e.g. fluorine) group-containing low molecular weight organic compounds, surfactants, polymers containing at least one element selected from the group consisting of elements of groups 1 to 17 of the periodic table, and gel compounds.

Any of the compounds containing at least one element selected from the group consisting of elements of groups 1 to 17 of the periodic table may be added to the electrolyte solution. Any of these additives may be used alone or in combination of two or more.

Examples of solid electrolytes other than the solid electrolyte according to the second aspect of the present invention include solid electrolytes that conduct cations such as lithium ion in the absence of a liquid material such as an electrolyte solution, and solid electrolytes that are free from the polyvalent ion and/or the inorganic compound, and crosslinked by a compound (crosslinking agent) other than these.

In the second aspect of the present invention, a zinc anode containing the solid electrolyte on the active material layer can be prepared by: the method described as the "method for preparing an electrode" in the description of the cell according to the first aspect of the present invention; or a technique in which an active material layer is formed by, for example, coating with, or pressure-bonding, bonding, electric welding, rolling, stretching, or melting of a later-described zinc anode mix onto a current collector, and the solid electrolyte is formed on the active material layer. In the preparation of a zinc anode containing the solid electrolyte in the active material layer, the solid electrolyte is formed on the active material layer by, for example, coating, pressure-bonding, bonding, electric welding, rolling, stretching, or melting, and introduced into the active material layer by means of heat, pressure, a solvent, or the like. Alternatively, an active material layer containing the solid electrolyte may be formed on a current collector by preparing a later-described zinc anode mix by mixing the solid electrolyte or materials for the solid electrolyte and materials for the zinc anode mix, and then, for example, coating with, or pressure-bonding, bonding, electric welding, rolling, stretching, or melting of the mixture. This provides an active material layer containing the solid electrolyte therein.

In the case where the solid electrolyte contains a polymer, a composition for the solid electrolyte material including monomer(s) as material(s) for the polymer is prepared and applied to the active material layer by, for example, coating, pressure-bonding, bonding, electric welding, rolling, stretching, or melting, or a later-described zinc anode mix is prepared by mixing the composition with materials for the zinc anode mix, and then an active material layer is formed on the current collector by, for example, coating, pressure-bonding, bonding, electric welding, rolling, stretching, or melting. Thereafter, polymerization is performed, so that the solid electrolyte is introduced on and/or in the active material layer. The polymerization can be accomplished by radical (co)polymerization, anionic (co)polymerization, cationic (co)polymerization, graft (co)polymerization, living (co)polymerization, dispersion (co)polymerization, emulsion (co)polymerization, suspension (co)polymerization, ring-opening (co)polymerization, cyclic (co)polymerization, photopolymerization, UV polymerization, electron beam polymerization, metathesis (co)polymerization, electrolytic (co)polymerization, or the like.

The ratio by mass of the solid electrolyte to the zinc species (zinc-containing compound) in the active material layer is preferably 10000/1 to 1/10000. The ratio is more preferably 1000/1 to 1/10000, and still more preferably 500/1 to 1/10000.

The zinc species in the active material layer containing a zinc species is a zinc-containing compound. The zinc-containing compound is not particularly limited, as long as it is usable as an anode active material. As examples and preferred examples thereof, those mentioned for the zinc-containing compound in the first aspect of the present invention can also be mentioned.

The active material layer containing a zinc species can be prepared by applying the zinc anode mix containing the zinc-containing compound to the current collector by, for example, coating, pressure-bonding, bonding, electric welding, rolling, stretching, or melting.

The preferable amount of the zinc-containing compound in the zinc anode mix is the same as the amount mentioned as "the active material content in the active material" described in the description of the cell according to the first aspect of the present invention. As described in the first aspect of the present invention, a specific element may be introduced into the active material. Examples of the specific element are the same as described above in the first aspect of the present invention.

The kind, shape of particles, specific surface area, average particle size, aspect ratio of the zinc-containing compound are the same as described above for the zinc-containing compound in the first aspect of the present invention.

The zinc anode mix preferably contains a conductive auxiliary agent in addition to the zinc-containing compound.

Examples and preferable examples of the conductive auxiliary agent are the same as the examples and preferred examples of the conductive auxiliary agent described in the first aspect of the present invention.

Zinc metal may be added to the anode mix in the preparation of an anode. As described in the first aspect of the present invention, zinc metal also functions as an active material.

As described in the first aspect of the present invention, a specific element may be introduced into the conductive auxiliary agent. Examples and preferred examples of the specific elements are the same as described in the first aspect of the present invention.

The preferable amount of the conductive auxiliary agent relative to 100% by mass of the zinc-containing compound in the zinc anode mix is the same as the amount of the conductive auxiliary agent content relative to 100% by mass of the active material in the active material layer described in the first aspect of the present invention.

The amount of the conductive auxiliary agent can be calculated in the same manner as described in the first aspect of the present invention.

The preferable average particle size and preferable specific surface area of the conductive auxiliary agent and measuring method of these are the same as described in the first aspect of the present invention.

The zinc anode mix used to prepare the active material layer can be prepared by mixing the zinc-containing compound, the conductive auxiliary agent, and optionally at least one selected from the group consisting of a compound containing at least one element selected from the group consisting of elements of groups 1 to 17 of the periodic table, an organic compound, and an organic compound salt. Various compounds can be used as the compound containing at least one element selected from the group consisting of elements of groups 1 to 17 of the periodic table. Preferred examples thereof include nitrogen-containing compounds such as ammonium salts and thiourea. For example, the zinc-containing compound and the compound containing at least one element selected from the group consisting of elements of groups 1 to 17 of the periodic table may be mixed optionally with the conductive auxiliary agent by the dry or wet process into a zinc anode mix. The zinc-containing compound and the compound containing at least one element selected from the group consisting of elements of groups 1 to 17 of the periodic table may be alloyed. Alternatively, an element having a nobler reduction potential than zinc may be introduced into the zinc-containing compound by the charge and discharge step. A spray, laser, or the like may be used, and a mechanochemical, sol-gel, or coprecipitation method may be used.

The zinc anode mix may further contain the above-mentioned additive for the solid electrolyte on and/or in the active material layer, or the additive for the electrolyte solution. This ensures a similar effect to the above-mentioned effect of the additive in the electrolyte solution.

Preferably, the zinc anode according to the second aspect of the present invention includes an active material layer made of the zinc anode mix.

The following can be mentioned as an example of methods for forming an active material layer of the zinc anode.

The zinc anode mix prepared by the above-mentioned preparation method was combined with the same polymer as above as a binder, thickener, or the like, and prepared into a zinc anode mix-containing slurry or a zinc anode mix-containing paste mixture. Next, the obtained slurry or paste mixture is applied to the current collector to a thickness as uniform as possible by, for example, coating, pressure-bonding, bonding, electric welding, rolling, stretching, or melting. In the case where the zinc anode according to the second aspect of the present invention includes the solid electrolyte on the active material layer as described above, after the active material layer is formed by applying the zinc anode mix to the current collector by, for example, coating, pressure-bonding, bonding, electric welding, rolling, stretching, or melting or the like, the solid electrolyte is formed on the active material layer. In the case where the zinc anode according to the second aspect of the present invention includes the solid electrolyte in the active material layer as described above, the solid electrolyte is formed on the active material layer by, for example, coating, pressure-bonding, bonding, electric welding, rolling, stretching, or melting, and introduced into the active material layer by means of heat, pressure, a solvent or the like. Alternatively, after the zinc anode mix is prepared by the step of mixing the solid electrolyte or materials for the solid electrolyte with materials for the zinc anode mix, the active material layer containing the solid electrolyte may be formed on the current collector by, for example, coating, pressure-bonding, bonding, electric welding, rolling, stretching, or melting. Thus, an active material layer containing a solid electrolyte therein can be obtained.

Examples and preferred examples of the current collector are the same as the examples and preferred examples of the current collector mentioned in the first aspect of the present invention.

The method and conditions for coating, pressure-bonding, or bonding the slurry or paste mixture onto the current collector and preferred methods and conditions are the same as described in the first aspect of the present invention.

The zinc anode (zinc mix electrode) thus obtained, when used, in particular, as an anode in a secondary cell, prevents decomposition of water in the zinc anode, prevents deformation such as changes in the shape of the electrode active material and formation of dendrites, and deterioration associated with passivation, and also prevents generation of hydrogen during its use as an anode in a cell as much as possible.

The thickness of the zinc anode is preferably 1 nm to 10000 μm in terms of, for example, cell structure and prevention of separation of the active material from the current collector. The thickness is more preferably 10 nm to 1500 μm, still more preferably 20 nm to 1000 μm, and particularly preferably 100 nm to 800 μm.

<Cell According to the First Aspect of the Present Invention>

The first aspect of the present invention further provides a cell incorporating components including the electrode according to the first aspect of the present invention, an electrolyte, and a separator.

The cell according to the first aspect of the present invention may be in any form such as a primary cell, a secondary cell (storage cell) that can be discharged and recharged, a form including a mechanical charging system (that needs mechanical exchange of the electrodes) or a form including a third electrode (e.g. an electrode that removes oxygen and hydrogen generated during charge and discharge) in addition to the cathode and the anode. For example, it is preferably in the form of a secondary cell (storage cell).

The anion conducting material according to the first aspect of the present invention can be used as a cathode or anode material, an electrolyte, or a separator for, in addition to cells with an anode containing zinc, cells with an alkali metal (e.g. lithium metal) anode, cells with an alkaline earth metal (e.g. magnesium metal) anode, cells with an aluminum metal anode, lithium ion cells, sodium ion cells, magnesium ion cells, calcium ion cells, aluminum ion cells, nickel-hydrogen cells, nickel-metal hydride cells, nickel-cadmium cells, air cells such as lithium-air cells, fuel cells, and the like.

The cell according to the first aspect of the present invention tends to allow anions involved in cell reactions, such as hydroxide ion, to permeate the anion conducting material and sufficiently prevents diffusion of metal ions, and also sufficiently prevents short circuits due to dendrite formation. Another important technical feature is to provide a good anion conducting material for use, in particular, with an alkaline electrolyte solution as an electrolyte solution.

The cell according to the first aspect of the present invention includes the electrode according to the first aspect of the present invention as a cathode and/or an anode. In particular, the cell according to the first aspect of the present invention preferably includes the electrode according to the first aspect of the present invention at least as an anode.

In the case where the electrode according to the first aspect of the present invention is an anode, the cathode in a cell including the anode can be appropriately made of any of the examples mentioned above as cathode active materials which are usable in a cell including the electrode according to the first aspect of the present invention as a cathode.

In one preferable embodiment of the first aspect of the present invention, the electrode according to the first aspect of the present invention is used as an anode, and the cell is an air cell, a fuel cell or the like which uses oxygen as a cathode active material. In other words, the cathode of the cell according to the first aspect of the present invention is an electrode capable of reducing oxygen in another preferable embodiment of the present invention.

Examples of the separator include nonwoven fabrics; glass filters; membrane filters; paper; hydrocarbon moiety-containing polymers such as polyethylene; aromatic group-containing polymers such as polystyrene; ether group-containing polymers such as alkylene glycol; hydroxyl group-containing polymers such as polyvinyl alcohol; amide group-containing polymers such as polyacrylamide; imide group-containing polymers such as polymaleimide; carboxyl group-containing polymers such as poly(meth)acrylic acid; carboxylate group-containing polymers such as poly(meth)acrylic acid salts; halogen-containing polymers such as polyvinylidene fluoride and polytetrafluoroethylene; sulfonate group moiety-containing polymers; quaternary ammonium salt group- or quaternary phosphonium salt group-containing polymers; ion-exchange polymers; natural rubber; synthetic rubber such as styrene butadiene rubber (SBR); sugars such as hydroxyalkyl cellulose (e.g. hydroxyethyl cellulose) and carboxymethyl cellulose; amino group-containing polymers such as polyethyleneimine; ester group-containing polymers; carbonate group-containing polymers; carbamate group-containing polymers; agar; gel compounds; hybrid organic-inorganic (composite) compounds; and inorganic materials such as ceramics. The separator may include the same material as that of the anion conducting material according to the first aspect of the present invention. The anion conducting material itself may function as a separator. Also, when the solid electrolyte (gel electrolyte) is used as an electrolyte as described below, it may function as a separator as well, but a separator other than the solid electrolyte may be used. The anion conducting material or the solid electrolyte (gel electrolyte) may be integrated with the separator, a glass filter, carbon paper, a membrane filter, a porous compound such as a water-repelling material (hereinafter, also referred to as a structure) or the like by, for example, coating, pressure-bonding, bonding, electric welding, rolling, stretching, or melting. In this case, the presence of the polymer in the anion conducting material or the solid electrolyte increases the strength and flexibility of the resulting material, and remarkably prevents the anion conducting material or the solid electrolyte from slipping off the structure. The structure functions, for example, to increase the strength and flexibility of the material, to keep the cathode and anode wet, and to avoid lack of the liquid.

For use in an air or fuel cell or the like, the anion conducting material, the solid electrolyte, and a structure in which the anion conducting material or the solid electrolyte are integrated may include a catalyst layer or a gas diffusion layer.

Only one separator may be used, or two or more separators may be used. Any number of separators may be used as long as an increase in the resistance and deterioration in the cell performance can be prevented, but only one separator is preferably used. In the cell according to the first aspect of the present invention, a cheap single-layer nonwoven fabric or the like which can be formed by a smaller number of steps is suitably used as a separator. Namely, in one preferable embodiment, the separator of the cell according to the first aspect of the present invention is a nonwoven fabric. The anion conducting material itself may function as a separator.

In another embodiment of the first aspect of the present invention, the present invention provides an anion conducting material including a polymer and hydrotalcite.

The preferable features of the polymer, hydrotalcite, and anion conducting material are the same as the preferable features of the polymer, inorganic compound, and anion conducting material described in the first aspect of the present invention. Each of the polymer and hydrotalcite may be of a single kind or may be a combination of two or more kinds.

The present invention also provides a membrane in which the anion conducting material according to the present invention and the structure are integrated.

The integration can be appropriately accomplished by a technique such as coating, pressure-bonding, bonding, electric welding, rolling, stretching, or melting.

The structure is preferably in the form of a sheet (membrane), and the same separators as those described above in the first aspect of the present invention are suitably used.

The use of the membrane according to the present invention as an electrode or the like in a cell ensures remarkably high discharge-and-charge cycle characteristics as shown in Example 1-11.

In the case where an electrolyte solution is used in the cell according to the first aspect of the present invention, the electrolyte solution may be any of electrolyte solutions typically used in cells, and specifically, the electrolyte solutions described in [0056] to [0059] in WO 2013/027767 can be used. The electrolyte solution may be circulated, and may not be circulated.

Instead of using an electrolyte solution, the solid electrolyte (gel electrolyte) may be sandwiched between the zinc anode and the cathode.

Because of its durability to, in particular, alkaline electrolyte solutions, the cell according to the first aspect of the present invention is preferably designed as a cell using an electrolyte solution including an alkaline aqueous solution such as nickel-zinc (storage) cells, manganese-zinc (storage) cells, silver-zinc (storage) cells, zinc ion (storage) cells, nickel-cadmium (storage) cells, nickel-hydrogen (storage) cells, fuel cells, air (storage) cells, or the like. In particular, the cell is preferably designed as a nickel-zinc (storage) cell, a manganese zinc (storage) cell, a silver-zinc (storage) cell, a zinc ion (storage) cell, a fuel cell, or an air (storage) cell which are susceptible to dendrite formation because the effects of the first aspect of the present invention are remarkably exerted. Also, it may be used as a cell using an electrolyte solution other than electrolyte solutions including an alkaline aqueous solution, such as a lithium ion cell or a lead storage cell. When it is used as a lead storage cell, electrode reactions occur more uniformly in the whole reaction system.

The structure of a nickel-zinc storage cell is demonstrated in the following as an example.

The nickel-zinc storage cell includes the zinc anode, a nickel cathode, a separator separating the cathode and anode, an electrolyte or an electrolyte solution, an assembly including these components, and a container.

The nickel electrode is not particularly limited, and may be any nickel electrode for nickel-hydrogen cells, nickel-metal hydride cells (nickel-hydrogen storage alloy cells), nickel-cadmium cells or the like. The inner walls of the assembly and container are formed from a material which is resistant to corrosion and is not deteriorated by reactions during use of the cell. Containers used for alkaline cells or zinc-air cells may be used. The storage cell may be of a cylindrical type such as D size, C size, AA size, AAA size, N size, AAAA size, R123A, and R-1/3N; a square type such as 9V size and 006P size; a button type; a coin type; a laminate type; a stacked type; a type in which rectangular positive and negative plates are alternately interposed between pleated separators; a closed type; an open type; or a vented cell type. The cell may have a portion for reserving gas generated during use of the cell.

The cell according to the first aspect of the present invention may be produced by the wet process or the dry process. In the wet process, for example, the cathode current collector and the anode current collector are coated with a paste or slurry of the cathode material and a paste or slurry of the anode material, respectively; the coated electrode sheets are dried, compressed, cut and cleaned; and the cut-out electrodes and a separator are laminated as a cell assembly. The dry process is, for example, a process using powder or granulated dry mixtures of electrode components instead of a slurry or paste, and, for example, includes the steps of: (1) applying an anode material to a current collector in a dried state; (2) applying a cathode material to a current collector in a dried state; (3) disposing a separator between the sheets (1) and (2) to form a cell assembly with a layered structure; and (4) winding or folding, for example, the cell assembly (3) to form a three-dimensional structure. The electrodes may be wrapped in or coated with the separator, the anion conducting material, or the (gel) solid electrolyte, for example. The positive electrode and the negative electrode may also serve as a container constituting the cell. Terminals may be attached by any conductive bonding technique such as spot welding, ultrasonic welding, laser beam welding, soldering, and other techniques suitable for the materials of terminals and current collectors. The cell may be in the state of being (partially) charged or may be in the state of being discharged during the production or storage of the cell.

In the case where the cell according to the first aspect of the present invention is a storage cell, the charge and discharge rate of the storage cell is preferably not lower than 0.01 C and not higher than 100 C, more preferably not lower than 0.01 C and not higher than 80 C, still more preferably not lower than 0.01 C and not higher than 60 C, and particularly preferably not lower than 0.01 C and not higher than 30 C. The storage cell is preferably usable in both cold districts and tropical districts on the earth, and is preferably usable at a temperature of −50° C. to 100° C.

The electrode according to the first aspect of the present invention is configured as described above. When the electrode according to the first aspect of the present invention is used in a cell, the anion conducting material covering the active material and/or the active material layer tends to allow anions involved in cell reactions such as hydroxide ion to permeate it, ensures sufficiently high cell performance, sufficiently prevents diffusion of metal ions, and also sufficiently prevents short circuits due to dendrite formation even after repeated charge/discharge cycles.

<Cell According to the Second Aspect of the Present Invention>

The use of the zinc electrode according to the second aspect of the present invention in a cell confers high safety on the cell because a water-containing electrolyte solution can be used as an electrolyte solution.

The cell according to the second aspect of the present invention may include, in addition to the zinc anode, a cathode and an electrolyte between the zinc anode and the cathode, for example. A cell including the zinc anode according to the second aspect of the present invention, a cathode, and an electrolyte is also one of the second aspect of the present invention.

The electrolyte solution is preferably a water-containing electrolyte solution as described below. Therefore, a cell including the zinc anode according to the second aspect of the present invention, a cathode, a separator, and a water-containing electrolyte solution between the zinc anode and the cathode is also one of the second aspect of the present invention. The cell according to the second aspect of the present invention may include one kind of each component or two or more kinds of each component.

Preferable features of the zinc anode of the cell according to the second aspect of the present invention are the same as the preferable features of the zinc anode according to the second aspect of the present invention.

The cathode may be made of those typically used as a cathode active material in a primary or secondary cell, and is not particularly limited. As specific examples of the cathode active material, the above-mentioned specific examples of the cathode active material which are usable when the electrode according to the first aspect of the present invention is used as an anode can be mentioned.

Examples of the electrolyte solution or electrolyte between the zinc anode and the cathode are the same as those mentioned above in the first aspect of the present invention.

The cell according to the second aspect of the present invention may further include a separator. Examples of the separator are the same as those mentioned in the first aspect of the present invention. The separator may include the specific polyvalent cation and/or the inorganic compound, a nitrogen-containing organic compound, a surfactant, an electrolyte solution or the like therein.

The structure and preferable structure of a cell including the zinc electrode according to the second aspect of the present invention as an anode are the same as the structure and preferable structure described in the first aspect of the present invention.

A cell including a zinc anode made from the zinc anode mix as described above is also one of the second aspect of the present invention. The cell according to the second aspect of the present invention may be the cell including a zinc anode among the above-described examples of the cell according to the first aspect of the present invention.

The cell according to the second aspect of the present invention can be produced by the same process as that for the cell according to the first aspect of the present invention.

In the case where the cell according to the second aspect of the present invention is a storage cell, the charge and discharge rate, environment for use, and temperature for use are the same as those of the cell according to the first aspect of the present invention.

The zinc anode according to the second aspect of the present invention is configured as described above. The zinc anode, when used in a cell, allows the solid electrolyte to be introduced on the active material layer and/or in the layer, and therefore to sufficiently prevent changes in the form/shape of the active material, prevents expansion and contraction of the solid electrolyte, ensures electron conduction paths, prevents problems such as cracks in the electrode active material layer, ensures high ion conductivity, and sufficiently improves the cell performance, as compared with conventional cells with a zinc anode.

Advantageous Effects of Invention

The electrode of the present invention has the features described above, and the use of the electrode of the present invention in a cell ensures high durability and sufficient ion conductivity, and sufficiently improves the cell performance.

BRIEF DESCRIPTION OF DRAWINGS

FIG. 5 is a schematic cross-sectional view of a cell according to still another embodiment of the first aspect of the present invention.

FIG. 6 is a schematic cross-sectional view of a cell according to still another embodiment of the first aspect of the present invention.

DESCRIPTION OF EMBODIMENTS

The following description is offered to demonstrate the present invention based on the examples. The examples should not be construed as limiting the present invention. The average particle sizes of inorganic compounds were measured using a particle size distribution analyzer in the examples below.

1. Examples of the First Aspect of the Present Invention

FIGS. 1 to 7 are schematic cross-sectional views each showing a cell according to one embodiment of the first aspect of the present invention.

Figure 1:
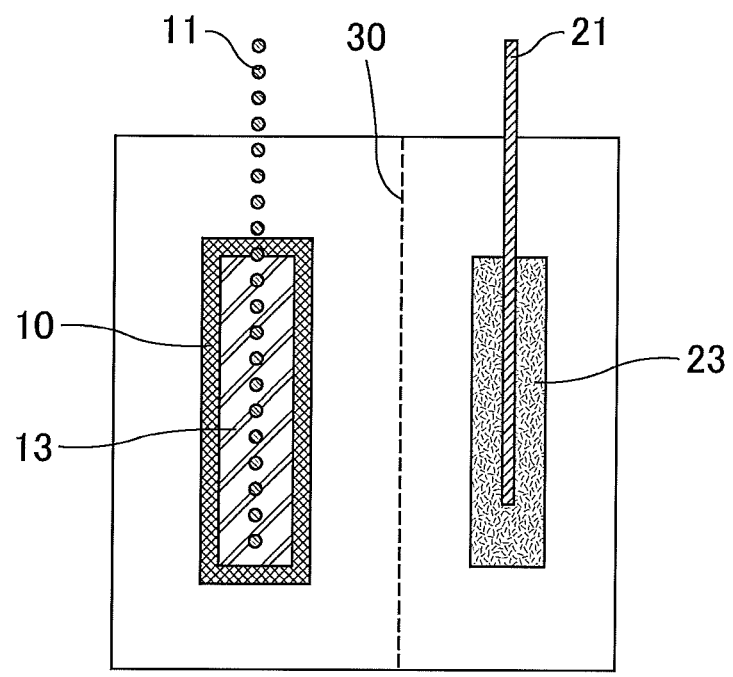
FIG. 1 is a schematic cross-sectional view of a cell according to one embodiment of the first aspect of the present invention.

Each of the cells of these embodiments includes the anode according to the first aspect of the present invention, a cathode, an electrolyte, and a separator. For example, as shown in FIG. 1, the anode according to the first aspect of the present invention includes a current collector 11, an active material layer 13, and an anion conducting material 10. The cathode includes a current collector 21 and an active material layer 23. The separator 30 consists of a single-layer nonwoven fabric. In FIG. 1, the active material layer 13 of the anode is covered with the anion conducting material 10. This structure tends to allow anions involved in cell reactions such as hydroxide ion, to permeate the anion conducting material and sufficiently prevents short circuits due to dendrite formation even after repeated charge/discharge cycles, in other words, ensures the effects of the first aspect of the present invention.

In the cell according to the first aspect of the present invention shown in FIG. 1, the anode includes only one active material layer 13, and the whole active material layer 13 is covered with the anion conducting material 10. The coating provides very good electric conductivity in the active material. The current collector 11 is a copper mesh (expandable metal), and the cross section thereof is shown in FIG. 1. The current collector is not limited to this, and may be a copper foil. Various metal materials other than copper may be used.

Figure 2:
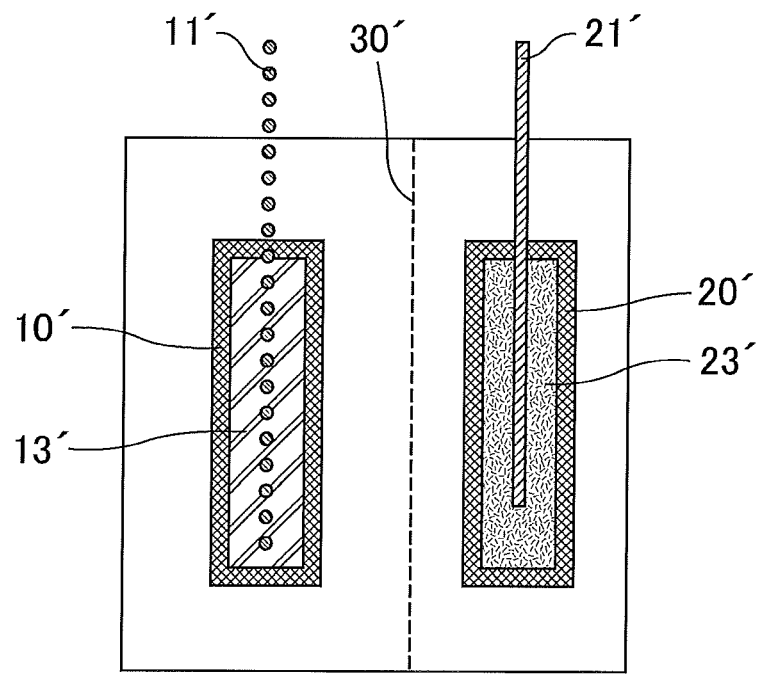
FIG. 2 is a schematic cross-sectional view of a cell according to another embodiment of the first aspect of the present invention.

The cell according to the first aspect of the present invention shown in FIG. 2 differs from the cell according to the first aspect of the present invention shown in FIG. 1 in that a whole active material layer 23', which consists of a single unit, of the cathode is also covered with an anion conducting material 20'. Thus, in the cell, both the active material layer of the cathode and the active material layer of the anode may be covered with the anion conducting material. This structure tends to allow anions involved in cell reactions such as hydroxide ion, to permeate the anion conducting material and sufficiently prevents short circuits due to dendrite formation even after repeated charge/discharge cycles, in other words, ensures the effects of the first aspect of the present invention.

Figure 3:
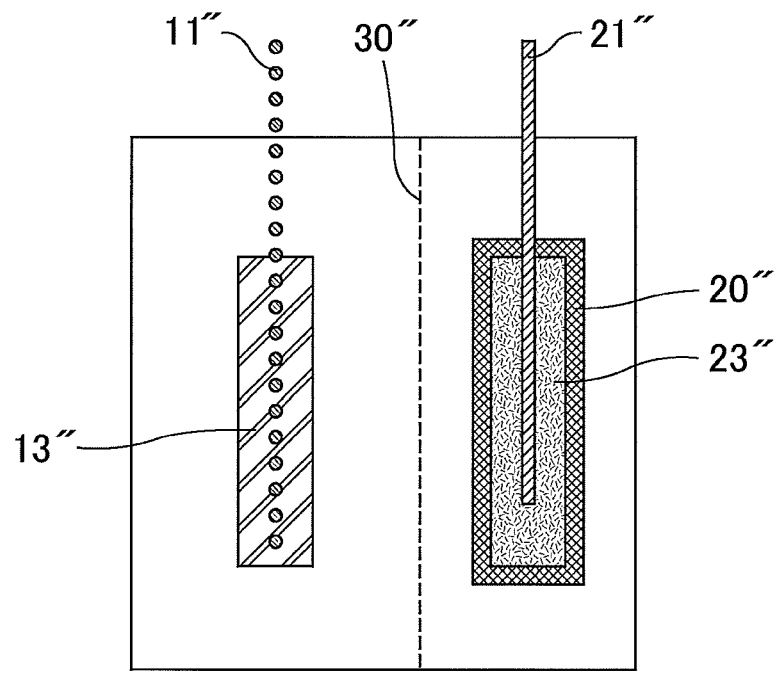
FIG. 3 is a schematic cross-sectional view of a cell according to still another embodiment of the first aspect of the present invention.

The cell according to the first aspect of the present invention shown in FIG. 3 has the same structure as the cell according to the first aspect of the present invention shown in FIG. 1, except that a whole active material layer 23" of the cathode is covered with the anion conducting material 20" instead of covering a whole active material layer 13" of the anode with the anion conducting material. Thus, the cell may be configured such that only the active material layer of the cathode is covered with the anion conducting material. This structure tends to allow anions involved in cell reactions such as hydroxide ion, to permeate the anion conducting material and sufficiently prevents short circuits due to dendrite formation even after repeated charge/discharge cycles, in other words, ensures the effects of the first aspect of the present invention.

Figure 4:
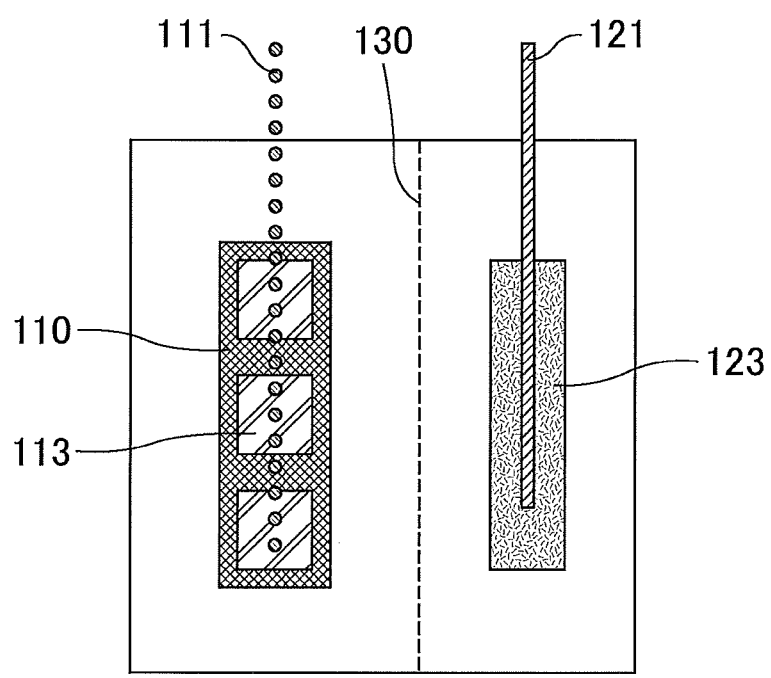
FIG. 4 is a schematic cross-sectional view of a cell according to still another embodiment of the first aspect of the present invention.

In the cell according to the first aspect of the present invention shown in FIG. 4, an active material layer 113 of the anode consists of some units, and each unit is covered with an anion conducting material 110. This structure sufficiently prevents short circuits due to dendrite formation even after repeated charge/discharge cycles, also prevents deformation of the anode active material (e.g. zinc active material), and therefore further improves the cycle life. Except the above, the cell has the same structure as the cell according to the first aspect of the present invention shown in FIG. 1.

In the cell according to the first aspect of the present invention shown in FIG. 5, each of active material particles 213 in the active material layer of the anode is covered with an anion conducting material 210. This structure particularly improves the effect of preventing short circuits due to dendrite formation even after repeated charge/discharge cycles. Except the above, the cell has the same structure as the cell according to the first aspect of the present invention shown in FIG. 1.

In the cell according to the first aspect of the present invention shown in FIG. 6, peripheral portions including end portions of the main surface and the end faces of an active material layer 313 are sealed with an insulating protection members 315 that are different from an anion conducting material 310 instead of the anion conducting material 310. This improves the physical strength of the electrode, and insulates the peripheral portions of the active material layer 313 where current concentration tends to occur. The anion conducting material by itself improves the physical strength of the electrode sufficiently, and prevents current concentration in the electrode sufficiently. However, when, in particular, the peripheral portions of the active material layer 313 are insulated, localization of the anode active material (e.g. zinc active material) in the peripheral portions can be further prevented, resulting in improved cycle life. Except the above, the cell has the same structure as the cell according to the first aspect of the present invention shown in FIG. 1.

Thus, the cell shown in FIG. 6 has the same structure as the cell shown in FIG. 1, except that peripheral portions including end portions of the main surface and the end faces of the active material layer 313 are sealed with the insulating protection members 315 instead of the anion conducting material 310. The cell may be designed to have the same structure as the cell shown in FIG. 4, except that the peripheral portions are covered with the insulating protection members instead of the anion conducting material. Alternatively, the cell may be designed to have the same structure as that of the cell according to the first aspect of the present invention shown in FIG. 5, except that the peripheral portions are covered with the insulating protection members. Any of these structures provide the same effects.

Figure 7:
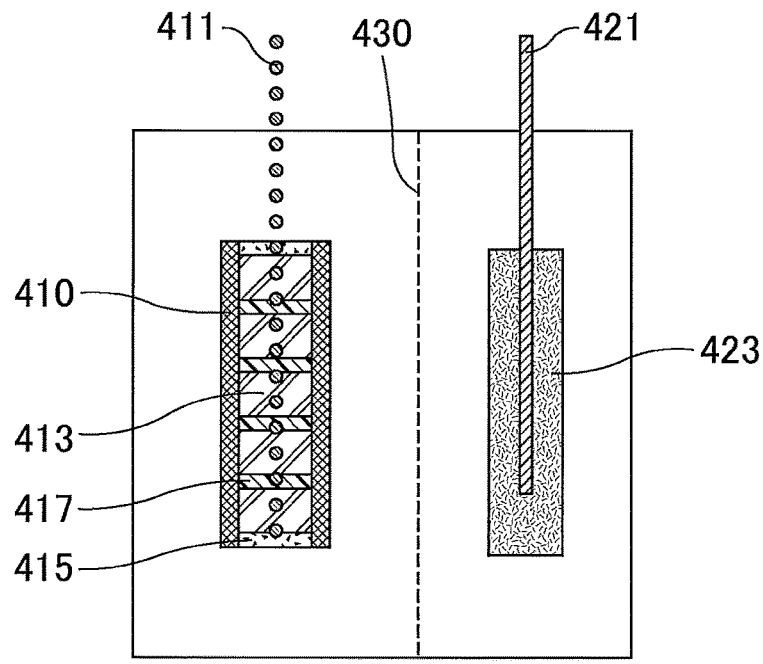
FIG. 7 is a schematic cross-sectional view of a cell according to still another embodiment of the first aspect of the present invention.

In the cell according to the first aspect of the present invention shown in FIG. 7, an active material layer 413 consists of some units, the units are separated from one another by a protection members 417 that are different from an anion conducting material 410, each unit includes an active material therein, and the end faces of the whole active material layer 413 according to the first aspect of the present invention are covered with an insulating protection members 415 instead of the anion conducting material 410. In this case, the protection members 417 as well as the anion conducting material 410 and the insulating protection members 415 prevent diffusion of ions. The structure in which the active material surfaces through which a current flows in cell reactions are covered with the anion conducting material 410, and the active material surfaces through which a current does not flow are covered with the insulating protection members 415 or the protection members 417 as shown in FIG. 7 further prevents movement of ions other than the movement of ions in electrode reactions, and therefore improves the cell life.

Preferred examples of materials for the insulating protection members 415 and the protection members 417 include the substances described for the polymer in the anion conducting material according to the first aspect of the present invention, and the inorganic materials described for the current collector of the electrode. Further, the inorganic compound or other components in the anion conducting material according to the first aspect of the present invention, the materials for the active material, or the like may be appropriately used. The ion conductivity of the protection members can be further reduced or eliminated by forming initial structures of the protection members with the polymer, and coating the surfaces of the structures with the inorganic material.

It should be noted that the insulating protection members 415 shown in FIG. 7 which constitute the end faces of the whole electrode according to the first aspect of the present invention are made of an insulating substance. The protection members 417 may be insulative or may be conductive. They are preferably made of an ion non-conductive material which does not allow ions to permeate it. Except the above, the cell has the same structure as the cell according to the first aspect of the present invention shown in FIG. 1.

Each of the anion conducting materials, the protection members, the active material layers, and the current collectors shown in FIG. 1 to FIG. 7 may consist of a single kind or may include two or more kinds appropriately selected from those disclosed herein. These components can be produced by the methods disclosed herein.

In the cells shown in FIGS. 4 to 7, the anodes include the anion conducting material. However, in the cell according to the first aspect of the present invention, not only the anode but also the cathode may include the anion conducting material, or only the cathode may include the anion conducting material. The active material and/or the active material layer of the cathode may be appropriately covered with the anion conducting material in any of the manners disclosed herein, for example. When the active material and/or the active material layer of each electrode is/are covered with the anion conducting material, the anion conducting materials used for the electrodes may be the same or different, and the active material and/or the active material layer may be covered with the anion conducting material in the same or a different manner in both electrodes.

All of the cases described above provide the effects of the first aspect of the present invention.

Example 1-1

In order to perform the first aspect of the present invention, a cell having the structure shown in FIG. 1 was formed, and a charge/discharge cycle test was performed as described below. In Example 1-1, an anion conducting material-containing zinc anode was prepared by forming a layer of a zinc oxide active material as an anode active material on a copper mesh current collector by pressure-bonding, and covering the layer with an anion conducting material. This process is effective in enclosing $Zn(OH)_4^{2-}$ ions in the anion conducting material of the anode, and therefore in preventing diffusion of the ions. For the anion conducting material 10, a kneaded mixture containing hydrotalcite and polytetrafluoroethylene at a mass ratio of 4:6 was used. The polytetrafluoroethylene is a preferable material because (1) it is insulative; (2) it allows anion conducting material particles to be bonded each other; and (3) it has high physical strength.

Since dendrite formation is limited within the anode, a simple nonwoven fabric suffices as a separator to perform the first aspect of the present invention. The results of the charge/discharge cycle test in Example 1-1 are shown as "Anion conductive layer +" in FIG. 8.

Comparative Example 1-1

A cell having the same structure as that shown in FIG. 1 was prepared, except for the absence of the anion conducting material, and the cell was charged and discharged. The results of the charge/discharge cycle test in Comparative Example 1-1 are shown as "Anion conductive layer −" in FIG. 8.
(Charge/Discharge Cycle Test in Example 1-1 and Comparative Example 1-1

The charge/discharge cycle test was performed using the anion conducting material-containing zinc anode prepared above as an anode, a nickel electrode as a cathode, and a saturated solution of zinc oxide in an 8 mol/L potassium hydroxide aqueous solution as an electrolyte solution. The electrode area was 1 cm$^2$, and the current value was 20 mA.

Figure 8:
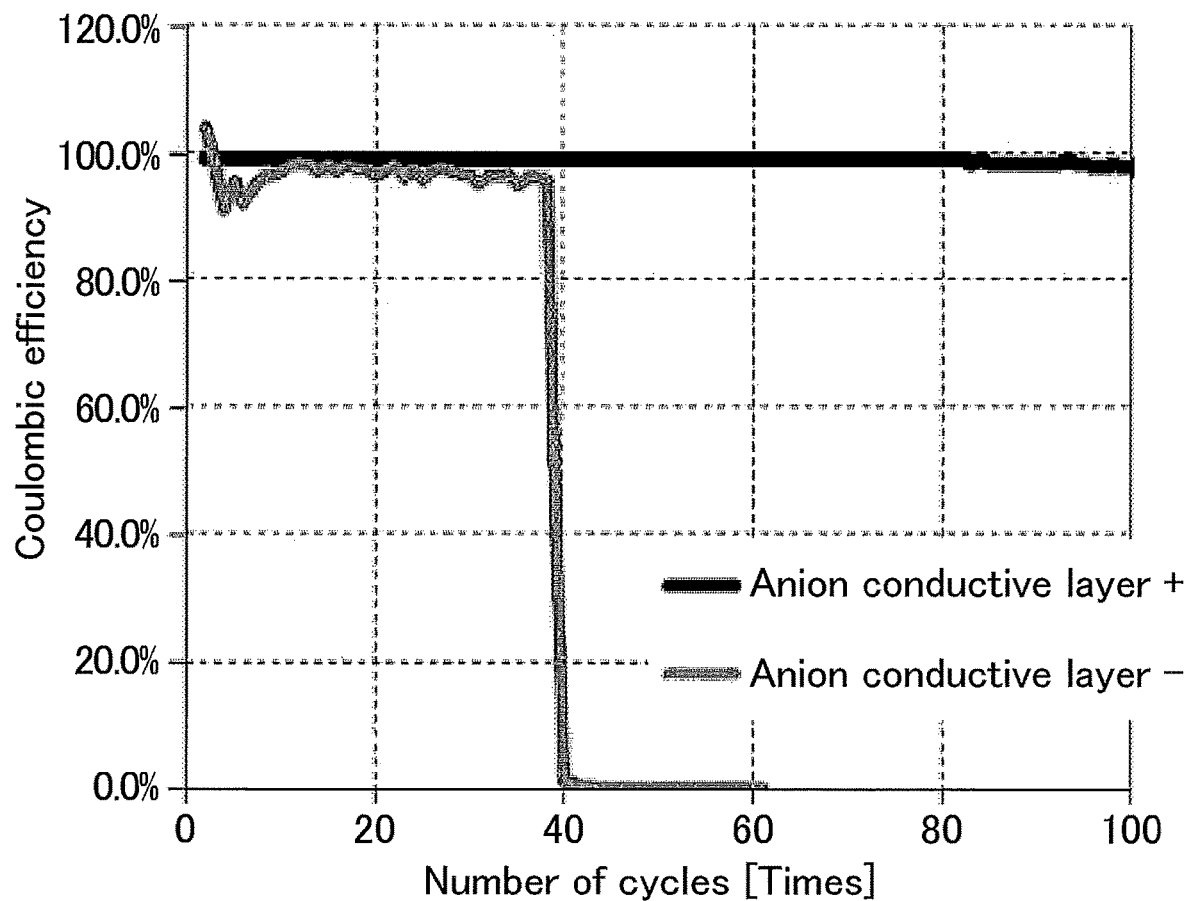
FIG. 8 is a graph showing the coulombic efficiencies of cells of Example 1-1 and Comparative Example 1-1 relative to the number of charge/discharge cycles.

FIG. 8 is a graph showing the coulombic efficiencies of cells of Example 1-1 and Comparative Example 1-1 relative to the number of charge/discharge cycles. The coulombic efficiency refers to the proportion of the discharged amount to the charged amount. In the case where charge and discharge cannot be performed due to, for example, a short circuit caused by dendrite formation, a reduction in the coulombic efficiency is observed.

The test was performed using only a nonwoven fabric as a separator, and resulted in a short circuit after about 40 cycles in Comparative Example 1-1 due to dendrite formation. In contrast, it was revealed that the anode structure according to the first aspect of the present invention prevented short circuits in Example 1-1. At least 1000 charge/discharge cycles could be performed stably.

Example 1-2 and Comparative Example 1-2

A zinc anode was prepared in the same manner as in Example 1-1, except that a kneaded mixture containing hydrotalcite, bismuth oxide, and polytetrafluoroethylene at a mass ratio of 4:1:6 was used for the anion conducting material 10.

A three-electrode cell was prepared in which the anode was the anion conducting material-containing zinc anode prepared above, the cathode was a nickel electrode, the reference electrode was the same electrode as the cathode, and was 50% charged, a nonwoven fabric was disposed between the cathode and the anode, and the electrolyte solution was a saturated solution of zinc oxide in an 8 mol/L potassium hydroxide aqueous solution. The cell was subjected to the charge/discharge cycle test. The electrode area was 1.95 cm$^2$, and the current value was 25 mA/cm$^2$ (periods of charge and discharge: 1 hour each). In the test, no reduction in the coulombic efficiency was observed, and at least 50 charge/discharge cycles could be performed stably.

On the other hand, the use of a zinc anode which was not covered with the anion conducting material 10 caused a short circuit due to dendrite formation before the 40th cycle.

Example 1-3

A zinc anode was prepared in the same manner as in Example 1-1, except that a kneaded mixture containing hydrotalcite, cobalt oxide, and polytetrafluoroethylene at a mass ratio of 4:1:6 was used for the anion conducting material 10.

A three-electrode cell having the same structure as that of Example 1-2 was prepared, except that the anion conducting material-containing zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-4

A zinc anode was prepared in the same manner as in Example 1-1, except that a kneaded mixture containing hydrotalcite, cerium oxide, and polytetrafluoroethylene at a mass ratio of 4:1:6 was used for the anion conducting material 10.

A three-electrode cell having the same structure as that of Example 1-2 was prepared, except that the anion conducting material-containing zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-5

A zinc anode was prepared in the same manner as in Example 1-1, except that a kneaded mixture containing hydrotalcite, niobium oxide, and polytetrafluoroethylene at a mass ratio of 4:1:6 was used for the anion conducting material 10.

A three-electrode cell having the same structure as that of Example 1-2 was prepared, except that the anion conducting material-containing zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-6

A zinc anode was prepared in the same manner as in Example 1-1, except that a kneaded mixture containing hydrotalcite, tin oxide, and polytetrafluoroethylene at a mass ratio of 4:1:6 was used for the anion conducting material 10.

A three-electrode cell having the same structure as that of Example 1-2 was prepared, except that the anion conducting material-containing zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-7

A zinc anode was prepared in the same manner as in Example 1-1, except that a kneaded mixture containing hydrotalcite, ettringite, and polytetrafluoroethylene at a mass ratio of 4:1:6 was used for the anion conducting material 10.

A three-electrode cell having the same structure as that of Example 1-2 was prepared, except that the anion conducting material-containing zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-8

A zinc anode was prepared in the same manner as in Example 1-1, except that a kneaded mixture containing cerium oxide and polytetrafluoroethylene at a mass ratio of 4:6 was used for the anion conducting material 10.

A three-electrode cell having the same structure as that of Example 1-2 was prepared, except that the anion conducting material-containing zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-9

A zinc anode was prepared in the same manner as in Example 1-1, except that a kneaded mixture containing ettringite and polytetrafluoroethylene at a mass ratio of 4:6 was used for the anion conducting material 10.

A three-electrode cell having the same structure as that of Example 1-2 was prepared, except that the anion conducting material-containing zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-10

An anion conducting material 10 was prepared in the same manner as in Example 1-1. Upon deposition of the material on the zinc anode, a 2% sodium polyacrylate aqueous solution was applied between the zinc anode and an anion conductive membrane to improve the adhesion therebetween.

A three-electrode cell having the same structure as that of Example 1-2 was prepared, except that the anion conducting material-containing zinc anode prepared above was used as an anode, and the charge/discharge cycle test was performed under the same conditions as in Example 1-2. In the test, no reduction in the coulombic efficiency was observed, and at least 200 charge/discharge cycles could be performed stably.

Example 1-11

An anion conducting material 10 was prepared in the same manner as in Example 1-1. In order to confer further improved physical strength on the anion conducting material, the anion conducting material was rolled together with nonwoven fabric(s), and disposed on a zinc anode. A three-electrode cell was prepared in which the anode was the anion conducting material-containing zinc anode prepared above, the cathode was a nickel electrode, the reference electrode was the same electrode as the cathode, and was 50% charged, a nonwoven fabric was disposed between the cathode and the anode, and the electrolyte solution was a saturated solution of zinc oxide in an 8 mol/L potassium hydroxide aqueous solution. The cell was subjected to the charge/discharge cycle test. The electrode area was 1.95 cm$^2$, and the current value was 25 mA/cm$^2$ (periods of charge and discharge: 1 hour each). In the test, no reduction in the coulombic efficiency was observed, and at least 200 charge/discharge cycles could be performed stably.

Regardless of whether both or either of the surfaces of the anion conductive membrane was/were covered with the nonwoven fabric(s) upon rolling the anion conductive membrane and the nonwoven fabric(s), equivalent cycle life could be attained in both cases. Also, equivalent cycle life could be attained in the case where a 2% sodium polyacrylate aqueous solution was applied between the anion conductive membrane and the nonwoven fabric(s) to improve the adhesion between the anion conductive membrane and the nonwoven fabric(s).

Example 1-12 and Comparative Example 1-3

A zinc anode was prepared in the same manner as in Example 1-1.

Figure 9:
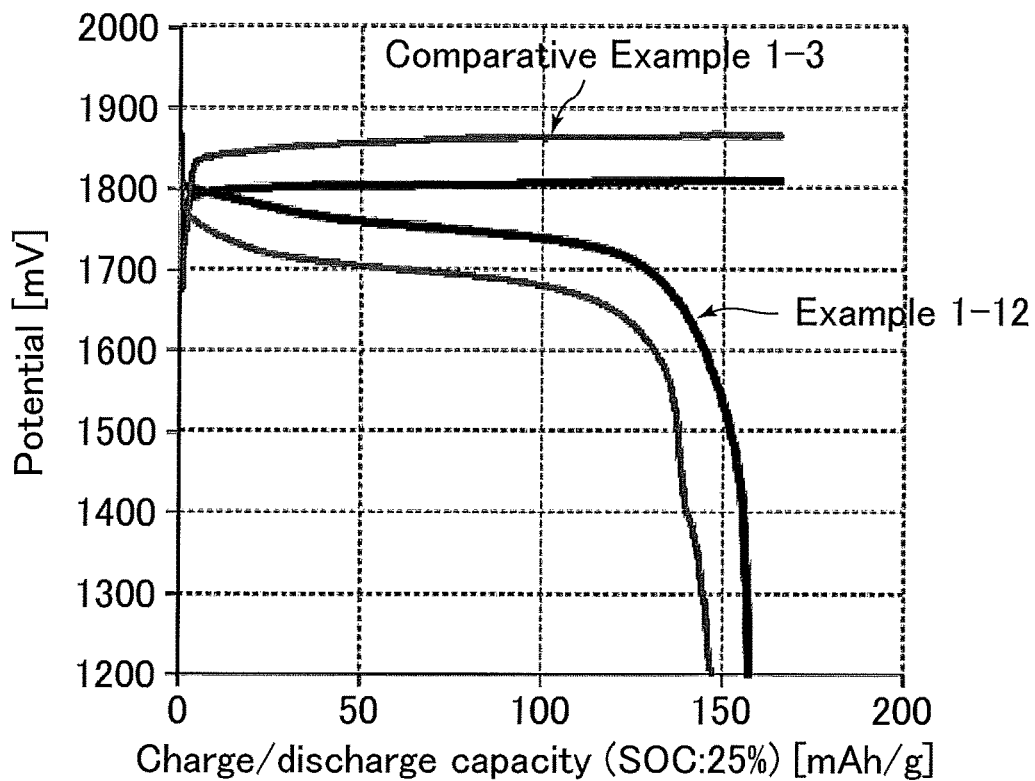
FIG. 9 is a graph showing the results of a charge/discharge test in Example 1-12 and Comparative Example 1-3.

A three-electrode cell was prepared in which the anode was the anion conducting material-containing zinc anode prepared above, the cathode was a nickel electrode, the reference electrode was the same electrode as the cathode, and was 50% charged, a nonwoven fabric was disposed between the cathode and the anode, and the electrolyte solution was a saturated solution of zinc oxide in an 8 mol/L potassium hydroxide aqueous solution. The cell was subjected to the charge/discharge cycle test. The electrode area was 1.95 cm$^2$, and the current value was 25 mA/cm$^2$ (periods of charge and discharge: 1 hour each). A graph of potential versus charge/discharge capacity is shown as "Example 1-12" in FIG. 9.

Separately, a three-electrode cell in which two hydrophilic membranes with fine pores were inserted instead of the anion conductive membrane was prepared, and subjected to a comparative experiment. As a result, an increase in ohmic loss associated with an increase in resistance components was observed. A graph of potential versus charge/discharge capacity of the case where the structure was the same as that of Example 1-12 except that two hydrophilic membranes with fine pores were used instead of the anion conductive membrane is shown as "Comparative Example 1-3" in FIG. 9.

Example 1-13

An anion conducting material-containing zinc anode was prepared in the same manner as in Example 1-1, except that a kneaded mixture containing hydrotalcite, polyethyleneimine, and polytetrafluoroethylene at a mass ratio of 4:0.5:6 was used for the anion conducting material 10.

A three-electrode cell having the same structure as that of Example 1-2 was prepared, except that the zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-14

An anion conducting material-containing zinc anode was prepared in the same manner as in Example 1-1, except that a kneaded mixture containing hydrotalcite, sodium polyacrylate, and polytetrafluoroethylene at a mass ratio of 4:0.2:6 was used for the anion conducting material 10.

A three-electrode cell having the same structure as that of Example 1-2 was prepared, except that the zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-15

A zinc anode was prepared in the same manner as in Example 1-1, except that a kneaded mixture containing hydrotalcite and polytetrafluoroethylene at a mass ratio of 5:4 was used as the anion conducting material 10.

A three-electrode cell having the same structure as that of Example 1-2 was prepared, except that the anion conducting material-containing zinc anode prepared above was used as an anode, and the charge/discharge cycle test was performed under the same conditions as in Example 1-2. In the test, no reduction in the coulombic efficiency was observed, and at least 50 charge/discharge cycles could be performed stably.

Example 1-16

A two-electrode cell was prepared in which the anode was an anion conducting material-containing zinc anode prepared in the same manner as in Example 1-1, the cathode was an air electrode with air pores (QSI-Nanomanganese gas diffusion electrode, available from TOMOE ENGINEERING CO., LTD.), and the electrolyte solution was a saturated solution of zinc oxide in an 8 mol/L potassium hydroxide aqueous solution. The cell was subjected to the charge/discharge cycle test. The electrode area was 1 cm$^2$, and the current value was 5 mA/cm$^2$ (periods of charge and discharge: 10 minutes each, cut-off potential: 2.0 V and 0.5 V). In the test, no reduction in the coulombic efficiency was observed, and at least 20 charge/discharge cycles could be performed stably.

Example 1-17 and Comparative Example 1-4

Figure 10:
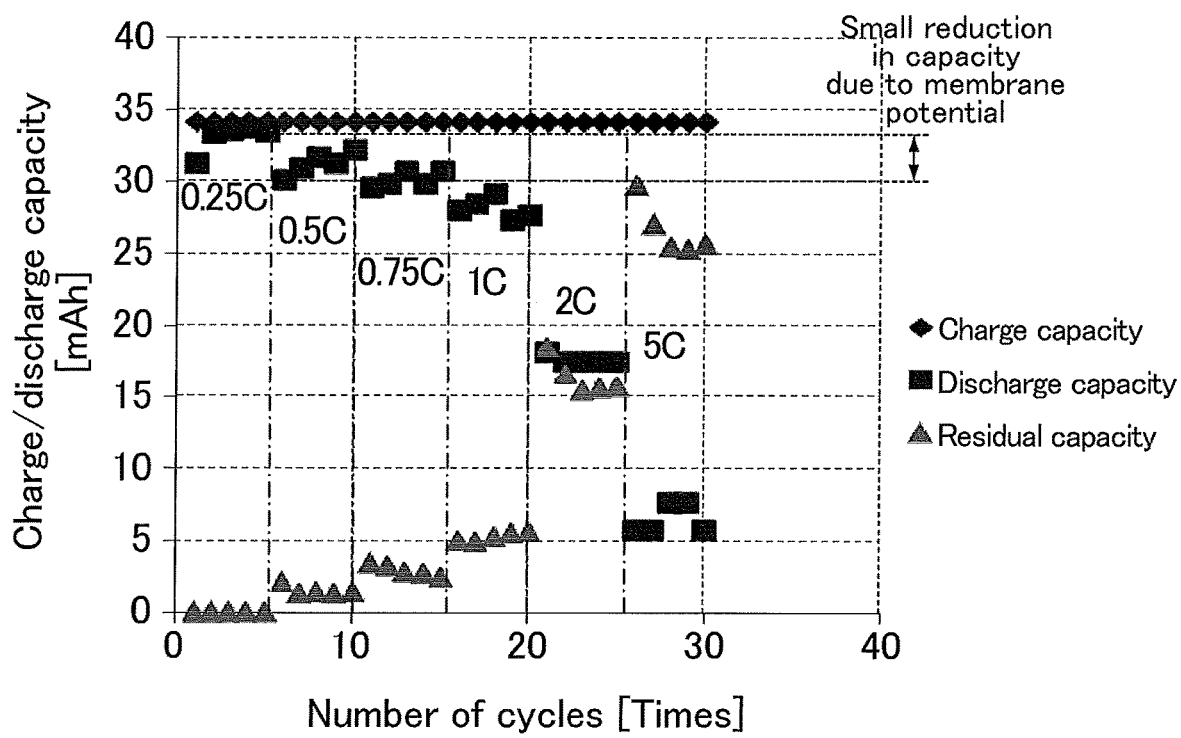
FIG. 10 is a graph showing the discharge rate characteristics of Example 1-17.
Figure 11:
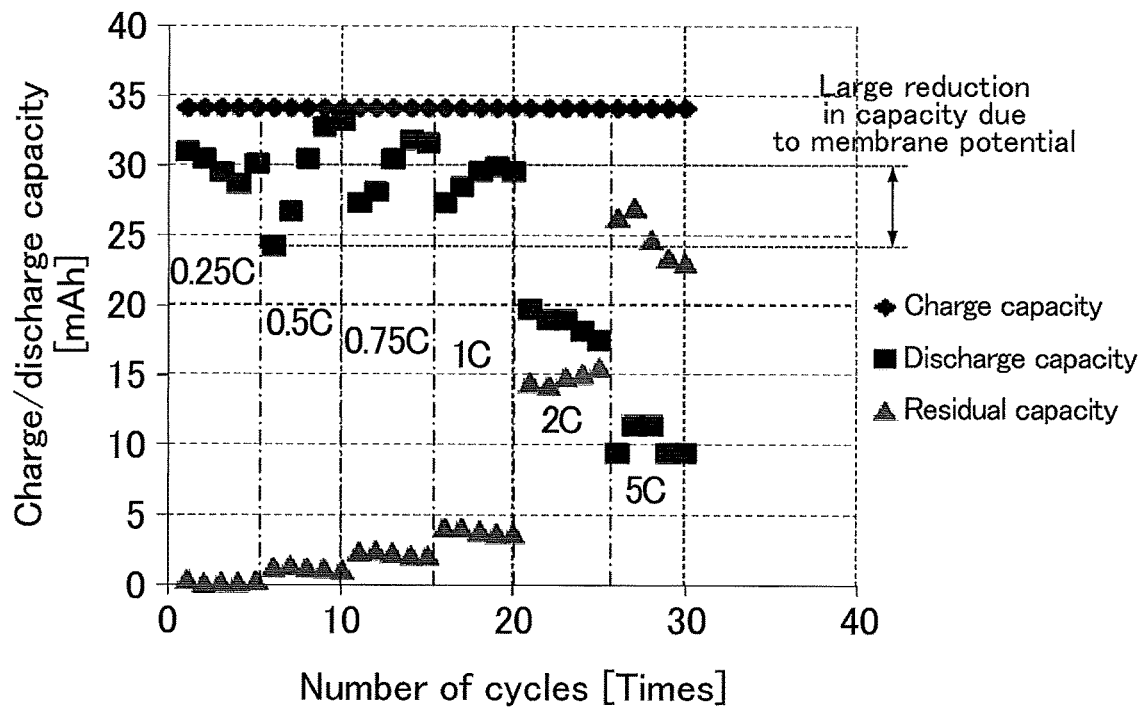
FIG. 11 is a graph showing the discharge rate characteristics of Comparative Example 1-4.

A three-electrode cell was prepared in which the anode was an anion conducting material-containing zinc anode prepared in the same manner as in Example 1-1, the cathode was a nickel electrode, the reference electrode was the same electrode as the cathode, and was 50% charged, a nonwoven fabric was disposed between the cathode and the anode, and the electrolyte solution was a saturated solution of zinc oxide in an 8 mol/L potassium hydroxide aqueous solution. The cell was subjected to the charge/discharge cycle test. The electrode area was 1.95 cm$^2$. Separately, a three-electrode cell was prepared in which two hydrophilic membranes with fine pores were inserted instead of the anion conductive membrane. Experiments to compare the discharge rate of these structures were performed in which the charge rate was fixed to 25 mA/cm$^2$ (0.25 C), and the discharge rate was set to 0.25 C, 0.5 C, 0.75 C, 1 C, 2 C, or 5 C, and five cycles were performed at each discharge rate. A graph of the discharge rate characteristics of the three-electrode cell with the anion conductive membrane (Example 1-17) is shown in FIG. 10, and a graph of the discharge rate characteristics of the three-electrode cell (Comparative Example 1-4) with two hydrophilic membranes with fine pores is shown in FIG. 11.

The results revealed that there was only a slight difference in the discharge rate characteristics between the case using the anion conductive membrane and the case using the hydrophilic membranes with fine pores, but reductions in the discharge capacity due to the membrane potential were observed upon changing the discharge rate. A comparison of the influence of the membrane potential between these cases revealed that the influence on the membrane potential was smaller in the case using the anion conductive membrane (FIG. 10) than the case using the hydrophilic membrane with fine pores (FIG. 11).

Example 1-18

The same active material composition as that used to form the zinc oxide active material layer was rolled and formed into sheets of the active material composition on both surfaces of a nonwoven fabric with a thickness of 100 μm. Then, the resulting sheets were inserted between an anode current collector (tin-plated steel plate) and the anion conducting material 10 of Example 1-1, and porous structures shown in FIG. 7 as protection members 417 were prepared. A three-electrode cell having the same structure as that in Example 1-2 was prepared, and the charge/discharge cycle test was performed under the same conditions as in Example 1-2. In the test, no reduction in the coulombic efficiency was observed, and at least 50 charge/discharge cycles could be performed stably.

Example 1-19

The same active material composition as that used to form the zinc oxide active material layer was rolled and formed into a sheet of the active material composition on one surface of a Teflon® punching sheet with a thickness of 500 µm (hole diameter: 0.75 mm). Then, the sheets were inserted between an anode current collector (tin-plated steel plate) and the anion conducting material 10 of Example 1-1, and porous structures shown in FIG. 7 as protection members 417 were prepared. A three-electrode cell was prepared as described in Example 1-2, and the charge/discharge cycle test was performed under the same conditions as in Example 1-2. In the test, no reduction in the coulombic efficiency was observed, and at least 50 charge/discharge cycles could be performed stably.

In the examples described above, the anion conducting material covering the active material layer was in the form of a membrane prepared by kneading polytetrafluoroethylene and at least one of hydrotalcite, hydroxyapatite, ettringite, polyethyleneimine, sodium polyacrylate, bismuth oxide, cobalt oxide, cerium oxide, niobium oxide, and tin oxide. The same mechanism where the anion conducting material according to the first aspect of the present invention allows anions involved in cell reactions such as hydroxide ion to permeate it, and sufficiently prevents short circuits due to dendrite formation even after repeated charge/discharge cycles functions in any cases in which the anion conducting material contains a polymer and a compound containing at least one element selected from elements of groups 1 to 17 of the periodic table, and the compound is at least one compound selected from the group consisting of an oxide, a hydroxide, a layered double hydroxide, a sulfuric acid compound, and a phosphoric acid compound.

In the examples described above, the active material layer of the zinc anode is covered with the anion conducting material according to the first aspect of the present invention, and this is a preferable embodiment of the first aspect of the present invention. Other various electrodes can be designed to exhibit the effects of the first aspect of the present invention as long as the active material and/or active material layer is/are covered with the anion conducting material according to the first aspect of the present invention. Thus, the results of the examples show that the first aspect of the present invention can be employed in the entire technical field of the first aspect of the present invention and in various embodiments disclosed herein, and produces advantageous effects.

2. Examples of the Second Aspect of the Present Invention

Figure 12:
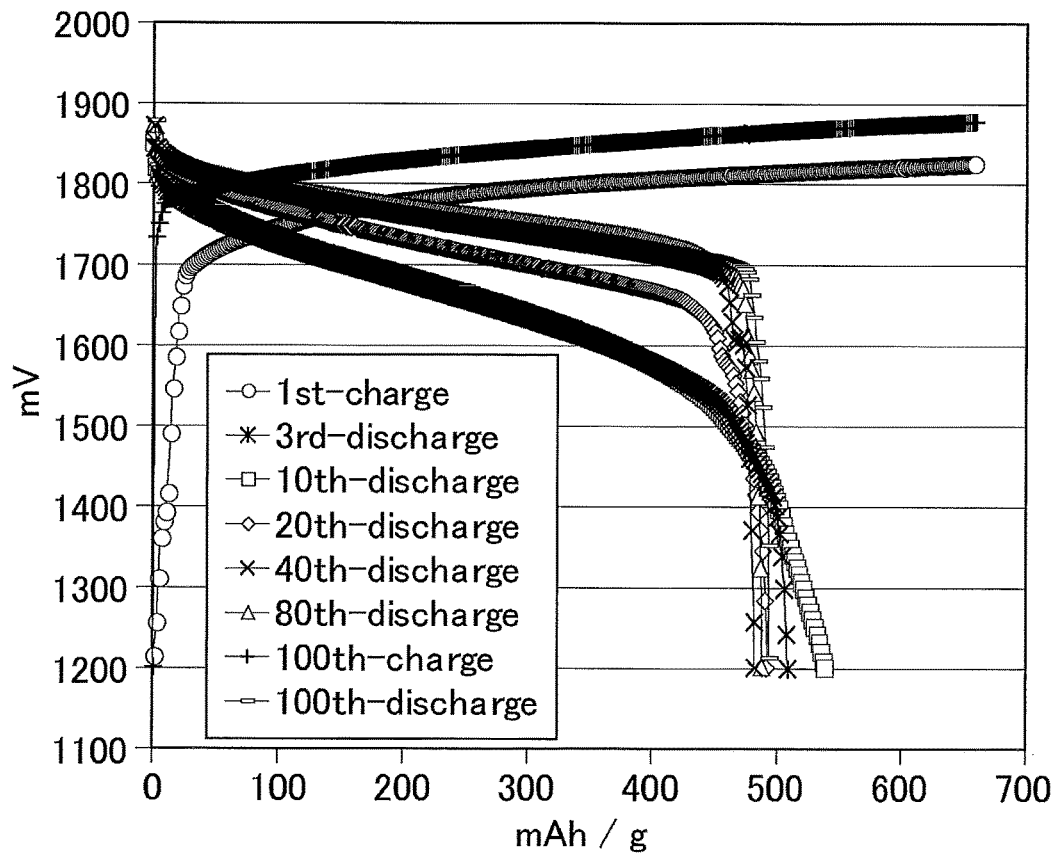
FIG. 12 is a graph showing the results of a charge/discharge test of a solid electrolyte of Example 2-1.

FIG. 12 is a graph showing the results of a charge/discharge test of a solid electrolyte of Example 2-1. In FIG. 12, "1st-charge" and "100th-charge" indicate charge curves of first and 100th charge phases, respectively. Likewise, "3rd-discharge", "10th-discharge", "20th-discharge", "40th-discharge", "80th-discharge", and "100th-discharge" indicate the discharge curves of the third, 10th, 20th, 40th, 80th, and 100th discharge phases, respectively.

Example 2-1

Zinc oxide (27.6 g), acetylene black (0.90 g), cerium(IV) oxide (2.4 g), ethanol (99.5%) (92.7 g), and water (92.7 g) were charged into a ball mill, and mixed in the ball mill. Thereafter, the mixture was dried using an evaporator at a reduced pressure at 100° C. for 2 hours, and dried overnight using a stationary-type reduced-pressure dryer at 110° C. The dried solid was grounded using a grinder (X-TREME MX1200X™, available from WARING) at 18000 rpm for 60 seconds. The resulting solid (1.1 g), a 12% polyvinylidene fluoride/N-methylpyrrolidone solution (2.0 g), and N-methylpyrrolidone (0.90 g) were charged into a glass vial, and stirred overnight with a stirrer bar in a stirrer. The resulting slurry was applied to a copper foil using an automatic applicator, and dried at 80° C. for 12 hours. The zinc mix-coated copper foil was pressed at a pressure of 3 t, and then a zinc mix electrode was punched out therefrom using a punching machine (diameter: 15.95 mm). The electrode was used to serve as a working electrode with an apparent area of 0.50 cm².

Next, acrylic acid (1.1 g) was slowly added to a saturated solution of zinc oxide in an 8 mol/L potassium hydroxide+20 g/L lithium hydroxide aqueous solution (10 g), and the mixture was then combined with hydrotalcite [$Mg_{0.8}Al_{0.2}(OH)_2$]($CO_3^{2-}$)$_{0.1}$·$mH_2O$ (0.5 g), and stirred. To this was added a 4% ammonium persulfate aqueous solution (0.4 g), and the mixture was applied to the zinc mix electrode, and polymerized in a nitrogen atmosphere. A hydrotalcite-containing acrylic acid salt solid electrolyte (1) was observed on the electrode active material and in the layer thereof by a scanning electron microscope (SEM) or a laser microscope.

Subsequently, sodium polyacrylate (weight average molecular weight: 1,500,000) (1.0 g) and hydrotalcite [$Mg_{0.8}Al_{0.2}(OH)_2$]($CO_3^{2-}$)$_{0.1}$·$mH_2O$ (1.5 g) were added to a saturated solution of zinc oxide in an 8 mol/L potassium hydroxide+20 g/L lithium hydroxide aqueous solution (8.2 g), and the mixture was stirred. Thus, a hydrotalcite-containing acrylic acid salt solid electrolyte (2) was prepared.

A coin cell in which the counter electrode was a nickel electrode (active material: cobalt-coated nickel hydroxide, capacity: three or more times larger than that of the zinc electrode), and the hydrotalcite-containing acrylic acid salt solid electrolyte (2) (thickness: 1 mm) prepared above was used as a gel electrolyte was subjected to a charge/discharge test with a current value of 0.89 mA (periods of charge and discharge: 1 hour each/cut-off potential: 1.9 V and 1.2 V). The results are shown in FIG. 12. As seen in FIG. 12, charge and discharge could be performed stably at high capacity in Example 2-1 using the solid electrolyte according to the second aspect of the present invention. Observation of the zinc mix electrode with a SEM or a laser microscope after the 100-cycle charge/discharge test confirmed that the electrode showed no deterioration including cracks and deformation of the active material. Additionally, no change was visually observed in the hydrotalcite-containing acrylic acid salt solid electrolyte (2).

Example 2-2

A zinc mix electrode was prepared in the same manner as in Example 2-1. The electrode was used to serve as a working electrode with an apparent area of 0.50 cm². Next, a hydrotalcite-containing acrylic acid salt solid electrolyte (2) was prepared in the same manner as in Example 2-1, and applied to the zinc mix electrode, and the electrode was left standing for 24 hours. Observation with a SEM or a laser microscope confirmed that the hydrotalcite-containing acrylic acid salt solid electrolyte (2) was formed on the electrode active material and partially in the layer thereof by this process.

A coin cell in which the counter electrode was a nickel electrode (active material: cobalt-coated nickel hydroxide, capacity: three or more times larger than that of the zinc electrode), and the hydrotalcite-containing acrylic acid salt solid electrolyte (2) (thickness: 1 mm) prepared above was used as a gel electrolyte was subjected to a charge/discharge test with a current value of 1.0 mA (periods of charge and discharge: 1 hour each). The discharge capacity at the 100th cycle was 504 mAh/g. Observation of the zinc mix electrode with a SEM or a laser microscope after the 100-cycle charge/discharge test confirmed that the electrode showed no deterioration including cracks and deformation of the active material. Additionally, no change was visually observed in the hydrotalcite-containing acrylic acid salt solid electrolyte (2).

Example 2-3

A 60% polytetrafluoroethylene aqueous solution (0.2 g), a 2% sodium polyacrylate (weight average molecular weight: 1,500,000) aqueous solution (0.1 g), and water were added to zinc oxide (0.86 g), zinc (0.26 g), and hydrotalcite $[Mg_{0.67}Al_{0.33}(OH)_2](CO_3^{2-})_{0.165} \cdot mH_2O$ (0.1 g), and stirred in an agate mortar. The resulting solid was compressed using a rolling mill, and pressure-bonded to a copper mesh current collector with a roll pressing machine (active material layer thickness: about 300 μm on each surface). Thus, a zinc mix electrode was prepared. The electrode was used to serve as a working electrode with an apparent area of 1 cm$^2$.

A three-electrode cell in which the electrolyte solution was a saturated solution of zinc oxide in a 4 mol/L potassium hydroxide aqueous solution, the separator was a nonwoven fabric, and the counter electrode was a nickel electrode (active material: cobalt-coated nickel hydroxide, capacity: 0.7 times larger than that of the zinc electrode) was subjected to a charge/discharge test with a current value of 10 mA/cm$^2$ (periods of charge and discharge: 1 hour each). At least 50 charge/discharge cycles could be performed. Observation of the zinc mix electrode using a SEM or a laser microscope after the 50-cycle charge/discharge test confirmed that the electrode showed no deterioration including cracks and deformation of the active material. Also, the copper as a current collector was observed to be plated with zinc.

Example 2-4

A zinc mix electrode was prepared in the same manner as in Example 2-3, except that a 2% carboxymethyl cellulose aqueous solution was used instead of the 2% sodium polyacrylate aqueous solution (0.1 g), and the electrode was used to serve as a working electrode with an apparent area of 1 cm$^2$.

A three-electrode cell in which the electrolyte solution was a saturated solution of zinc oxide in a 4 mol/L potassium hydroxide aqueous solution, the separator was a nonwoven fabric, and the counter electrode was a nickel electrode (active material: cobalt-coated nickel hydroxide, capacity: 1.8 times larger than that of the zinc electrode) was subjected to a charge/discharge test with a current value of 10 mA/cm$^2$ (periods of charge and discharge: 1 hour each). At least 50 charge/discharge cycles could be performed. Observation of the zinc mix electrode using a SEM or a laser microscope after the 50-cycle charge/discharge test confirmed that the electrode showed no deterioration including cracks and deformation of the active material in the electrode. Also, the copper as a current collector was observed to be plated with zinc.

Comparative Example 2-1

A zinc mix electrode was prepared in the same manner as in Example 2-1, except that cerium oxide was not used, and the electrode was used to serve as a working electrode with an apparent area of 0.50 cm$^2$. Next, an acrylic acid salt solid electrolyte (3) was prepared by adding sodium polyacrylate (weight average molecular weight: 1,500,000) (1.0 g) to a saturated solution of zinc oxide in an 8 mol/L potassium hydroxide+20 g/L lithium hydroxide aqueous solution (8.2 g), and stirring the mixture. The electrolyte was applied to the zinc mix electrode, and the electrode was left standing for 24 hours. Observation with a SEM or a laser microscope confirmed that the acrylic acid salt solid electrolyte (3) was formed on the electrode active material and partially in the layer thereof by this process.

A coin cell in which the counter electrode was a nickel electrode (active material: cobalt-coated nickel hydroxide, capacity: three or more times larger than that of the zinc electrode), and the acrylic acid salt solid electrolyte (3) prepared above (thickness: 1 mm) was used as a gel electrolyte was subjected to a charge/discharge test with a current value of 0.90 mA (periods of charge and discharge: 1 hour each). Charge and discharge could not be repeated any more at the 48th cycle. Observation of the zinc mix electrode after the 48th-cycle charge/discharge test using a SEM or a laser microscope confirmed deformation of the electrode active material, and poor bonding between particles of the active material or the like. Also, dendrite growth of the zinc species in the acrylic acid salt solid electrolyte (3) from the anode to the cathode was visually observed. This suggests that a short circuit was a reason why the coin cell could not be charged and discharged any more.

Comparative Example 2-2

A zinc mix electrode was prepared in the same manner as in Example 2-1, except that cerium oxide was not added, and the electrode was used to serve as a working electrode with an apparent area of 2 cm$^2$. A coin cell in which the counter electrode was a nickel electrode (active material: cobalt-coated nickel hydroxide, capacity: three or more times larger than that of the zinc electrode), the electrolyte solution was a saturated solution of zinc oxide in an 8 mol/L potassium hydroxide+20 g/L lithium hydroxide aqueous solution (8.2 g), and two nonwoven fabrics and a hydrophilic membrane with fine pores were inserted between the zinc electrode and the nickel electrode as separators, and was subjected to the charge/discharge test with a current value of 3.2 mA (periods of charge and discharge: 1 hour each). However, the discharge capacity gradually decreased as the coin cell expanded due to generation of oxygen from the nickel electrode and/or hydrogen from the zinc electrode. At the 19th cycle, the cell could not be charged or discharged any more.

Example 2-5

To hydrotalcite $[Mg_{0.8}Al_{0.2}(OH)_2](CO_3^{2-})_{0.1} \cdot mH_2O$ (2.0 g) were added polytetrafluoroethylene (3 g) and water, and the mixture was stirred in an agate mortar. The resulting solid was compressed with a rolling mill, and rolled using a roll press machine. Thus, a solid electrolyte was prepared.

Next, a 60% polytetrafluoroethylene aqueous solution (0.033 g) and water were added to zinc oxide (0.61 g) and bismuth oxide (0.019 g), and the mixture was stirred in an agate mortar. The resulting solid was compressed using a rolling mill, and pressure-bonded to a copper mesh current collector with a roll pressing machine. Then, the solid electrolyte was pressure-bonded with a roll press machine.

The zinc mix electrode with the solid electrolyte on the active material was used to serve as a working electrode with an apparent area of 1 cm².

A three-electrode cell in which the electrolyte solution was a saturated solution of zinc oxide in an 8 mol/L potassium hydroxide aqueous solution, the separator was a nonwoven fabric, the counter electrode was a nickel electrode (active material: cobalt-coated nickel hydroxide, capacity: 0.7 times larger than that of the zinc electrode), and the reference electrode was the same electrode as the cathode (counter electrode), and was 50% charged was subjected to a charge/discharge test with a current value of 25 mA/cm² (periods of charge and discharge: 1 hour each). A cycle life of at least 200 cycles was observed (charge/discharge coulombic efficiency at the 200th cycle: 88.6%). Observation of the zinc mix electrode after the 200-cycle charge/discharge test using SEM confirmed no deterioration such as dendrite formation and remarkable deformation of the active material. Similar results were obtained in the cases of replacing the copper mesh current collector by a nickel-plated steel plate, a tin-plated steel plate, and a zinc-plated steel plate.

Figure 13:
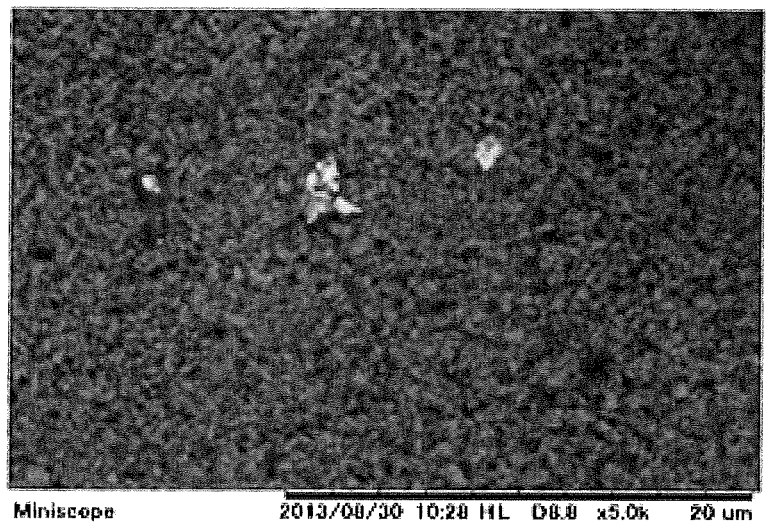
FIG. 13 is a microscopic photograph of a zinc mix electrode before a 200-cycle charge/discharge test in Example 2-5.
Figure 14:
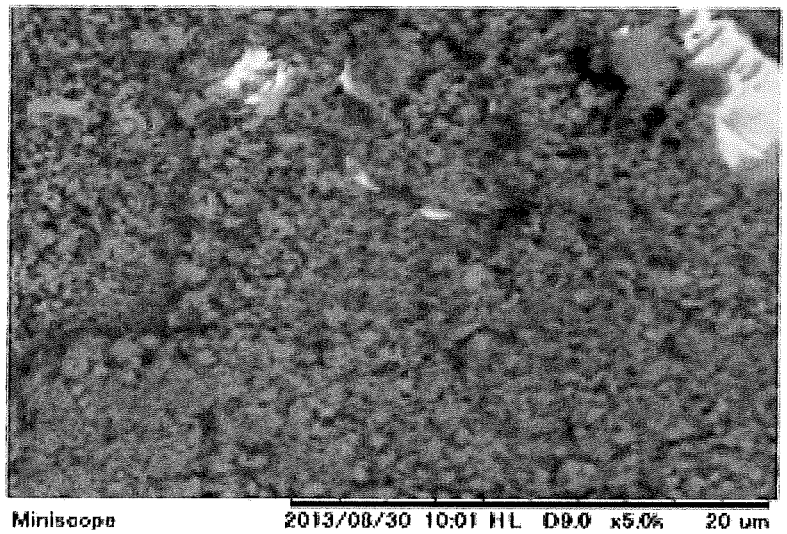
FIG. 14 is a microscopic photograph of a zinc mix electrode after the 200-cycle charge/discharge test in Example 2-5.

For reference, FIGS. 13 and 14 show the SEM photographs of the zinc mix electrode of Example 2-5 before and after the 200-cycle charge/discharge test.

Example 2-6

A solid electrolyte was prepared in the same manner as in Example 2-5.

Next, a 60% polytetrafluoroethylene aqueous solution (0.033 g) and water were added to zinc oxide (0.61 g) and bismuth oxide nanoparticles (0.019 g, average particle size: 87 nm), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 94.5%). SEM observation of the zinc mix electrode after the 200-cycle charge/discharge test confirmed no deterioration such as dendrite formation and remarkable deformation of the active material.

Example 2-7

A solid electrolyte was prepared in the same manner as in Example 2-5.

Next, a 60% polytetrafluoroethylene aqueous solution (0.033 g) and water were added to zinc oxide (0.61 g) and tin oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 90.8%). SEM observation of the zinc mix electrode after the 200-cycle charge/discharge test confirmed no deterioration such as dendrite formation and remarkable deformation of the active material.

Figure 15:
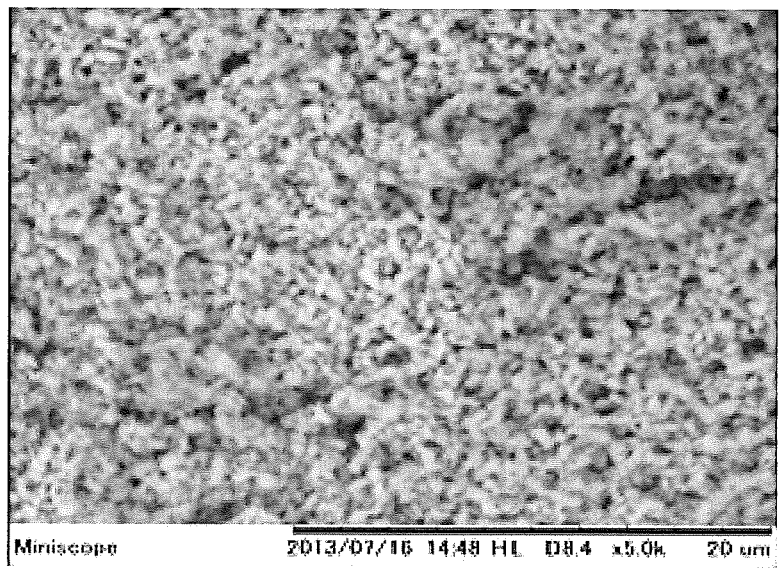
FIG. 15 is a microscopic photograph of a zinc mix electrode before a 200-cycle charge/discharge test in Example 2-7.
Figure 16:
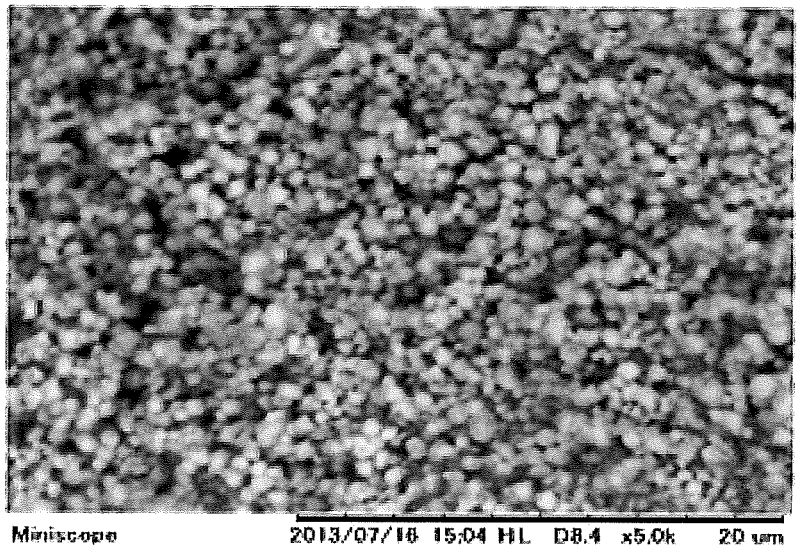
FIG. 16 is a microscopic photograph of a zinc mix electrode after the 200-cycle charge/discharge test in Example 2-7.

For reference, FIGS. 15 and 16 show the SEM photographs of the zinc mix electrode of Example 2-7 before and after the 200-cycle charge/discharge test.

Example 2-8

A 2% sodium polyacrylate (weight average molecular weight: 1,500,000) (0.1 g), polytetrafluoroethylene (3 g), and water were added to hydrotalcite $[Mg_{0.8}Al_{0.2}(OH)_2]$ $(CO_3^{2-})_{0.1} \cdot mH_2O$ (2.0 g), and the mixture was stirred in an agate mortar. The resulting solid was compressed with a rolling mill, and rolled using a roll press machine. Thus, a solid electrolyte was prepared.

Next, a 60% polytetrafluoroethylene aqueous solution (0.033 g) and water were added to zinc oxide (0.61 g) and bismuth oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 92.8%). SEM observation of the zinc mix electrode after the 200-cycle charge/discharge test confirmed no deterioration such as dendrite formation and remarkable deformation of the active material.

Example 2-9

A solid electrolyte was prepared in the same manner as in Example 2-5.

Next, a 60% polytetrafluoroethylene aqueous solution (0.033 g) and water were added to zinc oxide (0.61 g) and indium oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 90.3%). SEM observation of the zinc mix electrode after the 200-cycle charge/discharge test confirmed no deterioration such as dendrite formation and remarkable deformation of the active material.

Figure 17:
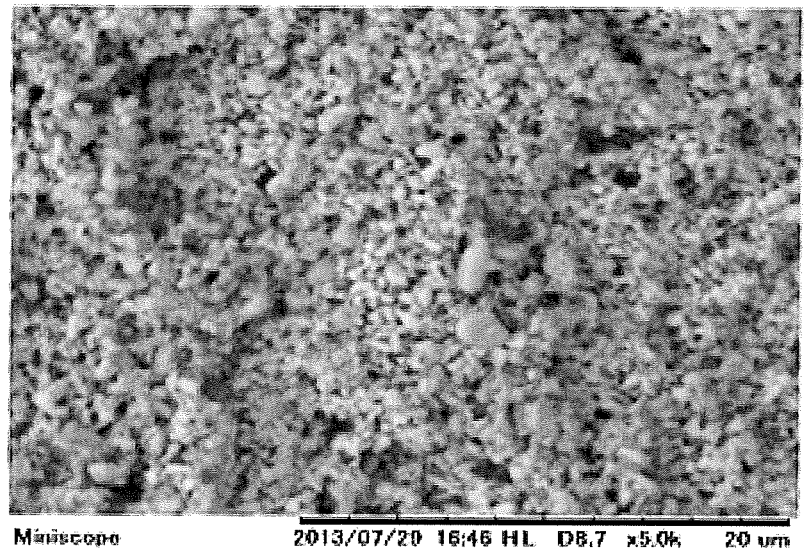
FIG. 17 is a microscopic photograph of a zinc mix electrode before a 200-cycle charge/discharge test in Example 2-9.
Figure 18:
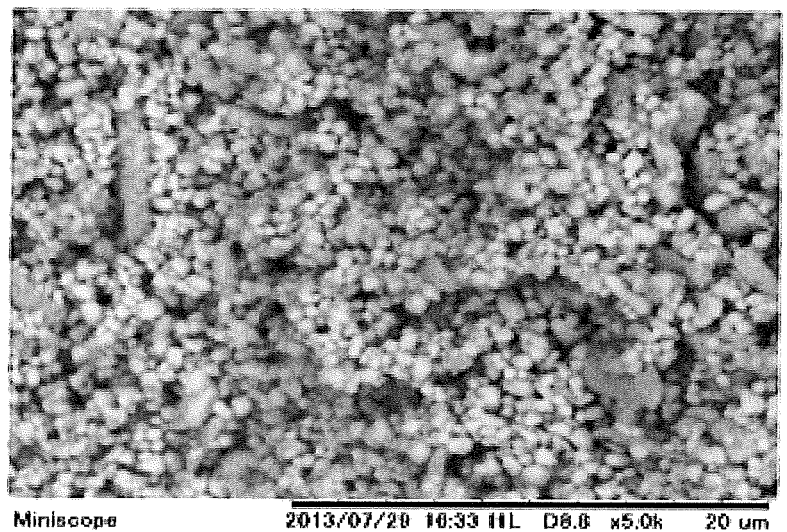
FIG. 18 is a microscopic photograph of a zinc mix electrode after the 200-cycle charge/discharge test in Example 2-9.

For reference, FIGS. 17 and 18 show the SEM photographs of the zinc mix electrode of Example 2-9 before and after the 200-cycle charge/discharge test.

Example 2-10

A solid electrolyte was prepared in the same manner as in Example 2-5.

Next, a 60% polytetrafluoroethylene aqueous solution (0.033 g) and water were added to zinc oxide (0.61 g) and calcium oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 89.8%). SEM observation of the zinc mix electrode after the 200-cycle charge/discharge test confirmed no deterioration such as dendrite formation and remarkable deformation of the active material.

Example 2-11

A solid electrolyte was prepared in the same manner as in Example 2-5.

Next, a 60% polytetrafluoroethylene aqueous solution (0.033 g) and water were added to zinc oxide (0.61 g) and yttrium oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 91.0%). SEM observation of the zinc mix electrode after the 200-cycle charge/discharge test confirmed no deterioration such as dendrite formation and remarkable deformation of the active material.

Figure 19:
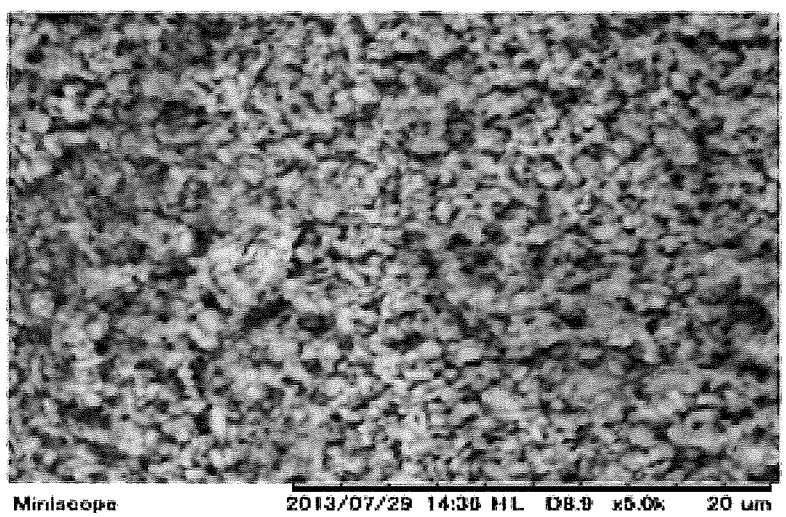
FIG. 19 is a microscopic photograph of a zinc mix electrode before a 200-cycle charge/discharge test in Example 2-11.
Figure 20:
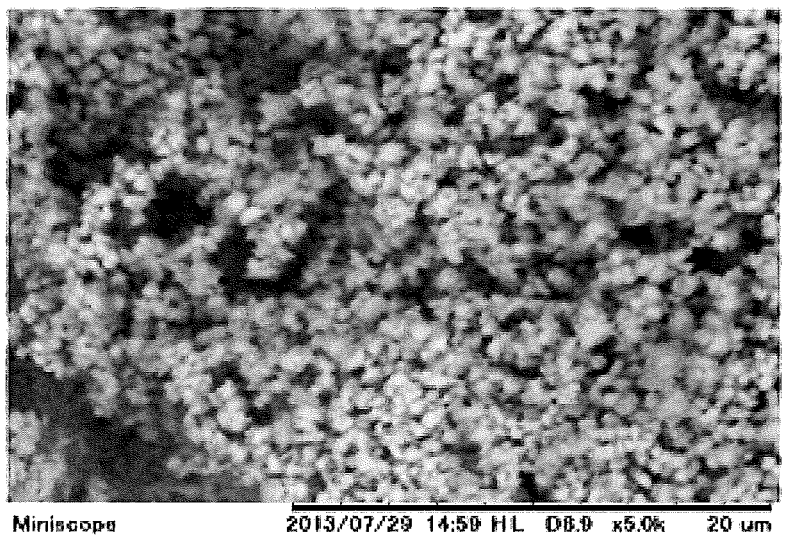
FIG. 20 is a microscopic photograph of a zinc mix electrode after the 200-cycle charge/discharge test in Example 2-11.

For reference, FIGS. 19 and 20 show the SEM photographs of the zinc mix electrode of Example 2-11 before and after the 200-cycle charge/discharge test.

Example 2-12

A solid electrolyte was prepared in the same manner as in Example 2-5.

Next, a 60% polytetrafluoroethylene aqueous solution (0.033 g) and water were added to zinc oxide (0.61 g) and lanthanum oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 92.2%). SEM observation of the zinc mix electrode after the 200-cycle charge/discharge test confirmed no deterioration such as dendrite formation and remarkable deformation of the active material.

Example 2-13

A solid electrolyte was prepared in the same manner as in Example 2-5.

Next, a 60% polytetrafluoroethylene aqueous solution (0.033 g) and water were added to zinc oxide (0.61 g) and cerium oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 91.7%). SEM observation of the zinc mix electrode after the 200-cycle charge/discharge test confirmed no deterioration such as dendrite formation and remarkable deformation of the active material.

Example 2-14

A solid electrolyte was prepared in the same manner as in Example 2-5.

Next, a 60% polytetrafluoroethylene aqueous solution (0.033 g) and water were added to zinc oxide (0.61 g) and titanium oxide (0.019 g), and the mixture was stirred in an agate mortar. The resulting solid was compressed using a rolling mill, and pressure-bonded to a copper mesh current collector with a roll pressing machine (active material layer thickness: about 300 μm on each surface). Then, the solid electrolyte was pressure-bonded using a rolling press machine. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 89.1%). SEM observation of the zinc mix electrode after the 200-cycle charge/discharge test confirmed no deterioration such as dendrite formation and remarkable deformation of the active material.

Example 2-15

A solid electrolyte was prepared in the same manner as in Example 2-5.

Next, a 60% polytetrafluoroethylene aqueous solution (0.033 g) and water were added to zinc oxide (0.61 g) and zirconium oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 86.2%). SEM observation of the zinc mix electrode after the 200-cycle charge/discharge test confirmed no deterioration such as dendrite formation and remarkable deformation of the active material.

Figure 21:
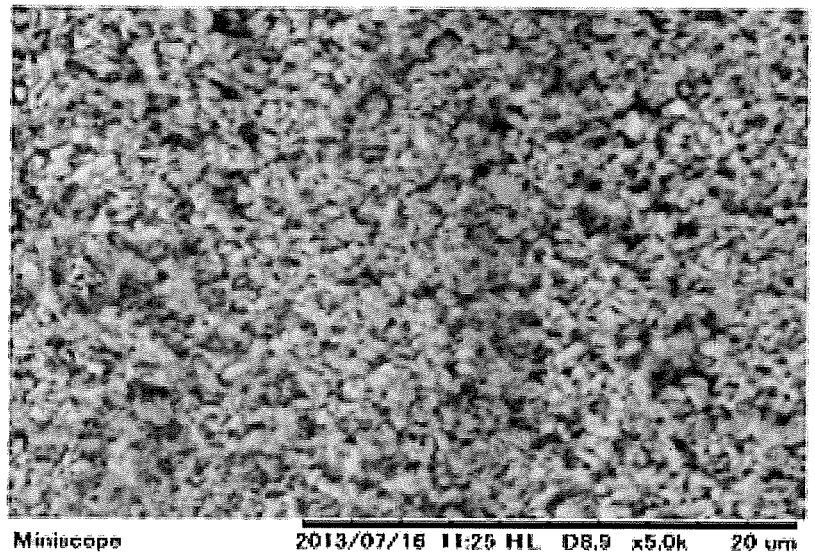
FIG. 21 is a microscopic photograph of a zinc mix electrode before a 200-cycle charge/discharge test in Example 2-15.
Figure 22:
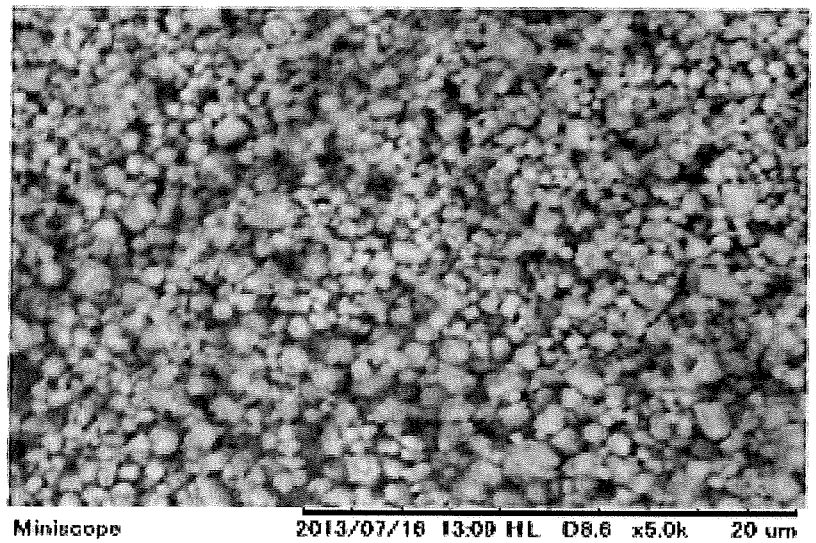
FIG. 22 is a microscopic photograph of a zinc mix electrode after the 200-cycle charge/discharge test in Example 2-15.

For reference, FIGS. 21 and 22 show the SEM photographs of the zinc mix electrode of Example 2-15 before and after the 200-cycle charge/discharge test.

Example 2-16

A solid electrolyte was prepared in the same manner as in Example 2-5.

Next, a 60% polytetrafluoroethylene aqueous solution (0.033 g) and water were added to zinc oxide (0.61 g) and niobium oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 94.5%). SEM observation of the zinc mix electrode after the 200-cycle charge/discharge test confirmed no deterioration such as dendrite formation and remarkable deformation of the active material.

Example 2-17

A solid electrolyte was prepared in the same manner as in Example 2-5.

Next, a 60% polytetrafluoroethylene aqueous solution (0.033 g) and water were added to zinc oxide (0.61 g) and boric acid (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 88.3%). SEM observation of the zinc mix electrode after the 200-cycle charge/discharge test confirmed no deterioration such as dendrite formation and remarkable deformation of the active material.

Example 2-18

A solid electrolyte was prepared in the same manner as in Example 2-5.

Next, a 60% polytetrafluoroethylene aqueous solution (0.033 g) and water were added to zinc oxide (0.61 g) and aluminum oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 92.9%). SEM observation of the zinc mix electrode after the 200-cycle charge/discharge test confirmed no deterioration such as dendrite formation and remarkable deformation of the active material.

Example 2-19

A solid electrolyte was prepared in the same manner as in Example 2-5.

Next, a 60% polytetrafluoroethylene aqueous solution (0.033 g) and water were added to zinc oxide (0.61 g) and gallium oxide (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 92.8%). SEM observation of the zinc mix electrode after the 200-cycle charge/discharge test confirmed no deterioration such as dendrite formation and remarkable deformation of the active material.

Example 2-20

A solid electrolyte was prepared in the same manner as in Example 2-5.

Next, a 60% polytetrafluoroethylene aqueous solution (0.033 g) and water were added to zinc oxide (0.61 g) and hydroxyapatite (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 89.2%). SEM observation of the zinc mix electrode after the 200-cycle charge/discharge test confirmed no deterioration such as dendrite formation and remarkable deformation of the active material.

Example 2-21

A solid electrolyte was prepared in the same manner as in Example 2-5.

Next, a 60% polytetrafluoroethylene aqueous solution (0.033 g) and water were added to zinc oxide (0.61 g) and sodium dodecyl sulfate (0.0063 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 75.6%). SEM observation of the zinc mix electrode after the 200-cycle charge/discharge test confirmed no deterioration such as dendrite formation and remarkable deformation of the active material.

Figure 23:
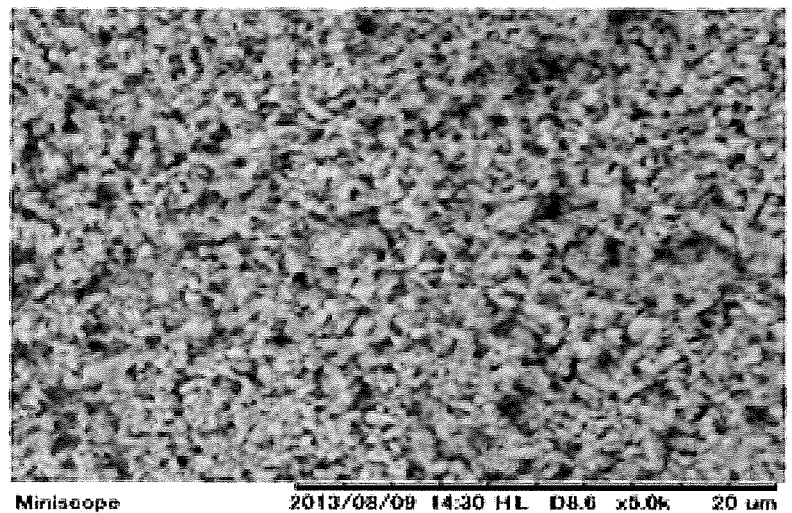
FIG. 23 is a microscopic photograph of a zinc mix electrode before a 200-cycle charge/discharge test in Example 2-21.
Figure 24:
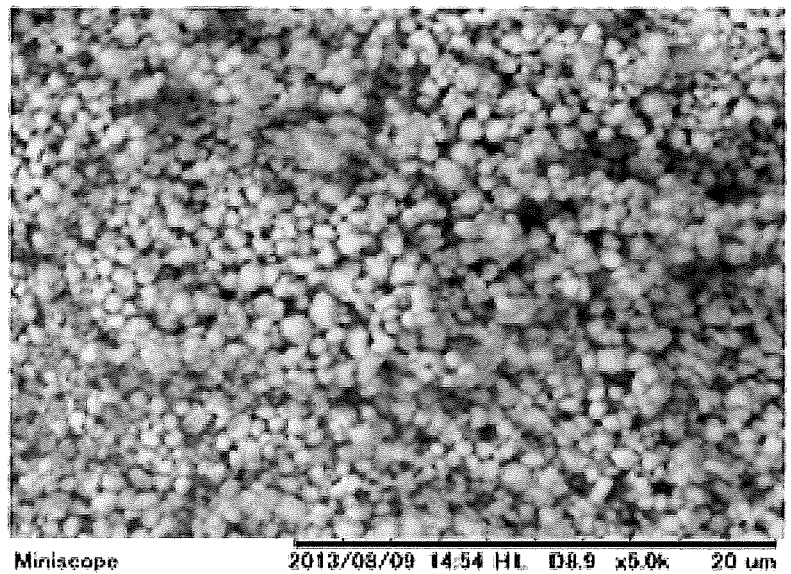
FIG. 24 is a microscopic photograph of a zinc mix electrode after the 200-cycle charge/discharge test in Example 2-21.

For reference, FIGS. 23 and 24 show the SEM photographs of the zinc mix electrode of Example 2-21 before and after the 200-cycle charge/discharge test.

Example 2-22

A solid electrolyte was prepared in the same manner as in Example 2-5.

Next, a 60% polytetrafluoroethylene aqueous solution (0.033 g) and water were added to zinc oxide (0.61 g) and tetrabutylammonium bromide (0.0063 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 86.4%). SEM observation of the zinc mix electrode after the 200-cycle charge/discharge test confirmed no deterioration such as remarkable deformation of the active material.

Figure 25:
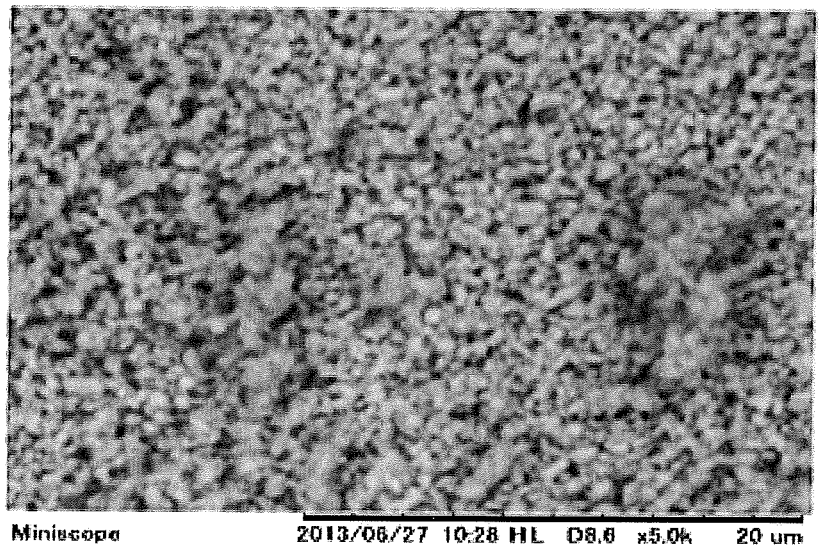
FIG. 25 is a microscopic photograph of a zinc mix electrode before a 200-cycle charge/discharge test in Example 2-22.
Figure 26:
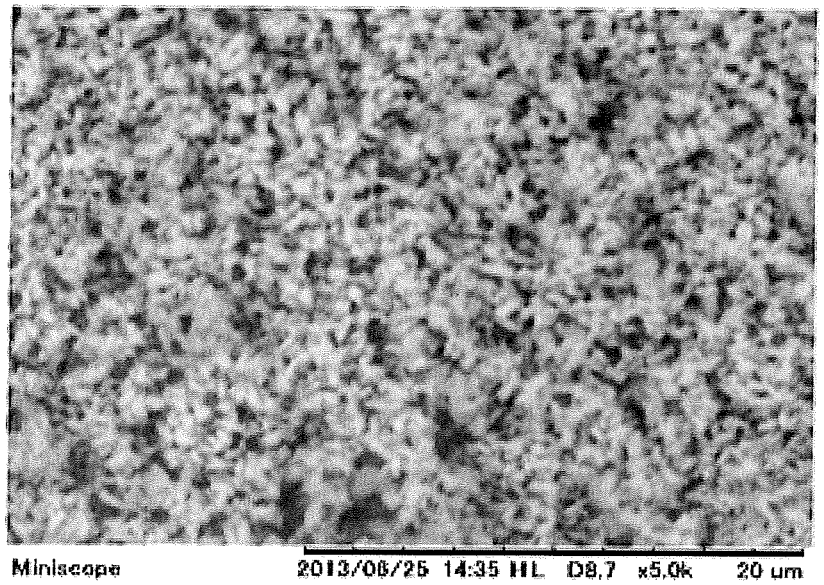
FIG. 26 is a microscopic photograph of a zinc mix electrode after the 200-cycle charge/discharge test in Example 2-22.

For reference, FIGS. 25 and 26 show the SEM photographs of the zinc mix electrode of Example 2-22 before and after the 200-cycle charge/discharge test.

Example 2-23

A solid electrolyte was prepared in the same manner as in Example 2-5.

Next, a 60% polytetrafluoroethylene aqueous solution (0.033 g) and water were added to zinc oxide (0.61 g) and thiourea (0.019 g), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 87.0%). SEM observation of the zinc mix electrode after the 200-cycle charge/discharge test confirmed no deterioration such as dendrite formation and remarkable deformation of the active material.

Example 2-24

A solid electrolyte was prepared in the same manner as in Example 2-5.

Next, a 60% polytetrafluoroethylene aqueous solution (0.033 g) and water were added to zinc oxide (0.61 g), bismuth oxide nanoparticles (0.0095 g, average particle size: 87 nm) and cerium oxide nanoparticles (0.0095 g, average particle size: 15 nm), and the mixture was stirred in an agate mortar. Thus, a working electrode was prepared in the same manner as in Example 2-5.

The charge/discharge test was performed in the same manner as in Example 2-5 (periods of charge and discharge: 1 hour each), and a cycle life of at least 200 cycles was observed (charge/discharge coulombic efficiency at the 200th cycle: 86.5%). SEM observation of the zinc mix electrode after the 200-cycle charge/discharge test confirmed no deterioration such as dendrite formation and remarkable deformation of the active material.

Figure 27:
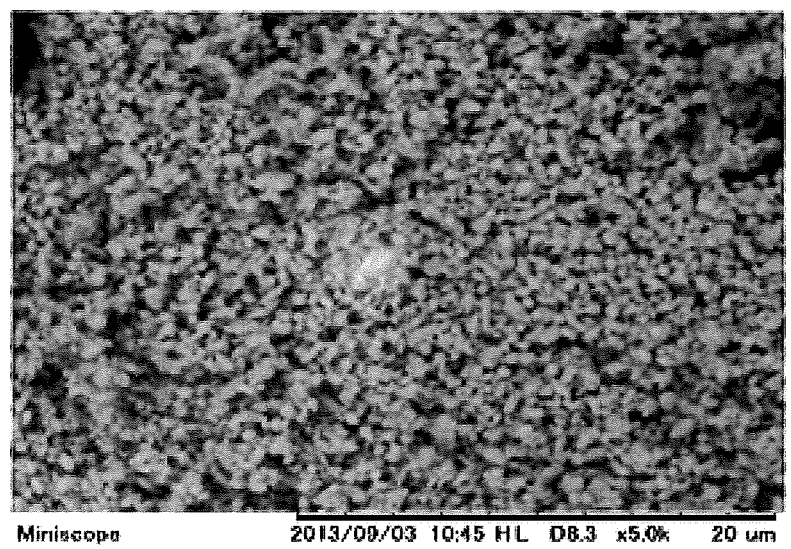
FIG. 27 is a microscopic photograph of a zinc mix electrode before a 200-cycle charge/discharge test in Example 2-24.
Figure 28:
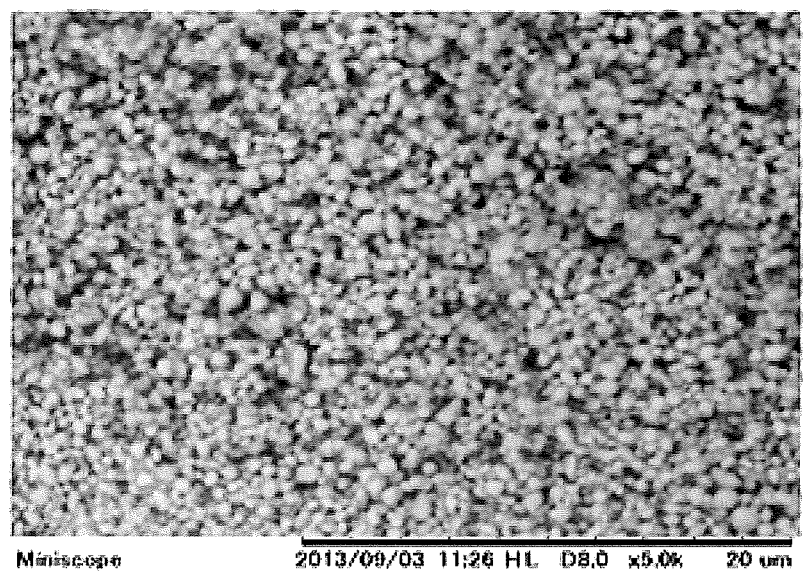
FIG. 28 is a microscopic photograph of a zinc mix electrode after the 200-cycle charge/discharge test in Example 2-24.

For reference, FIGS. 27 and 28 show the SEM photographs of the zinc mix electrode of Example 2-24 before and after the 200-cycle charge/discharge test.

Example 2-25

A solid electrolyte was prepared in the same manner as in Example 2-5.

Next, a 60% polytetrafluoroethylene aqueous solution (2.0 g) and water were added to zinc oxide (28.5 g), bismuth oxide (1.5 g), and a 27% polyolefin aqueous solution (1 g), and the mixture was stirred in an agate mortar. The resulting solid was compressed using a rolling mill, and pressure-bonded to a copper mesh current collector with a roll pressing machine (theoretical capacity: 80 mAh/cm$^2$). Then, the solid electrolyte was pressure-bonded using a rolling press machine. The zinc mix electrode with the solid electrolyte on the active material was used to serve as a working electrode with an apparent area of 1.95 cm$^2$.

A three-electrode cell in which the electrolyte solution was a saturated solution of zinc oxide in an 8 mol/L potassium hydroxide aqueous solution, the separator was a nonwoven fabric, the counter electrode was a nickel electrode (active material: cobalt-coated nickel hydroxide, capacity: 1-fold of the capacity of the zinc electrode), and the reference electrode was the same electrode as the cathode (counter electrode), and was 50% charged was subjected to a charge/discharge test with a current value of 20 mA/cm$^2$ (periods of charge and discharge: 1 hour each). A cycle life of at least 200 cycles was observed. SEM observation of the zinc mix electrode after the 200-cycle charge/discharge test confirmed no deterioration such as dendrite formation and remarkable deformation of the active material.

Example 2-26

A solid electrolyte was prepared in the same manner as in Example 2-5.

Next, a 60% polytetrafluoroethylene aqueous solution (2 g) and water were added to zinc oxide (28.5 g), bismuth oxide (1.5 g), and 100% polyethyleneimine (2.0 g), and the mixture was stirred in an agate mortar. Thus, a working electrode was prepared in the same manner as in Example 2-25.

The charge/discharge test was performed in the same manner as in Example 2-25 (periods of charge and discharge: 1 hour each), and a cycle life of at least 150 cycles was observed. SEM observation of the zinc mix electrode after the 150-cycle charge/discharge test confirmed no deterioration such as dendrite formation and remarkable deformation of the active material.

Example 2-27

A solid electrolyte was prepared in the same manner as in Example 2-5.

Next, a 60% polytetrafluoroethylene aqueous solution (2.0 g) and water were added to zinc oxide (28.5 g), bismuth oxide (1.5 g), and a 2% sodium polyacrylate aqueous solution (15 g), and the mixture was stirred in an agate mortar. A working electrode was prepared in the same manner as in Example 2-25.

The charge/discharge test was performed in the same manner as in Example 2-25 (periods of charge and discharge: 1 hour each), and a cycle life of at least 200 cycles was observed. SEM observation of the zinc mix electrode after the 200-cycle charge/discharge test confirmed no deterioration such as dendrite formation and remarkable deformation of the active material.

The following was shown by the results of the examples.

It is demonstrated that sufficient prevention of changes in the form/shape of the active material and production of a cell with sufficiently improved cell performance can be achieved by a zinc anode that includes a current collector and an active material layer containing a zinc species, wherein the zinc anode includes a solid electrolyte on and/or in the active material layer, the solid electrolyte contains a polyvalent ion and/or an inorganic compound, and the polyvalent ion and/or the inorganic compound contain(s) at least one element selected from Li, Na, K, Rb, Cs, elements of groups 2 to 14, P, Sb, Bi, elements of group 16, and elements of group 17 of the periodic table.

Specific inorganic compounds were used in the examples as the polyvalent ion and/or inorganic compound. When the zinc anode according to the second aspect of the present invention includes a solid electrolyte on and/or in the active material layer, and therefore can sufficiently prevent changes in the form/shape of the active material, and when the solid electrolyte contains a polyvalent ion and/or an inorganic compound containing at least one element selected from Li, Na, K, Rb, Cs, elements of groups 2 to 14, P, Sb, Bi, elements of group 16, and elements of group 17 of the periodic table, expansion and contraction of the solid electrolyte can be prevented, electron conduction paths can be maintained, and problems such as cracks in the electrode active material layer can be prevented. Further, the polyvalent ion and/or inorganic compound confers) sufficiently high ion conductivity. In any cases using a polyvalent ion and/or an inorganic compound containing at least one element selected from Li, Na, K, Rb, Cs, elements of groups 2 to 14, P, Sb, Bi, elements of group 16, and elements of group 17 of the periodic table, a cell with sufficiently improved cell performance can be similarly obtained.

Accordingly, the results of the examples demonstrate that the second aspect of the present invention can be employed in the entire technical field of the second aspect of the present invention and in various embodiments disclosed herein, and produces advantageous effects.

REFERENCE SIGNS LIST 10, 10', 20', 20", 110, 210, 310, 410: Anion conducting material
11, 11', 11", 21, 21', 21", 111, 121, 211, 221, 311, 321, 411, 421: Current collector
13, 13', 13", 23, 23', 23", 113, 123, 223, 313, 323, 413, 423: Active material layer
30, 30', 30", 130, 230, 330, 430: Separator
213: Active material particle
315, 415: Insulating protection member
417: Protection member

The invention claimed is:

1. An electrode comprising:
a current collector;
an active material layer containing an active material that includes a zinc-containing compound; and
an anion conducting material,
wherein the anion conducting material contains a polymer and an inorganic compound,
the active material layer is covered with the anion conducting material, and the electrode is configured so that, when the electrode is incorporated in a cell, the active material layer is at least partially covered to prevent the active material from being in direct contact with an electrolyte of the cell, the inorganic compound is at least one compound selected from the group consisting of magnesium hydroxide and a layered double hydroxide, and the layered double hydroxide contains at least one cation element selected from the group consisting of Mg, Fe, Ca, Li, Ni, Co, and Cu, and at least another cation element selected from the group consisting of Al and Mn.

2. The electrode according to claim 1, wherein the polymer contains at least one selected from the group consisting of an aromatic group, a halogen atom, a carboxyl group, a carboxylate group, a hydroxyl group, an amino group, and an ether group, or is a hydrocarbon.

3. A cell comprising:
the electrode according to claim 1;
an electrolyte; and
a separator.

4. The cell according to claim 3,
wherein a surface of the active material through which a current flows in cell reactions is covered with the anion conducting material,
the electrode further comprises a protection member whose material is different from the anion conducting material, and
the protection member covers a surface of the active material through which no current flows in cell reactions.

5. The electrode according to claim 1, wherein the inorganic compound is magnesium hydroxide.

6. The electrode according to claim 1, wherein the active material layer is completely covered with the anion conducting material.

7. A negative electrode comprising:
a current collector; and
an active material layer containing an active material,
wherein the negative electrode further comprises a solid electrolyte in the active material layer,
the solid electrolyte contains at least one compound selected from the group consisting of a polyvalent ion and an inorganic compound,
the polyvalent ion contains at least one element selected from the group consisting of Fe, Ni, Co, Cu, and Mn, and,
the inorganic compound is at least one compound selected from the group consisting of magnesium hydroxide and a layered double hydroxide,
the layered double hydroxide contains at least one cation element selected from the group consisting of Mg, Fe, Zn, Ca, Li, Ni, Co, Cu, Al, and Mn, and
the active material contains a zinc-containing compound.

8. The negative electrode according to claim 7,
wherein the solid electrolyte is an electrolyte containing a polymer.

9. The negative electrode according to claim 7,
wherein the at least one compound selected from the group consisting of a polyvalent ion and an inorganic compound has anion conductivity.

10. A cell comprising:
the negative electrode according to claim 7;
a positive electrode;
a separator; and
an electrolyte.

11. The negative electrode according to claim 7, wherein the solid electrolyte contains the inorganic compound.

12. The negative electrode according to claim 11, wherein the inorganic compound is magnesium hydroxide.

13. The electrode according to claim 7, wherein the polyvalent ion is generated from a compound including at least one selected from the group consisting of an oxide containing the element of the polyvalent ion, a complex oxide containing the element of the polyvalent ion, a hydroxide containing the element of the polyvalent ion; a clay compound containing the element of the polyvalent ion, an alloy containing the element of the polyvalent ion, a carboxylate compound containing the element of the polyvalent ion, a carbonic acid compound containing the element of the polyvalent ion, a hydrogen carbonate compound containing the element of the polyvalent ion, a nitric acid compound containing the element of the polyvalent ion, a sulfuric acid compound containing the element of the polyvalent ion, a sulfonic acid compound containing the element of the polyvalent ion, a phosphoric acid compound containing the element of the polyvalent ion, a phosphorous acid compound containing the element of the polyvalent ion, a hypophosphorous acid compound containing the element of the polyvalent ion, a boric acid compound containing the element of the polyvalent ion, a silic acid compound containing the element of the polyvalent ion, an alminic acid compound containing the element of the polyvalent ion, a sulfite containing the element of the polyvalent ion, and an onium compound containing the element of the polyvalent ion.

14. An electrode precursor comprising:
a current collector;
an electrode mix composition containing an active material that includes a zinc-containing compound, the electrode mix composition for forming an active material layer, and
a mixture that forms an anion conducting material,
wherein the mixture contains a polymer and an inorganic compound, and is formed to partially or completely cover the electrode mix composition, and the electrode precursor is configured so that, when the electrode is incorporated in a cell, the active material layer is at least partially covered to prevent the active material from being in direct contact with an electrolyte of the cell,
the inorganic compound is at least one compound selected from the group consisting of magnesium hydroxide and a layered double hydroxide, and
the layered double hydroxide contains at least one cation element selected from the group consisting of Mg, Fe, Ca, Li, Ni, Co, and Cu, and at least another cation element selected from the group consisting of Al and Mn.

15. The electrode precursor according to claim 14, wherein the inorganic compound is magnesium hydroxide.

16. The electrode precursor according to claim 14, wherein the mixture that forms the anion conducting material is formed to completely cover the electrode mix composition.

* * * * *